United States Patent
Yamamoto et al.

(10) Patent No.: US 10,718,680 B2
(45) Date of Patent: Jul. 21, 2020

(54) SENSOR SHEET

(71) Applicant: NITTA CORPORATION, Osaka-shi, Osaka (JP)

(72) Inventors: Hisashi Yamamoto, Yamatokooriyama (JP); Masahiro Hatsuda, Yamatokooriyama (JP); Mitsumasa Kitano, Yamatokooriyama (JP); Tomohiro Agaya, Yamatokooriyama (JP); Koji Iwata, Yamatokooriyama (JP)

(73) Assignee: NITTA CORPORATION, Osaka (JP)

(*) Notice: Subject to any disclaimer, the term of this patent is extended or adjusted under 35 U.S.C. 154(b) by 0 days.

(21) Appl. No.: 15/537,136

(22) PCT Filed: Dec. 18, 2015

(86) PCT No.: PCT/JP2015/085592
§ 371 (c)(1),
(2) Date: Jun. 16, 2017

(87) PCT Pub. No.: WO2016/098905
PCT Pub. Date: Jun. 23, 2016

(65) Prior Publication Data
US 2018/0266908 A1    Sep. 20, 2018

(30) Foreign Application Priority Data

Dec. 18, 2014 (JP) .................. 2014-256533
Dec. 18, 2014 (JP) .................. 2014-256534
(Continued)

(51) Int. Cl.
*G01L 19/00* (2006.01)
*G01K 7/18* (2006.01)
(Continued)

(52) U.S. Cl.
CPC .......... *G01L 19/0092* (2013.01); *G01K 1/026* (2013.01); *G01K 1/26* (2013.01);
(Continued)

(58) Field of Classification Search
CPC ....... G01L 19/0092; G01L 9/00; G01K 1/026; G01K 1/26; G01K 7/16; G01K 7/18; G01K 15/005
See application file for complete search history.

(56) References Cited

U.S. PATENT DOCUMENTS 4,574,255 A * 3/1986 Fujii .................... C04B 35/497
257/E23.009
4,795,998 A    1/1989 Dunbar et al.
(Continued)

FOREIGN PATENT DOCUMENTS

EP    0161895 A2    11/1985
JP    2000-88870 A    3/2000
(Continued)

OTHER PUBLICATIONS

International Search Report, issued in PCT/JP2015/085592 (PCT/ISA/210), dated Feb. 9, 2016.
(Continued)

*Primary Examiner* — Lisa M Caputo
*Assistant Examiner* — Philip L Cotey
(74) *Attorney, Agent, or Firm* — Birch, Stewart, Kolasch & Birch, LLP

(57) ABSTRACT

A sensor sheet is manufactured by forming a conductive heat-sensitive material 5 over first wiring electrodes 3a and forming second wiring electrodes 4a over the conductive heat-sensitive material 5. For this reason, no adhesion surface (boundary surface), which is formed when adhesion is performed later, exists between the first wiring electrode 3a and the conductive heat-sensitive material 5 and between the
(Continued)

conductive heat-sensitive material 5 and the second wiring electrodes 4a.

28 Claims, 31 Drawing Sheets

(30) Foreign Application Priority Data

Oct. 15, 2015 (JP) .................................. 2015-203403
Dec. 18, 2015 (JP) .................................. 2015-247779

(51) Int. Cl.
*G01K 7/16* (2006.01)
*G01K 1/26* (2006.01)
*G01K 1/02* (2006.01)
*G01L 9/00* (2006.01)
*G01K 15/00* (2006.01)

(52) U.S. Cl.
CPC ................. *G01K 7/16* (2013.01); *G01K 7/18* (2013.01); *G01L 9/00* (2013.01); *G01K 15/005* (2013.01)

(56) References Cited

U.S. PATENT DOCUMENTS

| | | | | |
|---|---|---|---|---|
| 6,524,697 | B1* | 2/2003 | Furuyama | G01K 7/16 252/512 |
| 7,768,376 | B2* | 8/2010 | Liu | G01K 7/22 216/58 |
| 8,161,826 | B1* | 4/2012 | Taylor | G01L 1/18 73/862.044 |
| 2004/0056321 | A1* | 3/2004 | Parsons | G01F 1/692 257/417 |
| 2006/0034346 | A1* | 2/2006 | Saio | G01K 1/026 374/185 |
| 2006/0139141 | A1 | 6/2006 | Shirai et al. | |
| 2007/0151506 | A1* | 7/2007 | You | G01K 7/343 117/61 |
| 2007/0180902 | A1* | 8/2007 | Sherwood | A61F 7/007 73/204.26 |
| 2008/0219320 | A1* | 9/2008 | Liu | G01K 7/22 374/185 |
| 2010/0033196 | A1* | 2/2010 | Hayakawa | G01B 7/22 324/686 |
| 2011/0291939 | A1* | 12/2011 | Tsukahara | G06F 3/0202 345/168 |
| 2012/0072157 | A1* | 3/2012 | Alameh | G01K 13/00 702/99 |
| 2013/0168336 | A1 | 7/2013 | Kim et al. | |
| 2014/0036953 | A1* | 2/2014 | Kimura | G01J 5/16 374/121 |
| 2014/0088764 | A1* | 3/2014 | Naidu | H03K 17/962 700/258 |
| 2014/0125359 | A1* | 5/2014 | El-Gamal | G01N 27/223 324/664 |
| 2014/0150573 | A1* | 6/2014 | Cannard | G01L 1/18 73/862.627 |
| 2014/0326079 | A1* | 11/2014 | Maeda | G01L 1/146 73/862.626 |
| 2015/0007665 | A1 | 1/2015 | Britton et al. | |
| 2015/0280708 | A1* | 10/2015 | Goto | H03K 17/98 341/33 |
| 2016/0011691 | A1* | 1/2016 | Shinkai | G06F 3/044 345/174 |
| 2016/0085346 | A1* | 3/2016 | Tsukamoto | G06F 3/0416 345/174 |
| 2016/0327441 | A1* | 11/2016 | Iwase | A61B 5/1036 |
| 2017/0176262 | A1* | 6/2017 | Sekitani | C08F 220/18 |

FOREIGN PATENT DOCUMENTS

| | | |
|---|---|---|
| JP | 2005-331486 A | 12/2005 |
| JP | 2006-186272 A | 7/2006 |
| JP | 2010-121979 A | 6/2010 |
| JP | 2015-513068 A | 6/2010 |
| JP | 2012-230022 A | 11/2012 |
| WO | WO 2012/147432 A1 | 11/2012 |

OTHER PUBLICATIONS

Written Opinion of the International Searching Authority, issued in PCT/JP2015/085592 (PCT/ISA/237), dated Feb. 9, 2016.
Extended European Search Report for Application No. 15870104.5, dated Jun. 20, 2018.
Japanese Office Action, dated Jun. 11, 2019, for Japanese Application No. 2015-203403, with an English translation.
Chinese Office Action and Search Report dated Dec. 20, 2018, for counterpart Chinese Patent Application No. 201580069137.5, with English translation.
Chinese Office Action for counterpart Chinese Application No. 201580069137.5, dated Jul. 30, 2019, with English translation.
Japanese Office Action, dated Feb. 4, 2020, for Japanese Application NO. 2015-203403, with an English translation.
European Communication pursuant to Article 94(3) EPC for European Application No. 15870104.5, dated Apr. 1, 2020.

* cited by examiner

| 51 | 48 | 47 |
|----|----|----|
| 49 | 53 | 46 |
| 52 | 50 | 53 |

(b)

| 0.98 | 1.04 | 1.06 |
|------|------|------|
| 1.02 | 0.94 | 1.08 |
| 0.96 | 1.00 | 0.94 |

(c)

| 49.9 | 49.9 | 49.9 |
|------|------|------|
| 49.9 | 49.9 | 49.9 |
| 49.9 | 49.9 | 49.9 |

| 51 | 48 | 47 |
|---|---|---|
| 49 | 53 | 46 |
| 52 | 50 | 53 |

(b)

| 0.98 | 1.04 | 1.06 |
|---|---|---|
| 1.02 | 0.94 | 1.08 |
| 0.96 | 1.00 | 0.94 |

(c)

| 49.9 | 49.9 | 49.9 |
|---|---|---|
| 49.9 | 49.9 | 49.9 |
| 49.9 | 49.9 | 49.9 |

(a)

(b)

SENSOR SHEET

TECHNICAL FIELD

The present invention relates to a sensor sheet and a sensor system including a sensor sheet.

BACKGROUND ART

Patent Document 1 discloses a temperature detection apparatus constituted by a flexible base material, a parallel electrode group formed on the base material, and a heat-sensitive material that covers the electrode group. According to the technique disclosed in Patent Document 1, it is possible to detect a change in an electrical resistance value of the heat-sensitive material corresponding to the temperature near an intersection point of electrodes.

CITATION LIST

Patent Document

Patent Document 1: JP 2000-88670A

SUMMARY OF INVENTION

Technical Problem

However, the temperature detection apparatus disclosed in Patent Document 1 is manufactured by adhering a pair of sheet-like members together that each have an electrode group formed thereon, and an adhesion surface (boundary surface) exists between the two. Since minute unevenness exists on the adhesion surface, the areas of contact of the two sheet-like members change when pressure is applied to the adhesion surface. Accordingly, changes caused by pressure occur in the electromagnetic property of the heat-sensitive material, which causes disturbances. Thus, the temperature of a test subject cannot be measured accurately, which is problematic.

Also, there is a need to measure the temperature and the pressure at the same time and at the same location of the measurement subject. Furthermore, there is a need to measure the temperature distribution and the pressure distribution at the same time and at the same location of the measurement subject. However, since a temperature sensor and a pressure sensor are conventionally separate, it has not been possible to install the temperature sensor and the pressure sensor at the same location of the measurement subject.

A first object of the present invention is to provide a sensor sheet and a sensor system including the sensor sheet, which are capable of accurately measuring the temperature of a measurement subject. Furthermore, a second object of the present invention is to provide a temperature distribution sensor sheet and a sensor system including the temperature distribution sensor sheet, which are capable of accurately measuring the temperature of a measurement subject.

Solution to Problem

The inventors performed intensive studies in order to solve the above-described problem. As a result, an invention with the following aspects is provided. Note that in the present specification, the expressions "over" and "under" (e.g., the expression "over (or under) the electrode") encompass a case of being in direct contact as well as a case of not being in contact.

Item 1. A sensor sheet including:
a film base material;
a plurality of first wiring electrode pairs provided over the film base material, each first wiring electrode pair including an intersecting pair of wiring electrodes; and
a conductive heat-sensitive material that is provided at temperature detection portions, which are locations at which the pairs of wiring electrodes intersect in the first wiring electrode pairs, and is arranged between each pair of wiring electrodes,
wherein the plurality of temperature detection portions are each configured such that an electrical property changes according to a change in temperature, and
the pair of wiring electrodes and the conductive heat-sensitive material are fixed Item 2. The sensor sheet according to item 1, wherein the plurality of first wiring electrode pairs include:
a first wiring electrode group that is provided over the film base material and is formed by arranging a plurality of linear first wiring electrodes in parallel in a first direction; and
a second wiring electrode group that is provided over the first wiring electrode group and is formed by arranging a plurality of linear second wiring electrodes in parallel in a second direction that intersects the first direction,
the conductive heat-sensitive material is provided at the temperature detection portions, which are locations at which the first wiring electrodes and the second wiring electrodes intersect, and is arranged between the first wiring electrodes and the second wiring electrodes, and
the conductive heat-sensitive material is formed so as to be fixed over the first wiring electrode and the second wiring electrodes are formed so as to be fixed over the conductive heat-sensitive material.

Item 3. The sensor sheet according to item 2, wherein the thickness from the first wiring electrodes to the second wiring electrodes is made uniform due to an insulating material being provided between the temperature detection portions.

Item 4. The sensor sheet according to item 2 or 3, wherein the temperature detection portions are covered with an insulating material.

Item 5. The sensor sheet according to item 1, further including:
a plurality of second wiring electrode pairs provided over the film base material, each second wiring electrode pair including an intersecting pair of wiring electrodes; and
a conductive pressure-sensitive material that is provided at pressure detection portions, which are locations at which the pairs of wiring electrodes intersect in the second wiring electrode pairs, and is arranged between each pair of wiring electrodes,
wherein the plurality of pressure detection portions are each formed such that an electromagnetic property changes according to a change in pressure applied in a direction in which the pair of wiring electrodes are stacked in each second wiring electrode pair.

Item 6. The sensor sheet according to item 1, wherein the plurality of first wiring electrode pairs include:
a first wiring electrode group that is provided over the film base material and is formed by arranging a plurality of linear first wiring electrodes in parallel in a first direction; and a second wiring electrode group that is provided over the first wiring electrode group and is formed by arranging a plurality of linear second wiring electrodes in parallel in a second direction that intersects the first direction, the conductive heat-sensitive material is provided at the temperature detection portions, which are locations at which the first wiring electrodes and the second wiring electrodes intersect, and is arranged between the first wiring electrodes and the second wiring electrodes, the plurality of second wiring electrode pairs include:

the second wiring electrode group; and a third wiring electrode group that is provided over or under the second wiring electrode group and is formed by arranging a plurality of linear third wiring electrodes in parallel in a third direction that intersects the second direction, and the conductive pressure-sensitive material is provided at the pressure detection portions, which are locations at which the second wiring electrodes and the third wiring electrodes intersect, and is arranged between the second wiring electrodes and the third wiring electrodes.

Note that the first direction and the third direction can be matched.

Item 7. The sensor sheet according to item 6, wherein a region in which the plurality of temperature detection portions are arranged and a region in which the plurality of pressure detection portions are arranged overlap in plan view. In this case, the third wiring electrode group is provided over the second wiring electrode group in some cases.

Item 8. The sensor sheet according to item 6, wherein a region in which the plurality of temperature detection portions are arranged and a region in which the plurality of pressure detection portions are arranged do not overlap in plan view. In this case, the third wiring electrode group is provided under the second wiring electrode group in some cases.

Item 9. The sensor sheet according to item 6, wherein the conductive pressure-sensitive material includes a first portion and a second portion, the first portion is arranged along the second wiring electrodes, the second portion is arranged along the third wiring electrodes, and the first portion and the second portion are separatably in contact.

Item 10. The sensor sheet according to item 5, wherein the plurality of first wiring electrode pairs include:

a fourth wiring electrode group that is provided over the film base material and is formed by arranging a plurality of linear fourth wiring electrodes in parallel in a first direction; and a fifth wiring electrode group that is provided over the fourth wiring electrode group and is formed by arranging a plurality of linear fifth wiring electrodes in parallel in a second direction that intersects the first direction, the conductive heat-sensitive material is provided at the temperature detection portions, which are locations at which the fourth wiring electrodes and the fifth wiring electrodes intersect, and is arranged between the fourth wiring electrodes and the fifth wiring electrodes, the plurality of second wiring electrode pairs include:

a sixth wiring electrode group that is provided over the film base material and is formed by arranging a plurality of linear sixth wiring electrodes in parallel in the first direction; and a seventh wiring electrode group that is provided over the sixth wiring electrode group and is formed by arranging a plurality of linear seventh wiring electrodes in parallel in the second direction, the conductive pressure-sensitive material is provided at the pressure detection portions, which are locations at which the sixth wiring electrodes and the seventh wiring electrodes intersect, and is arranged between the sixth wiring electrodes and the seventh wiring electrodes, and a region in which the plurality of temperature detection portions are arranged and a region in which the plurality of pressure detection portions are arranged do not overlap in plan view.

Item 11. The sensor sheet according to item 10, wherein the fourth wiring electrodes and the sixth wiring electrodes are arranged alternatingly in the second direction, and the fifth wiring electrodes and the seventh wiring electrodes are arranged alternatingly in the first direction.

Item 12. The sensor sheet according to item 10 or 11, wherein a thickness from the first wiring electrode to the third wiring electrode is made uniform due to an insulating material being provided between the temperature detection portions and between the pressure detection portions.

Item 13. A sensor system including:

the sensor sheet according to one of items 5 to 12;

an electric circuit configured to acquire changes in an electromagnetic property of the temperature detection portions and the pressure detection portions as output values;

a calculation unit configured to calculate a temperature distribution based on the output values obtained from the plurality of temperature detection portions and calculate a pressure distribution based on the output values obtained from the plurality of pressure detection portions; and a control unit configured to control at least an operation of the sensor sheet.

Item 14. The sensor system according to item 13, further including a correction unit configured to, based on output values obtained by either the temperature detection portions or the pressure detection portions, correct output values obtained by the other.

Item 15. The sensor system according to item 13 or 14, further including a measurement device configured to measure at least one of the temperature and the humidity of the same atmosphere as the sensor sheet.

Item 16. The sensor system according to one of items 13 to 15, wherein based on the output values from the one or more temperature detection portions of the sensor sheet, which are obtained when the one or more temperature detection portions are held at a predetermined temperature, the control unit derives conversion coefficients for the output values from the temperature detection portions with which temperature output values that correlate to a temperature input value applied to the temperature detection portions can be obtained.

Item 17. The sensor system according to item 16, wherein the control unit derives the conversion coefficients based on the output values from the one or more temperature detection portions of the sensor sheet, which are obtained when the one or more temperature detection portions are held at a plurality of mutually different temperatures.

Item 18. The sensor system according to item 16 or 17, wherein the control unit determines whether or not the temperature output values obtained by multiplying the conversion coefficients by the output values of the temperature detection portions match the temperature input value applied to the temperature detection portions.

Item 19. The sensor system according to one of items 16 or 18, further including a measurement device configured to measure at least one of the temperature and the humidity of the same atmosphere as the sensor sheet, wherein the control unit uses a temperature value measured by the measurement device as the temperature input value.

Item 20. The sensor system according to item 16 or 17, wherein based on the output values from the one or more pressure detection portions of the sensor sheet, which are obtained when a predetermined pressure is applied to the one or more pressure detection portions, the control unit derives conversion coefficients for the output values from the pressure detection portions with which pressure output values that correlate to the pressure input value applied to the pressure detection portions can be obtained.

Item 21. The sensor system according to item 20, wherein the control unit derives the conversion coefficients based on the output values from the one or more pressure detection portions of the sensor sheet, which are obtained when a plurality of mutually different pressures are applied to the one or more pressure detection portions.

Item 22. The sensor system according to item 20 or 21, wherein the control unit determines whether or not the pressure output values obtained by multiplying the conversion coefficients by the output values of the pressure detection portions match the pressure input value applied to the pressure detection portions.

Item 23. The sensor system according to one of items 16 to 22, wherein the control unit stores the conversion coefficients for each of a plurality of said sensor sheets and selects conversion coefficients that are optimal for the sensor sheet that is to be used.

Item 24. The sensor system according to one of items 16 or 23, further including a measurement device configured to measure at least one of the temperature and the humidity of the same atmosphere as the sensor sheet, wherein the control unit determines the conversion coefficients based on the humidity measured by the measurement device.

Item 25. The sensor sheet according to one of items 1 to 12, wherein the conductive heat-sensitive material contains conductive particles and resin, and has an electrical resistance value at 200° C. that is at least 1.2 times its electrical resistance value at 30° C.

Item 26. The sensor sheet according to item 25, wherein a volume resistivity in a temperature range of 30° C. to 200° C. is in a range of 10 Ω·cm to 100 Ω·cm.

Item 27. The sensor sheet according to item 25 or 26, wherein the content of the conductive particles of the conductive heat-sensitive material is less than 15 mass %.

Item 28. The sensor sheet according to one of items 25 to 27, wherein the thickness of the conductive heat-sensitive material is 100 µm or less.

Item 29. The sensor sheet according to one of items 25 to 28, wherein the electrical resistance value at 100° C. is at most 5 times the electrical resistance value at 30° C.

Item 30. The sensor sheet according to one of items 25 to 29, wherein a change rate of the electrical resistance value in the temperature range of 30° C. to 200° C. is within a range of 0.12 to 2.4%/° C.

Another sensor sheet according to the present invention is a temperature distribution sensor sheet configured to measure a temperature distribution, including: a first wiring electrode group that is provided over a film base material and is formed by arranging a plurality of linear first wiring electrodes in parallel in a first direction; a second wiring electrode group that is provided over the first wiring electrode group and is formed by arranging a plurality of linear second wiring electrodes in parallel in a second direction that intersects the first direction; and a conductive heat-sensitive material that is provided at temperature detection portions, which are locations at which the first wiring electrodes and the second wiring electrodes intersect, and is arranged between the first wiring electrodes and the second wiring electrodes, wherein the plurality of temperature detection portions are each configured such that an electrical property changes according to a change in temperature, and the sensor sheet is manufactured by forming the conductive heat-sensitive material over the first wiring electrodes and forming the second wiring electrodes over the conductive heat-sensitive material.

According to the present embodiment, the sensor sheet is manufactured by forming the conductive heat-sensitive material over the first wiring electrodes and forming the second wiring electrodes over the conductive heat-sensitive material, and therefore no adhesion surface (boundary surface), which is formed when adhesion is performed later, exists between the first wiring electrodes and the conductive heat-sensitive material and between the conductive heat-sensitive material and the second wiring electrodes. Accordingly, the electromagnetic property of the heat-sensitive material does not change due to pressure applied to the adhesion surface at the time of measuring the temperature of the measurement subject, and therefore no disturbance occurs in the electromagnetic property that changes in the temperature detection portions. Accordingly, the temperature of the measurement subject can be measured accurately.

In the present invention, the thickness from the first wiring electrodes to the second wiring electrodes may be made uniform due to an insulating material being provided between the temperature detection portions.

In the present invention, the temperature detection portions may be covered with an insulating material.

A sensor system according to the present invention includes the above-described temperature distribution sensor sheet; an electric circuit that acquires changes in the electromagnetic property of the temperature detection portions as output values; and a calculation means configured to calculate a temperature distribution based on the output values obtained by the plurality of temperature detection portions.

The sensor system according to the present invention may further include a measurement device configured to measure at least one of the temperature and the humidity of the same atmosphere as the sensor sheet.

A calibration program according to the present invention causes the sensor system to operate so as to derive conversion coefficients for the output values from the temperature detection portions with which temperature output values that correlate to the temperature input value applied to the temperature detection portions can be obtained, based on the output values from the one or more temperature detection portions of the temperature distribution sensor sheet that are obtained when the one or more temperature detection portions are held at a predetermined temperature.

The program will be described hereinafter (hereinafter referred to as "description of the program"). For example, it is possible to perform storage in a semiconductor memory including a ROM (Read Only Memory) and a RAM (Random Access Memory), as well as a recording medium such as an optical disk, such as a DVD (Digital Versatile Disc) or a CD (Compact Disc), and a magnetic disk, such as a hard disk or an FD (flexible disk). The program code may be downloaded from a remote computer or apparatus via a communication link as a data signal, and may be stored in the recording apparatus of the computer as a computer program product. Alternatively, the program code may be distributed in a state of being stored in the recording medium as a computer program. Also, the program code may be written in one or more known program languages. Here, the computer is not limited to being a general-purpose computer such as a personal computer, and may be an apparatus that specializes in calibration of a temperature distribution sensor sheet including multiple temperature detection portions.

In the present invention, the calibration program may cause the sensor system to operate so as to derive the conversion coefficients based on the output values from the one or more temperature detection portions of the temperature distribution sensor sheet that are obtained when the one or more temperature detection portions are held at multiple mutually different temperatures.

In the present invention, the calibration program may cause the sensor system to operate so as to determine whether or not the temperature output values obtained by multiplying the conversion coefficients by the output values of the temperature detection portions match the temperature input value applied to the temperature detection portions.

In the present invention, the sensor system includes a measurement device configured to measure at least one of the temperature and the humidity of the same atmosphere as the sensor sheet, and the calibration program may use the temperature value measured by the measurement device as the temperature input value.

In the present invention, the calibration program may cause the sensor system to operate so as to store the conversion coefficients for each of a plurality of said temperature distribution sensor sheets and select the conversion coefficients that are optimal for the temperature distribution sensor sheet that is to be used.

Yet another sensor sheet according to the present invention is a sensor sheet configured to measure a temperature distribution and a pressure distribution, including: a first wiring electrode group that is provided over a film base material and is formed by arranging a plurality of linear first wiring electrodes in parallel in a first direction; a second wiring electrode group that is provided over the first wiring electrode group and is formed by providing a plurality of linear second wiring electrodes in parallel in a second direction that intersects the first direction; and a conductive heat-sensitive material that is provided at temperature detection portions, which are locations at which the first wiring electrodes and the second wiring electrodes intersect, and is arranged between the first wiring electrodes and the second wiring electrodes; a third wiring electrode group that is provided over the second wiring electrode group and is formed by arranging a plurality of linear third wiring electrodes in parallel in a third direction that intersects the second direction; and a conductive pressure-sensitive material that is provided at pressure detection portions, which are locations at which the second wiring electrodes and the third wiring electrodes intersect, and is arranged between the second wiring electrodes and the third wiring electrodes, wherein each of the plurality of temperature detection portions is configured such that an electrical property changes according to a change in temperature, each of the plurality of temperature detection portions has an electromagnetic property that changes according to a change in pressure applied in a direction in which the second wiring electrode group and the third wiring electrode group are stacked, and a region in which the plurality of temperature detection portions are arranged and a region in which the plurality of pressure detection portions are arranged overlap in plan view.

According to the present invention, the sensor sheet can be formed compactly by overlapping the region in which the plurality of temperature detection portions are arranged and the region in which the plurality of pressure detection portions are arranged in plan view. Accordingly, since the temperature detection portions and the pressure detection portions are arranged at the same location on the measurement subject, it is possible to measure the temperature and the pressure at the same time and at the same location on the measurement subject.

In the present invention, the sensor sheet may be manufactured by forming the conductive heat-sensitive material over the first wiring electrodes and forming the second wiring electrodes over the conductive heat-sensitive material.

In the present invention, the thickness from the first wiring electrodes to the second wiring electrodes are made uniform due to an insulating material being provided between the temperature detection portions and between the pressure detection portions.

A sensor system according to the present invention includes the sensor sheet; an electric circuit configured to acquire changes in an electromagnetic property of the temperature detection portions and the pressure detection portions as output values; and a calculation unit configured to calculate a temperature distribution based on the output values obtained from the plurality of temperature detection portions and calculate a pressure distribution based on the output values obtained from the plurality of pressure detection portions.

In the present invention, the sensor system may further include a correction unit configured to, based on the output values obtained by either the temperature detection portions or the pressure detection portions, correct the output values obtained by the other.

In the present invention, the sensor system may further include a measurement device configured to measure at least one of the temperature and the humidity of the same atmosphere as the sensor sheet.

A calibration program according to the present invention causes the sensor system to operate so as to derive conversion coefficients for the output values from the temperature detection portions with which temperature output values that correlate to the temperature input value applied to the temperature detection portions can be obtained, based on the output values from the one or more temperature detection portions of the sensor sheet that are obtained when the one or more temperature detection portions are held at a predetermined temperature.

The program has been described in the "description of the program" above.

In the present invention, the calibration program related to temperature detection is as described above.

In the present embodiment, the calibration program may cause the sensor system to operate so as to derive conversion coefficients for the output values from the pressure detection portions with which pressure output values that correlate to a pressure input value applied to the pressure detection portions can be obtained, based on the output values from the one or more pressure detection portions of the sensor sheet that are obtained when the predetermined pressure is applied to the one or more pressure detection portions.

In the present embodiment, the calibration program may cause the sensor system to operate so as to derive conversion coefficients based on the output values from the one or more pressure detection portions of the sensor sheet obtained when multiple mutually different pressures are applied to the one or more pressure detection portions.

In the present invention, the calibration program may cause the sensor system to operate so as to determine whether or not the pressure output values obtained by multiplying the conversion coefficients by the output values of the pressure detection portions match the pressure input value applied to the pressure detection portions.

In the present invention, the calibration program may cause the sensor system to operate so as to store the conversion coefficients for each of a plurality of said sensor sheets and select the conversion coefficients that are optimal for the sensor sheet that is to be used.

Also, the present invention provides a heat-sensitive sensor (or temperature detection portion) that can accurately measure the temperature of a measurement subject over a wide temperature range, unlike a conventional temperature sensor.

The inventors performed intensive studies in order to solve the above-described problem. As a result, it was found that the temperature of a measurement subject can be measured accurately over a wide temperature range using a heat-sensitive sensor that includes a first electrode, a second electrode, and a heat-sensitive resistor (or conductive heat-sensitive material) electrically connected to the first electrode and the second electrode, the heat-sensitive resistor including conductive particles and resin and having an electrical resistance value at 200° C. that is at least 1.2 times its electrical resistance value at 30° C. The present invention was completed by performing further studies based on these findings.

In other words, an invention with the following aspects is provided.

Item 1. A heat-sensitive element including: at least one first electrode;

at least one second electrode; and at least one heat-sensitive resistor electrically connected to the first electrode and the second electrode, wherein the heat-sensitive resistor includes conductive particles and resin, and has an electrical resistance value at 200° C. that is at least 1.2 times its electrical resistance value at 30° C.

Item 2. The heat-sensitive element according to item 1, wherein a volume resistivity in a temperature range of 30° C. to 200° C. is in a range of 10 Ω·cm to 100 Ω·cm.

Item 3. The heat-sensitive element according to item 1 or 2, wherein the content of the conductive particles of the heat-sensitive resistor is less than 15 mass %.

Item 4. The heat-sensitive element according to one of items 1 to 3, wherein the thickness of the heat-sensitive resistor is 100 μm or less.

Item 5. The heat-sensitive element according to one of items 1 to 4, having an electrical resistance value at 100° C. that is at most 5 times its electrical resistance value at 30° C.

Item 6. The heat-sensitive element according to one of items 1 to 5, wherein a change rate of the electrical resistance value in the temperature range of 30° C. to 200° C. is within a range of 0.12 to 2.4%/° C.

Item 7. The heat-sensitive element according to one of items 1 to 6, further including a base material, wherein the first electrode, the heat-sensitive resistor, and the second electrode are arranged on the base material.

Item 8. The heat-sensitive element according to item 7, wherein the first and second electrodes are formed linearly, a plurality of said first electrodes and a plurality of said second electrodes are arranged on the base material, the plurality of first electrodes are arranged in parallel so as to extend in a first direction, the plurality of second electrodes are arranged in parallel so as to extend in a second direction that intersects the first direction, and the heat-sensitive resistors are arranged at temperature detection portions, which are locations at which the first electrodes and the second electrodes intersect.

Item 9. The heat-sensitive element according to item 8, wherein a thickness from the first electrodes to the second electrodes is made uniform due to an insulating material being provided between the temperature detection portions.

Item 10. The heat-sensitive element according to item 8 or 9, wherein the temperature detection portions are covered with an insulating material.

Item 11. Ink that contains conductive particles, resin, and a solvent, the ink being for forming a heat-sensitive resistor with an electrical resistance value at 200° C. that is at least 1.2 times its electrical resistance value at 30° C.

Item 12. A method for manufacturing a heat-sensitive element including a step of applying the ink according to item 11 to a surface of an electrode.

BRIEF DESCRIPTION OF DRAWINGS

FIG. 11 is a diagram for describing a procedure for deriving correction coefficients in the equilibration processing.

FIG. 23 is a diagram for describing a procedure for deriving correction coefficients in the equilibration processing.

DESCRIPTION OF EMBODIMENTS

A. Temperature Distribution Sensor Sheet

Hereinafter, a preferred embodiment of a sensor sheet for measuring a temperature portion according to the present invention will be described with reference to the drawings.

Configuration of Temperature Distribution Sensor Sheet

The temperature distribution sensor sheet according to the embodiment of the present invention measures a temperature distribution. The temperature distribution sensor sheet is obtained by two-dimensionally aligning multiple heat-sensitive sensors that have an electromagnetic property such as a resistance value that changes according to a change in temperature.

This kind of temperature distribution sensor sheet can be used when performing a heating treatment in a step of manufacturing a semiconductor, a ceramic capacitor, liquid crystal, glass, a printer, film, or the like, and can be used to measure heat transmission and heat dissipation states of a heat generation portion of an electronic device such as a hot plate, a personal computer, or a battery, and a metal or resin material that comes into contact therewith, and to measure temperature distributions of various things, such as body temperature of a human or animal. For this reason, the present invention can be used to increase the efficiency of material machining, material design, machine design, improvement, product development, medical treatment, analysis and determination of a medical treatment, and the like.

Figure 1:
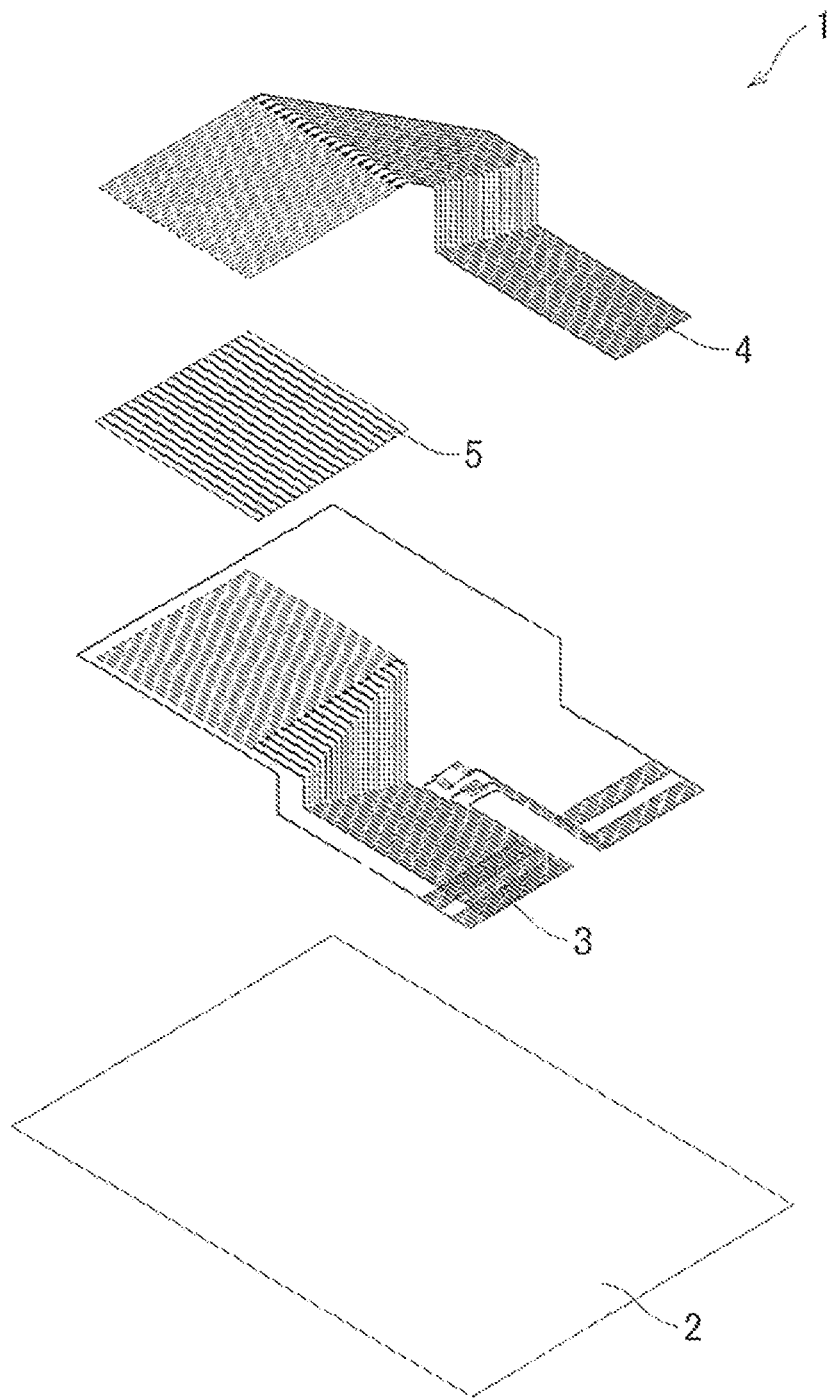
FIG. 1 is a perspective exploded view of a temperature distribution sensor sheet.

As shown in FIG. 1, which is an exploded perspective view, the temperature distribution sensor sheet 1 has a film base material 2, a first wiring electrode group 3 provided over the film base material 2, a second wiring electrode group 4 provided over the first wiring electrode group 3, and a conductive heat-sensitive material 5 provided between the first wiring electrode group 3 and the second wiring electrode group 4.

Figure 2:
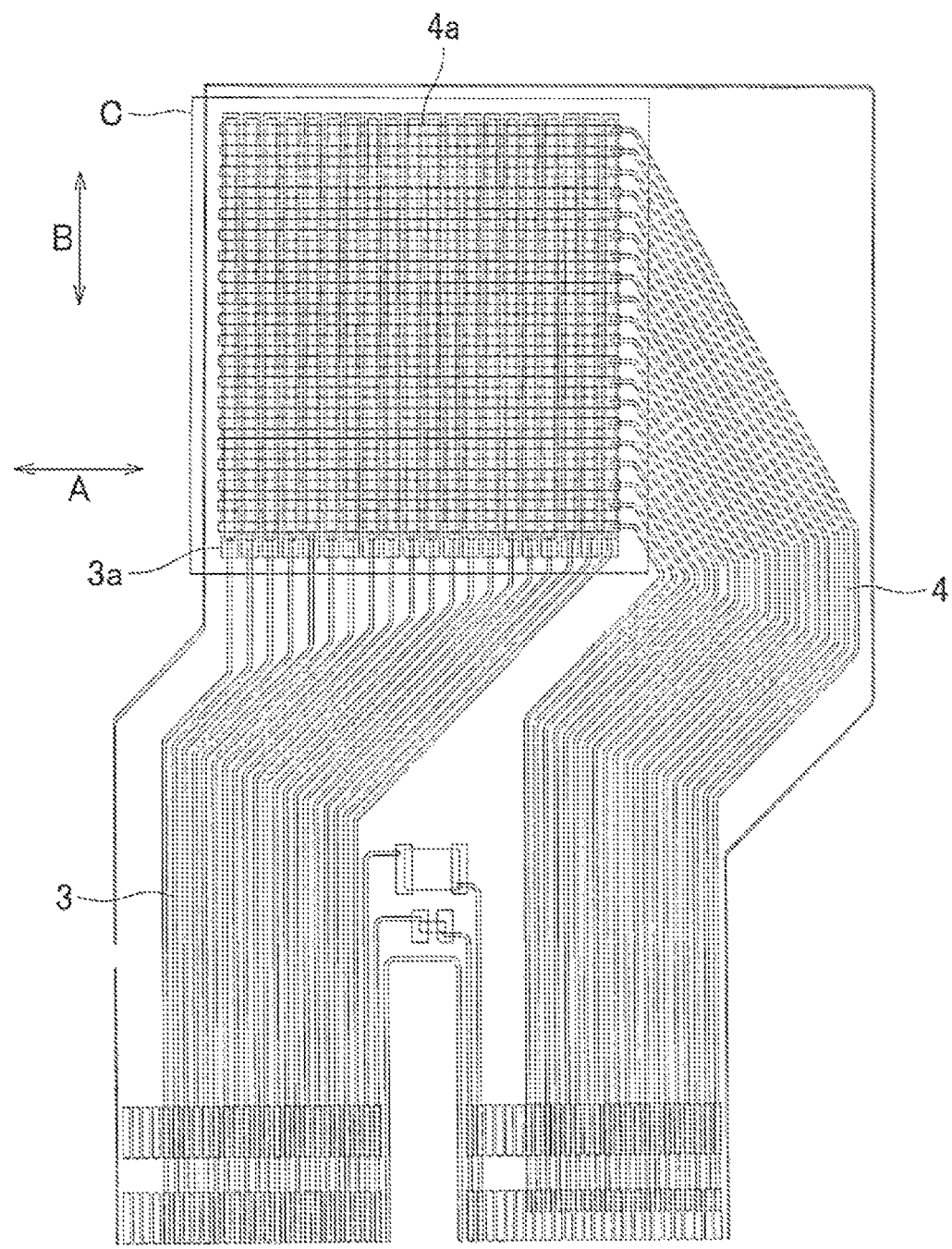
FIG. 2 is a plan view of a temperature distribution sensor sheet.

As shown in FIG. 2, which is a plan view, in the first wiring electrode group 3, multiple linear first wiring electrodes 3a are provided in alignment in an A direction (first direction). Also, in the second wiring electrode group 4, multiple linear second wiring electrodes 4a are provided in alignment in a B direction (second direction). In the present embodiment, the A direction and the B direction are orthogonal to each other, but they may intersect at another angle as well.

Figure 3:
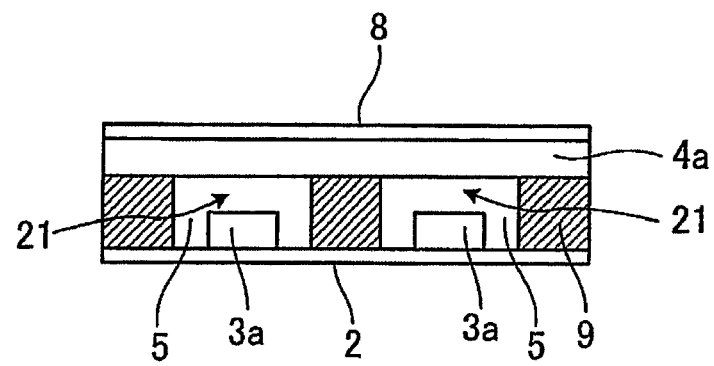
FIG. 3 is a cross-sectional view of a temperature distribution sensor sheet.

As shown in FIG. 3, which is a cross-sectional view, the conductive heat-sensitive material 5 is provided so as to cover each of the multiple first wiring electrodes 3a. However, it is sufficient that the conductive heat-sensitive material 5 is provided at least at later-described temperature detection portions 21 and is arranged between the first wiring electrodes 3a and the second wiring electrodes 4a. Here, the temperature detection portions 21 are locations at which the first wiring electrodes 3a and the second wiring electrodes 4a intersect.

Figure 4:
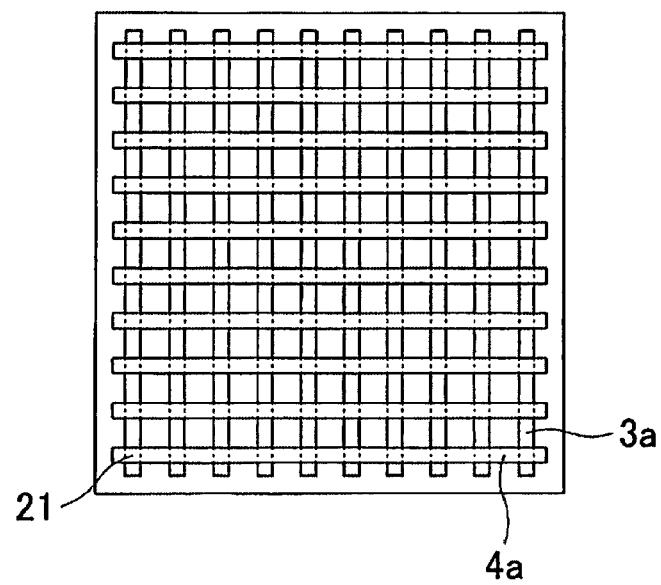
FIG. 4 is an enlarged view of a relevant portion C shown in FIG. 2.

The first wiring electrode group 3, the second wiring electrode group 4, and the conductive heat-sensitive material 5 form a temperature distribution sensor. As shown in FIG. 4, which is an enlarged view of a relevant portion C shown in FIG. 2, each temperature detection portion 21, which is a location at which a first wiring electrode 3a and a second wiring electrode 4a intersect, functions as a heat-sensitive sensor.

When a temperature detection portion 21 is held at a predetermined temperature, the electrical resistance of the conductive heat-sensitive material 5 changes according to a change in the temperature. The electrical resistances are transferred from the temperature detection portions 21 to a power source through the first wiring electrodes 3a and the second wiring electrodes 4a. Accordingly, the resistance values are measured. The temperature at which the temperature detection portions 21 are held can be detected using the measured resistance values.

Note that although the resistance values of the temperature detection portions 21 increase as the held temperature increases, the resistance values thereof may decrease as the held temperature increases. Also, an electromagnetic property of the temperature detection portions 21 other than the resistance value, such as a charge amount or an induction current, may change according to a change in the temperature.

The film base material 2 is composed of a flexible material such as polyimide or PET. The first wiring electrodes 3a and the second wiring electrodes 4a are composed of a metal foil such as silver foil, copper foil, or aluminum foil, a conductive polymer, or the like, but there is no limitation to this, and they may be composed of a highly-conductive material. Note that regarding the material constituting the film base material and the wiring electrodes, the same applies to a later-described temperature-pressure sensor.

The conductive heat-sensitive material 5 is formed by adding a binder to conductive particles, although this will be described later.

Here, in the present embodiment, as shown in FIG. 3, the temperature distribution sensor sheet is manufactured by forming the conductive heat-sensitive material 5 over the first wiring electrodes 3a and forming the second wiring electrodes 4a over the conductive heat-sensitive material 5. For this reason, no adhesion surface (boundary surface), which is formed when adhesion is performed later, exists between the first wiring electrode 3a and the conductive heat-sensitive material 5 and between the conductive heat-sensitive material 5 and the second wiring electrodes 4a. That is, the first wiring electrodes 3a and the conductive heat-sensitive material 5 are fixed in close contact with each other, and the conductive heat-sensitive material 5 and the second wiring electrodes 4a are fixed in close contact with each other. Normally, minute unevenness exists on the adhesion surface, and therefore when pressure is applied to the adhesion surface, the area of contact between the adhered members changes. Accordingly, changes caused by pressure occur in the electromagnetic property of the heat-sensitive material 5, which causes disturbances. However, no adhesion surface exists in the present embodiment. Accordingly, the electromagnetic property of the heat-sensitive material 5 does not change due to pressure applied to the adhesion surface when the temperature of the measurement subject is detected, and therefore no disturbance occurs in the resistance values that change in the temperature detection portions 21. Accordingly, the temperature of the measurement subject can be measured accurately.

As shown in FIG. 3, an insulating material 9 is provided between the temperature detection portions 21. Accordingly, the thickness from the first wiring electrodes 3a to the second wiring electrodes 4a is made uniform.

By making the thickness from the first wiring electrodes 3a to the second wiring electrodes 4a uniform, it is possible to prevent the pressure applied by the measurement subject from being concentrated on the temperature detection portions 21 during measurement of the temperature distribution. As a result, since no warping occurs in the conductive heat-sensitive material 5 provided at the temperature detection portions 21, it is possible to prevent the occurrence of a heat measurement error. Also, it is possible to prevent indentations from occurring on the measurement subject to which the temperature distribution sensor sheet 1 is pressed.

Figure 5:
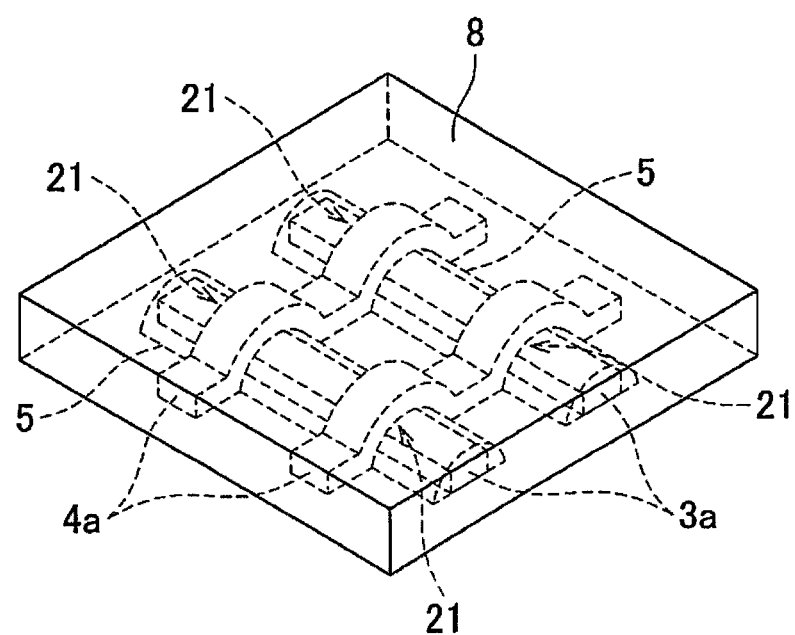
FIG. 5 is a perspective view of a temperature distribution sensor sheet.

As shown in FIG. 5, which is a perspective view, a protective film base material 8 composed of an insulating material is provided over the second wiring electrode group 4. Accordingly, the surfaces of the second wiring electrodes 4a are protected, and short-circuiting of the second wiring electrodes 4a is prevented. Note that it is also possible to cover the temperature detection portions 21 with an insulating resin material instead of providing the protection film base material 8.

By covering the temperature detection portions 21 with the protective film base material 8 and an insulating material such as an insulating resin material, it is possible to prevent the electromagnetic property of the temperature detection portions 21 from changing due to moisture absorption and to prevent the conductive heat-sensitive material 5 from deteriorating and being altered due to hydrolysis.

Conductive Heat-Sensitive Material

The conductive heat-sensitive material 5 according to the present embodiment can include a property in which the electrical resistance value increases along with an increase in temperature, and for example, it is possible to have a property in which, in at least a range of 30° C. to 200° C., the electrical resistance value increases when the temperature increases and the electrical resistance value decreases when the temperature decreases. Also, the conductive heat-sensitive material 5 contains conductive particles and resin.

As long as the conductive particles contained in the conductive heat-sensitive material 5 are particles that are conductive, there is no particular limitation thereon, and it is possible to use conductive particles contained in a known conductive heat-sensitive material. Specific examples of conductive particles include: carbon-based particles (also includes fibrous materials) such as carbon black, graphite, carbon nanotubes, carbon nanohorns, carbon nanofibers, and carbon nanocoils; metal particles such as iron, nickel, copper, aluminum, magnesium, platinum, silver, gold, and alloys including at least one of these metals; and conductive inorganic particles such as tin oxide, zinc oxide, silver iodide, copper iodide, barium titanate, indium tin oxide, and strontium titanate. Among these, conductive carbon black is particularly preferable from the viewpoint of being a heat-sensitive element that can accurately measure the temperature of the measurement subject over a wide temperature range. It is possible to use only one type of conductive particle, and it is possible to use a combination of two or more types of conductive particle.

The particle diameter of the conductive particles is preferably 1 μm or less, more preferably 100 nm or less, and even more preferably 50 nm or less, for example, but there is no limitation thereto.

The content of the conductive particles contained in the conductive heat-sensitive material 5 is not particularly limited and need only be set so that a desired electrical resistance value or volume resistance value is reached, but it is preferably less than 15 mass %, and more preferably about 2 to 9 mass % from the viewpoint of using heat-sensitive elements that can accurately measure the temperature of the measurement subject over a wide temperature range. For example, from a similar viewpoint, if conductive carbon black manufactured using an oil furnace method is used as the conductive particles, the content is preferably less than 10 mass %, more preferably about 1 to 8 mass %, and even more preferably about 2 to 6 mass %. Also, in the case of using conductive carbon black produced using an acetylene decomposition method, the content is preferably 15 mass %, more preferably about 4 to 12 mass %, and even more preferably about 6 to 9 mass %, from a similar viewpoint.

The resin contained in the conductive heat-sensitive material 5 is not particularly limited, and it is possible to use a resin contained in a known conductive heat-sensitive material. The glass transition temperature of the resin can be selected as appropriate according to the mode of use of the heat-sensitive element. From the viewpoint of using a heat-sensitive element that can accurately measure the temperature of the measurement subject over a wide temperature range, the glass transition temperature of the resin is preferably at least the upper limit value of the temperature measurement range of the temperature detection portion 21. In other words, for example, if the upper limit value of the temperature measurement range of the temperature detection portion 21 is 200° C., the glass transition temperature of the resin is preferably 200° C. or more, and if the upper limit value of the temperature measurement range of the temperature detection portion 21 is 100° C., the glass transition temperature of the resin is preferably 100° C. or more. Examples of methods for adjusting the glass transition temperature of the resin include a method of adjusting the molecular weight, molecular framework, or the like of the resin. The glass transition temperature of the resin is preferably about 80 to 400° C. Note that if multiple types of resin are contained in the conductive heat-sensitive material, the glass transition temperature of the resin means the overall glass transition temperature of the resin contained in the conductive heat-sensitive material.

Specific examples of the resin include: a thermally curable resin such as silicone resin, polyimide resin, and epoxy resin; and a thermoplastic resin such as polyamide imide resin, polyether imide resin, polyethylene terephthalate resin, polybutylene terephthalate resin, polyamide resin, polyacetal resin, polyphenylene sulfide resin, polyether ether ketone resin, fluorine resin, and polyester resin. Among these, silicone resin, polyimide resin, epoxy resin, polyamide imide resin, polyethylene terephthalate resin, and polyether imide resin are preferable, and polyimide resin and epoxy resin are particularly preferable, from the viewpoint of obtaining a heat-sensitive element that can accurately measure the temperature of the measurement subject over a wide temperature range. One type of resin with a glass transition temperature of 200° C. or more may be used alone, and two types or more may be used in combination.

In the present embodiment, the glass transition temperature (Tg(° C.)) of the resin is a value measured using differential scanning calorimetry (DSC).

The content of the resin contained in the conductive heat-sensitive material can be set according to the type of the conductive particles or the like, and there is no limitation thereto. However, the content is preferably 85 mass % or more, and more preferably about 91 to 98 mass % from the viewpoint of obtaining a temperature detection portion 21 that can accurately measure the temperature of the measurement subject over a wide temperature range. For example, from a similar viewpoint, if conductive carbon black manufactured using an oil furnace method is used as the conductive particles, the content is preferably 90 mass % or more, more preferably about 92 to 99 mass %, and even more preferably about 94 to 98 mass %. Also, in the case of using conductive carbon black produced with an acetylene decomposition method, the content is preferably 85 mass % or more, more preferably about 88 to 96 mass %, and even more preferably about 91 to 94 mass %, from a similar viewpoint.

In addition to the above-described conductive particles and resin, the conductive heat-sensitive material 5 may further contain an additive. The additive is not particularly limited, and it is possible to use a known additive contained in a conductive heat-sensitive material 5 that has PTC characteristics, such as titanium oxide, alumina, or mica.

The temperature detection portions 21 of the present embodiment have an electrical resistance value at 200° C. that is at least 1.2 times their electrical resistance value at 30° C. That is, the electrodes are arranged on the conductive heat-sensitive material 5, the measured electrical resistance value at 200° C. is at least 1.2 times the electrical resistance value at 30° C., and the relationship between the electrical resistance value and the temperature of the conductive heat-sensitive material 5 is this kind of specific relationship. In the temperature detection portion 21, the conductive heat-sensitive material 5 contains the conductive particles and the resin, and the electrical resistance value and temperature have this kind of specific relationship, and thus it is possible to accurately measure the temperature of the measurement subject over a wide temperature range (e.g., a range of 30° C. to 200° C.). Note that in the present embodiment, the value of the electrical resistance of the conductive heat-sensitive material 5 is a value measured using the method disclosed in a later-described embodiment.

From the viewpoint of even more accurately measuring the temperature of the measurement subject in the range of 30° C. to 200° C., the electrical resistance value at 200° C. of the conductive heat-sensitive material 5 is preferably at least 1.5 times its electrical resistance value at 30° C., and more preferably at least 1.7 times its electrical resistance value at 30° C.

Also, from the viewpoint of even more accurately measuring the temperature of the measurement subject in the range of 30° C. to 50° C. for example, the electrical resistance at 150° C. of the temperature detection portion (conductive heat-sensitive material) 21 is preferably at least 1.2 times, more preferably at least 1.5 times, and even more preferably at least 1.7 times the electrical resistance at 30° C. Furthermore, from the viewpoint of even more accurately measuring the temperature of the measurement subject in the range of 30° C. to 150° C. for example, the electrical resistance value at 100° C. of the temperature detection portions (conductive heat-sensitive material) 21 is preferably at least 1.2 times, more preferably at least 1.5 times, and even more preferably at least 1.7 times their electrical resistance value at 30° C.

Also, the electrical resistance value at the highest temperature in the temperature measurement range of the temperature detection portions (conductive heat-sensitive material) 21 is at most 5 times their electrical resistance value at the lowest temperature, and thus the temperature of the measurement subject can be measured even more accurately. For example, from the viewpoint of even more accurately measuring the temperature of the measurement subject in the range of 30° C. to 100° C., the electrical resistance value at 100° C. of the temperature detection portions (conductive heat-sensitive material) 21 is preferably at most 5 times, and more preferably at most 3.5 times their electrical resistance value at 30° C. For example, from the viewpoint of even more accurately measuring the temperature of the measurement subject in the range of 30° C. to 150° C., the electrical resistance value at 150° C. of the temperature detection portions (conductive heat-sensitive material) 21 is preferably at most 5 times, and more preferably at most 4.5 times their electrical resistance value at 20° C. For example, from the viewpoint of even more accurately measuring the temperature of the measurement subject in the range of 30° C. to 200° C., the electrical resistance value at 200° C. of the temperature detection portions (conductive heat-sensitive material) 21 is preferably at most 5 times their electrical resistance value at 30° C.

In the temperature detection portions (conductive heat-sensitive material) 21 of the present embodiment, the change rate of the electrical resistance value in the temperature range of 30° C. to 200° C. is not particularly limited, but is preferably in the range of 0.12 to 2.4%/° C., and particularly preferably in the range of 0.5 to 1%/° C., from the viewpoint of even more accurately measuring the temperature of the measurement subject. Note that if the temperature detection portions (conductive heat-sensitive material) 21 are used in a temperature range smaller than 30° C. to 200° C., the change rate of the electrical resistance in the temperature range is in the range of 1 to 2.4%/° C., and thus the temperature of the measurement subject can be measured even more accurately. For example, from the viewpoint of even more accurately measuring the temperature of the measurement subject in a range of 30° C. to 150° C., it is preferable that the change rate of the electrical resistance value in the temperature range of 30° C. to 150° C. is in the above-described range. Also, for example, from the viewpoint of even more accurately measuring the temperature of the measurement subject in a range of 30° C. to 100° C., it is preferable that the change rate of the electrical resistance value in the temperature range of 30° C. to 100° C. is in the above-described range. Note that in the present embodiment, the values of the change rates of the electrical resistances of the temperature detection portions (conductive heat-sensitive material) 21 are values measured using the method disclosed in a later-described embodiment.

The volume resistivity in the temperature range of 30° C. to 200° C. of the temperature detection portion (conductive heat-sensitive material) 21 of the present embodiment is not particularly limited, but is preferably 10 Ω·cm to 100 Ω·cm, and more preferably 100 Ω·cm to 50 Ω·cm from the viewpoint of more accurately measuring the temperature of the measurement subject. Note that in the present embodiment, the value of the volume resistivity in the temperature range of 30° C. to 200° C. of the temperature detection portions (conductive heat-sensitive material) 21 is a value measured using the method disclosed in a later-described embodiment.

The conductive heat-sensitive material is formed into a sheet (thin film), but there is no particular limitation on the thickness thereof. Note that the thickness is preferably 100 μm or less, more preferably about 10 to 50 μm, and even more preferably about 20 to 40 μm from the viewpoint of even more accurately measuring the temperature of the measurement subject.

Next, ink for forming the above-described conductive heat-sensitive material will be described. The ink contains a solvent in addition to the above-described conductive particles and the above-described resin, and has a form in which the conductive particles and the resin are dispersed in the solvent. The sensor sheet of the present embodiment can be manufactured easily by, for example, applying the ink to the surfaces of the electrodes and drying the solvent.

The solvent used in the ink of the present embodiment is not particularly limited, as long as it can disperse the conductive particles and the resin and can be dried after being applied to the surfaces of the electrodes. Specific examples of the solvent include triethylene glycol dimethyl ether and N-methyl-2-pyrrholidone. It is possible to use only one type of solvent, and it is possible to use a combination of two or more types of solvent.

The percentage of the solvent in the ink is not particularly limited, and is about 20 to 40 mass %, for example. Also, it is sufficient that the amount of the conductive particles and the resin that is blended is set so as to achieve the content in the conductive heat-sensitive material after the solvent has dried.

The ink may contain a known component such as an anti-foaming agent in addition to the solvent.

There is no particular limitation on the method of applying the ink, and for example, the application can be performed using a known method. For example, an application method such as casting, dip coating, die coating, roll coating, a bar coater method, and spin coating; or various printing methods such as screen printing, an inkjet method, gravure printing, flexography printing, offset printing, and micro-contact printing can be employed thereas.

Method for Manufacturing Temperature Distribution Sensor Sheet

Figure 6:
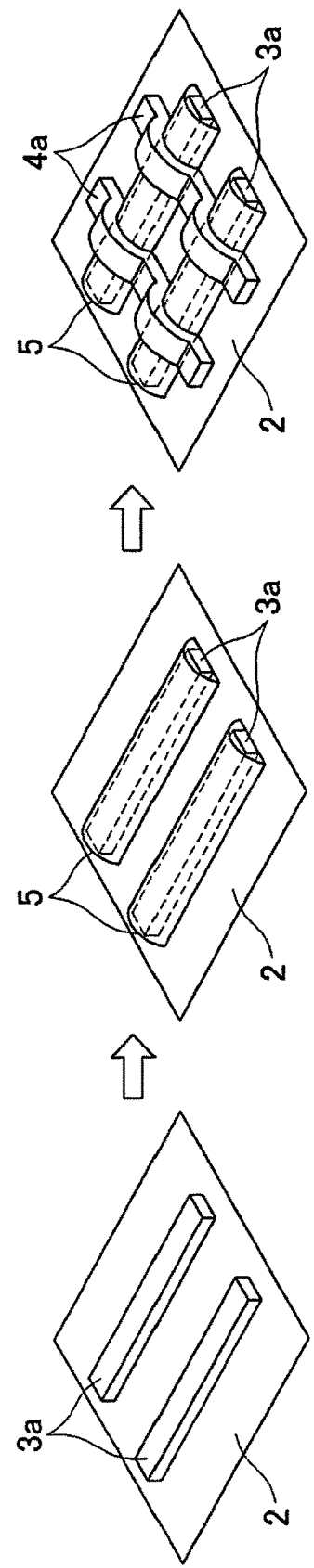
FIG. 6 is a diagram showing a method for manufacturing a temperature distribution sensor sheet.

Next, a method for manufacturing a temperature distribution sensor sheet 1 will be described with reference to FIG. 6. The temperature distribution sensor sheet 1 is manufactured as described below, for example. First, as shown in FIG. 6, the first wiring electrode group 3 is formed over the film base material 2 through screen printing. Next, the conductive heat-sensitive material 5 is formed over the first wiring electrodes 3a through screen printing. Next, the second wiring electrode group 4 is formed over the first wiring electrode group 3 through screen printing so as to sandwich the conductive heat-sensitive material 5.

Note that the first wiring electrode group 3, the second wiring electrode group 4, and the conductive heat-sensitive material 5 are formed through screen printing, but there is no limitation to this, and they may be formed using inkjet printing or a transfer method. Also, the first wiring electrode group 3 and the second wiring electrode group 4 may be wired using a substrate wiring technique (copper etching, or the like). Accordingly, it is possible to form an extremely thin (e.g., 0.1 mm) and flexible temperature distribution sensor sheet 1.

Note that the method for manufacturing the temperature distribution sensor sheet 1 is not limited to being that described above, and the first wiring electrode group 3, the conductive heat-sensitive material 5, and the second wiring electrode group 4 may be formed in the stated order on the film base material 2.

Sensor System

Figure 7:
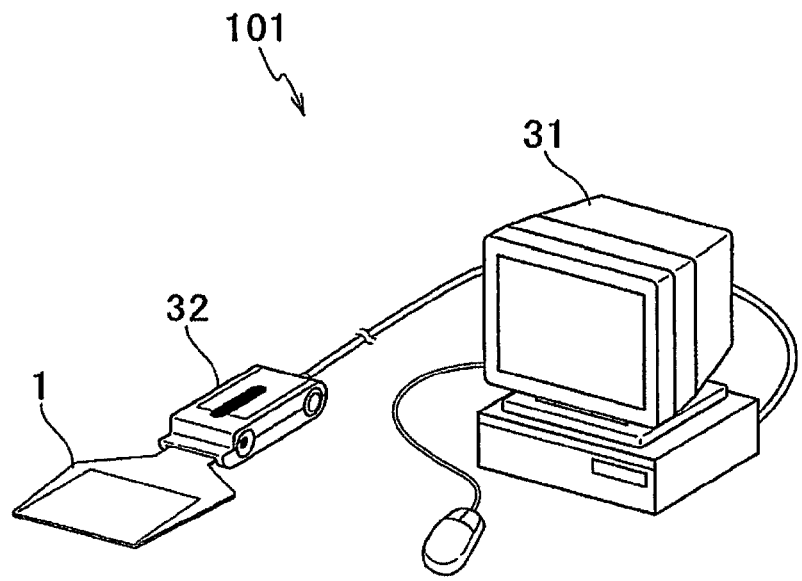
FIG. 7 is a diagram showing a configuration of a sensor system.

Next, a sensor system according to the present embodiment will be described. As shown in FIG. 7, which is an illustrative diagram, a sensor system 101 includes the temperature distribution sensor sheet 1, a PC (Personal Computer) 31, and a connector (electrical circuit) 32. The connector 32 is electrically connected by wire to the PC 31, but it may also be connected wirelessly.

The connector 32 supports the temperature distribution sensor sheet 1. Multiple terminals (not shown) are provided in the end portion region of the temperature distribution sensor sheet 1, and the terminals are each electrically connected to one of multiple contact points provided on the connector 32. Each of the multiple temperature detection portions 21 provided on the temperature distribution sensor sheet 1 is connected to a corresponding terminal via a wire.

The connector 32 acquires a change in an electromagnetic property of the temperature detection portion 21 as an output value. In order to apply a voltage or the like to the multiple temperature detection portions 21 in sequence, an electronic element known as a multiplexer is incorporated in the connector 32.

The connector 32 obtains the outputs in sequence from each of the multiple temperature detection portions 21 by applying voltages to the multiple temperature detection portions 21 in sequence. Specifically, when the first wiring electrodes 3a or the second wiring electrodes 4a are set to be drive electrodes and the others are set to be receive electrodes, the connector 32 applies the voltages to the multiple drive electrodes in sequence and measures the resistances of the multiple receive electrodes in sequence, and thereby obtains the outputs of each of the temperature detection portions 21. The resistances of the receive electrodes are inversely amplified by an operation amplifier and are obtained as voltage values. By setting the applied voltage and the amplification ratio of the output, it is possible to amplify the outputs as desired.

The connector 32 converts analog signals indicating temperature values output from the temperature detection portions 21 of the temperature distribution sensor sheet 1 into digital signals, and outputs the digital signals to the PC 31.

The PC 31 has a CPU (Central Processing Unit), which is an arithmetic processing apparatus, a hard disk and a ROM (Read Only Memory) on which a control program to be executed by the CPU and data to be used in the control program are stored, and a RAM (Random Access Memory) for primary storage of data during program execution.

Also, a sensor system 101 has a thermocouple (measuring device) (not shown) that measures the temperature of the same atmosphere as the temperature distribution sensor sheet 1. The thermocouple is installed in the connector 32, but there is no limitation to this, and it may be installed near the temperature distribution sensor sheet 1. The measurement signals output from the thermocouple are converted into digital signals and input into the PC 31. Note that the means for measuring the temperature of the atmosphere that is the same as the temperature distribution sensor sheet 1 is not limited to being a thermocouple. Also, it is possible to provide a measurement device that measures not only the temperature, but also the humidity of the same atmosphere as the temperature distribution sensor sheet 1, and the measurement device can be integrated with an apparatus that measures the temperature.

The PC 31 functions as a calculation unit that calculates a temperature distribution based on the output values obtained by each of the multiple temperature detection portions 21. By calculating the temperature distribution based on the output values obtained by each of the multiple temperature detection portions 21, the temperature distribution of the measurement subject can be measured.

Figure 8:
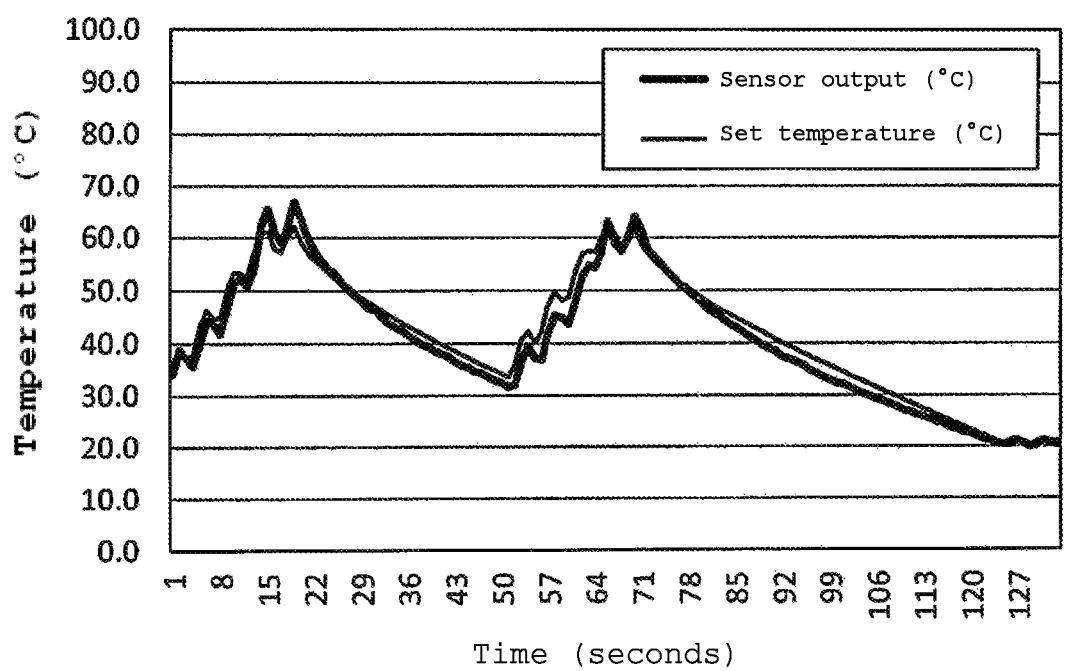
FIG. 8 is a diagram showing a relationship between sensor output and temperature.

The relationship between the sensor output and the temperature of a temperature distribution sensor is shown in FIG. 8. Here, the unit of the sensor output is temperature (° C.). It is known that by changing the temperature between 20° C. and 70° C., the sensor output changes following those changes.

Figure 9:
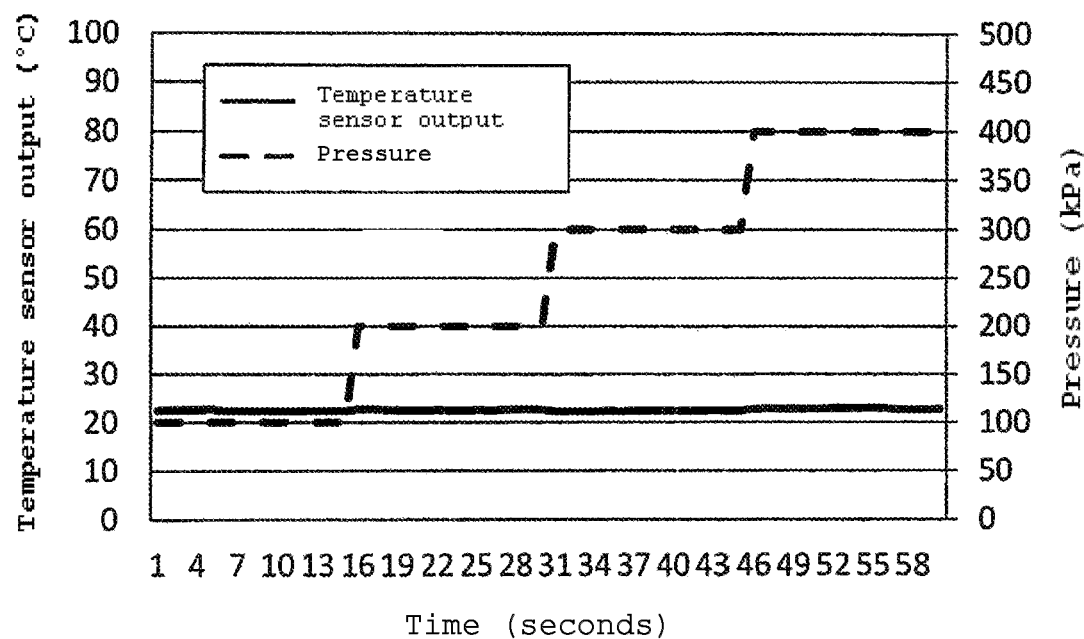
FIG. 9 is a diagram showing an output of a temperature distribution sensor when the temperature distribution sensor is pressed in a stepwise manner.

Also, FIG. 9 shows the output of a temperature distribution sensor at a time when the temperature distribution sensor is pressed in a stepwise manner at 100 kPa, 200 kPa, 300 kPa, and 400 kPa with the room temperature (22° C.) constant. It is understood that the temperature sensor output does not depend on the pressure.

Also, a program code for a calibration program according to the present embodiment is installed in the PC 31. Accordingly, the PC 31 functions as a control unit that performs equilibration processing and calibration processing.

Equilibration Processing Performed by Temperature Distribution Sensor

Figure 10:
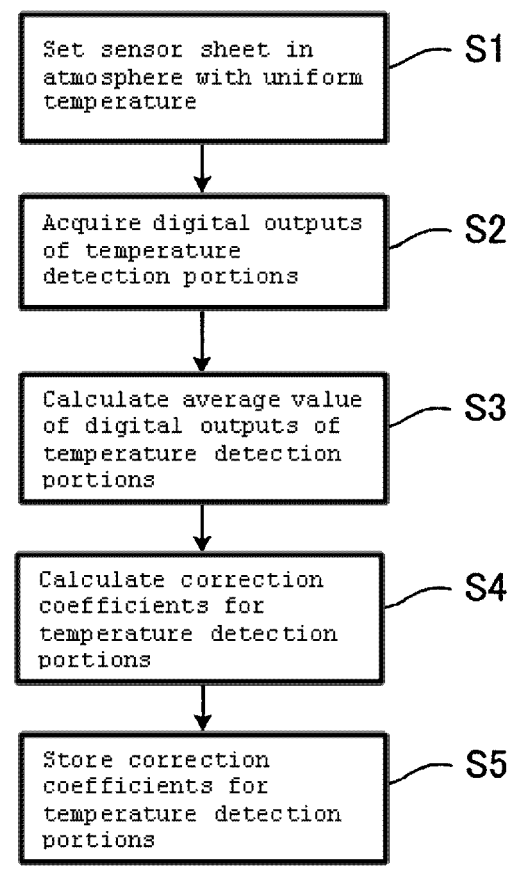
FIG. 10 is a flowchart showing equilibration processing for the temperature distribution sensor.

Next, equilibration processing for correcting a temperature distribution of the temperature distribution sensor will be described with reference to the flowchart shown in FIG. 10. Since the temperature distribution sensor sheet 1 includes multiple temperature detection portions 21, it is predicted that variation will occur in the outputs of the temperature detection portions 21. In view of this, all of the temperature detection portions 21 are held at a certain temperature, and the output values of the temperature detection portions 21 and the average value thereof are used to derive correction coefficients for correcting sensitivity differences between the temperature detection portions 21, whereby it is possible to correct the sensitivity differences between the multiple temperature detection portions 21 during actual measurement. When all of the temperature detection portions 21 are to be held at a certain temperature, a thermostatic chamber can be preferably used.

First, the temperature distribution sensor sheet 1 is attached to the connector 32. Also, the temperature distribution sensor sheet 1 is installed in an atmosphere with a uniform temperature (step S1). Then, the PC 31 acquires digital outputs from the temperature detection portions 21 (step S2).

Next, the PC 31 calculates the average value of the digital outputs of the temperature detection portions 21 (step S3). Then, the PC 31 calculates correction coefficients for the temperature detection portions 21 (step S4). Specifically, quotients obtained by dividing the average value by the output values are obtained as the correction coefficients for the temperature detection portions 21. Then, the PC 31 stores the correction coefficients for the temperature detection portions 21 (step S5). Specifically, the PC 31 generates a calibration file including the correction coefficients for the temperature detection portions 21 and stores the calibration file in a storage unit (RAM, hard disk, etc.).

As an example, FIG. 11(a) shows output values of the temperature detection portions 21 obtained from nine temperature detection portions 21 in the equilibration processing for a virtual temperature distribution sensor sheet 1 constituted by nine temperature measurement portions (heat-sensitive sensors) 21 arranged in three rows and three columns. Since the average value of the nine output values is 49.9, the average value is divided by each output value. The quotients obtained by dividing these values are the correction coefficients for the temperature detection portions 21 shown in FIG. 11(b).

The correction coefficients obtained in this manner are multiplied by the output values of the temperature detection portions 21 obtained using the temperature distribution sensor sheet 1 in an actual application, whereby the correction results shown in FIG. 11(c) are obtained. Accordingly, the sensitivity differences between the multiple temperature detection portions 21 in the temperature distribution sensor sheet 1 can be eliminated.

Note that in the above-described example, equilibration processing is performed using the output values obtained while the temperature detection portions 21 are held at one predetermined temperature, but the equilibration processing may be performed using output values obtained while the temperature detection portions 21 are held at two or more mutually different predetermined temperatures. In this case, the correction coefficients shown in FIG. 11(b) are obtained using two or more mutually different predetermined temperatures for the temperature detection portions 21, and the average value thereof may be derived as a fixed correction coefficient for the temperature detection portions 21. Alternatively, correction coefficients may be derived as a function of the temperature based on the correction coefficients obtained at the two or more mutually different temperatures.

Calibration Processing for Temperature Distribution Sensor

Figure 12:
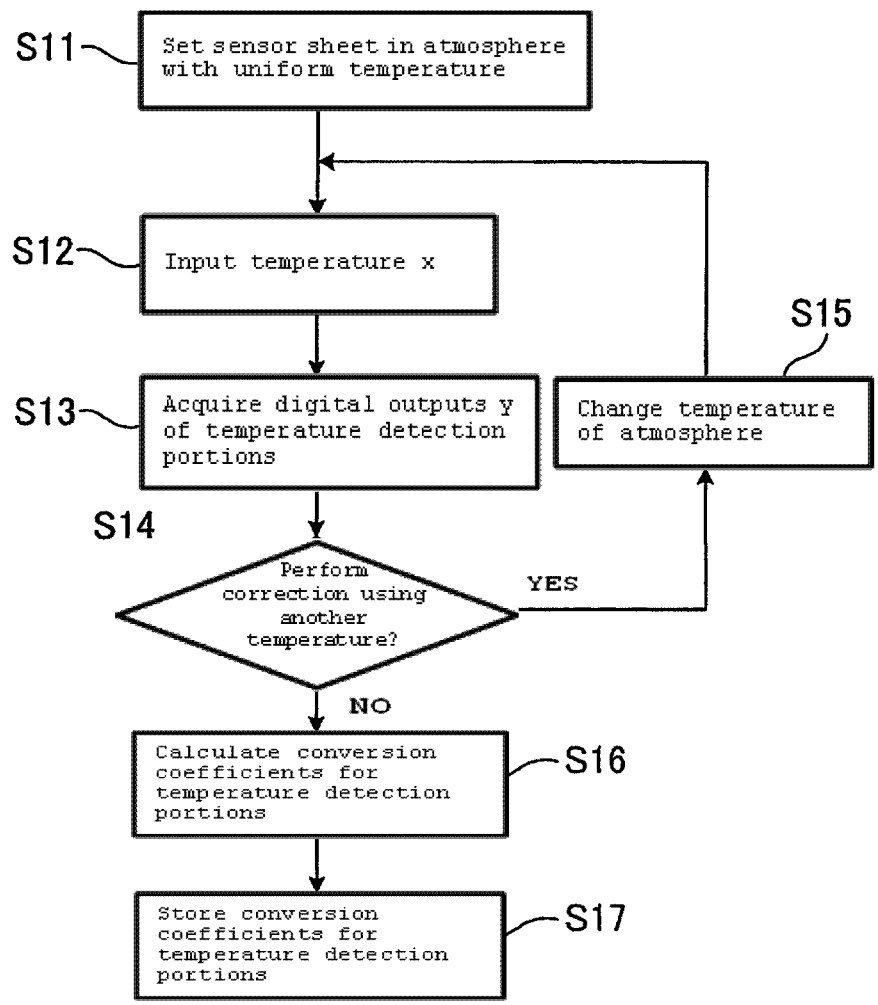
FIG. 12 is a flowchart showing equilibration processing for the temperature distribution sensor.

Next, calibration processing for correcting the output value of the temperature distribution sensor will be described with reference to the flowchart shown in FIG. 12. The calibration program of the present embodiment causes the sensor system 101 to operate so as to derive conversion coefficients for the output values from the temperature detection portions 21 with which temperature output values that correlate (linearly or non-linearly) to the temperature input value applied to the temperature detection portions can be obtained, based on output values from one or more temperature detection portions 21 of the temperature distribution sensor sheet 1 obtained when the one or more temperature detection portions 21 are held at a predetermined temperature. In other words, the sensor system 101 is caused to operate so as to perform calibration processing.

It is predicted that the outputs of the temperature detection portions 21 will not be outputs that are proportional to the actual temperature. In view of this, the output values of the temperature detection portions 21 are acquired in a state in which a known temperature is applied as the temperature input value, and a relational expression for the output values and the temperature input value (temperature conversion equation) is obtained. Then, conversion coefficients for the output values from the temperature detection portions 21 with which the temperature output values that correlate (linearly or non-linearly) to the temperature input value applied to the temperature detection portions 21 can be obtained are derived based on that temperature conversion equation. By multiplying the conversion coefficients by the output values of the temperature detection portions 21, it is possible to obtain temperature output values that correlate (linearly or non-linearly) to the temperature input value applied to the temperature detection portions 21.

First, the temperature distribution sensor sheet 1 is attached to the connector 32. Then, the temperature distribution sensor sheet 1 is installed in an atmosphere with a uniform temperature (step S11). Also, a thermocouple is installed in the same atmosphere as the temperature distribution sensor sheet 1. Then, a temperature value x measured by the thermocouple is input into the PC 31 (step S12). After that, the PC 31 acquires digital outputs y of the temperature detection portions 21 (step S13). Note that after the PC 31 acquires the digital outputs y of the temperature detection portions 21, the thermocouple may input the temperature value x measured by the thermocouple into the PC 31. The temperature can be input automatically by measuring the temperature of the same atmosphere as the temperature distribution sensor sheet 1 using the thermocouple. Also, calibration can be performed with a desired temperature by using the temperature value measured by the thermocouple as the temperature input value.

Next, it is determined whether or not correction according to another temperature is to be performed (step S14). As will be described later, in the case of performing linear correction or curvilinear correction using two points or more, it is determined that correction according to another temperature is to be performed (S14: YES), and the temperature of the atmosphere is updated (step S15). Then, steps S12 and S13 are repeated. In other words, the calibration program causes the sensor system 101 to operate so as to derive the conversion coefficients based on the output values from one or more temperature detection portions 21 of the temperature distribution sensor sheet 1 obtained when the one or more temperature detection portions 21 are held at multiple mutually different temperatures.

If it is determined in step S14 that correction using another temperature is not to be performed (step S14: NO), the PC 31 calculates the conversion coefficients (step S16). Specifically, in the case of linear correction, the inverse of the slope of the temperature conversion equation is obtained as the conversion coefficient for the output value from the temperature detection portion 21. Also, in the case of curvilinear correction, the function for the sensor output values is obtained as the conversion coefficient for the output values from the temperature detection portions 21. Here, the sensor output value is the sum of the output values from all of the temperature detection portions 21 in the temperature distribution sensor sheet 1. Then, the PC 31 stores the correction coefficients for the temperature detection portions 21 (step S17). Specifically, the PC 31 generates a calibration file including the conversion coefficients for the temperature detection portions 21 and the temperature conversion equation, and stores the calibration file in a storage means (RAM, hard disk, etc.).

As an example, in the case where the actual input-output characteristic of the temperature detection portions (heat-sensitive sensors) 21 is expressed as a straight line X1, as shown in FIG. 13(a), the sensor output values y1 (any unit Raw indicating signal strength) are obtained with respect to a temperature input value x1 (° C.). The temperature input value x1 in this context is the sum of the temperature values applied to all of the temperature detection portions 21 in the temperature distribution sensor sheet 1, and the sensor output value y1 means the sum of the output values from all of the temperature detection portions 21 in the temperature distribution sensor sheet 1. The PC 31 obtains a segment b by substituting a known temperature change rate (slope) a and y1, x1 into the equation y=ax+b. Note that the known temperature change rate a is acquired in advance through experimentation.

Also, as an example, if the actual input-output characteristic of the temperature detection portions 21 is expressed by a straight line X2, as shown in FIG. 13(b), the sensor output value y1 (any unit Raw indicating signal strength) is obtained with respect to a temperature input value x1 (° C.) and the sensor output value y2 is obtained with respect to a temperature input value x2. The temperature input values x1 and x2 in this context are the sums of the temperature values applied to all of the temperature detection portions 21 in the temperature distribution sensor sheet 1, and the sensor output values y1 and y2 mean the sum of the output values from all of the temperature detection portions 21 in the temperature distribution sensor sheet 1. The PC 31 obtains the slope a and the segment b by substituting these two values into the equation y=ax+b.

Figure 13:
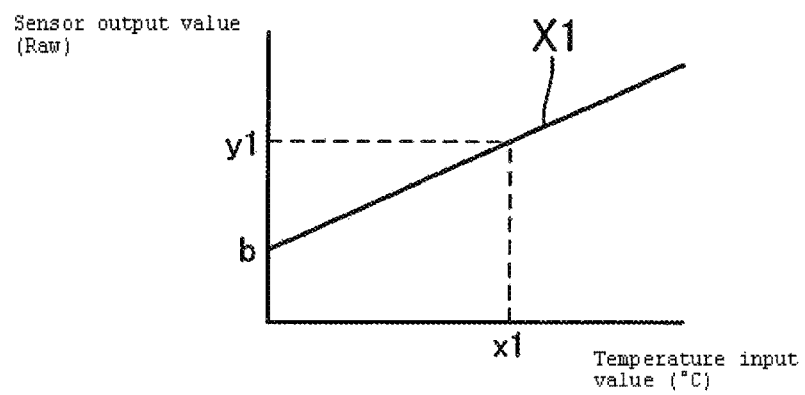
FIG. 13 is a diagram for describing calibration processing.
Figure 13:
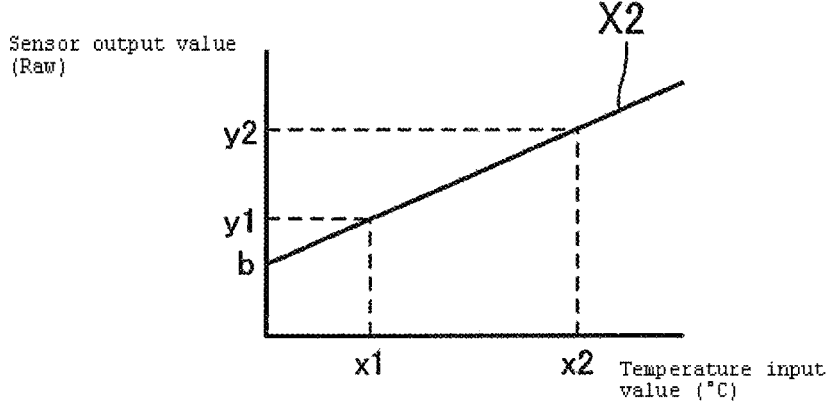
Figure 13:
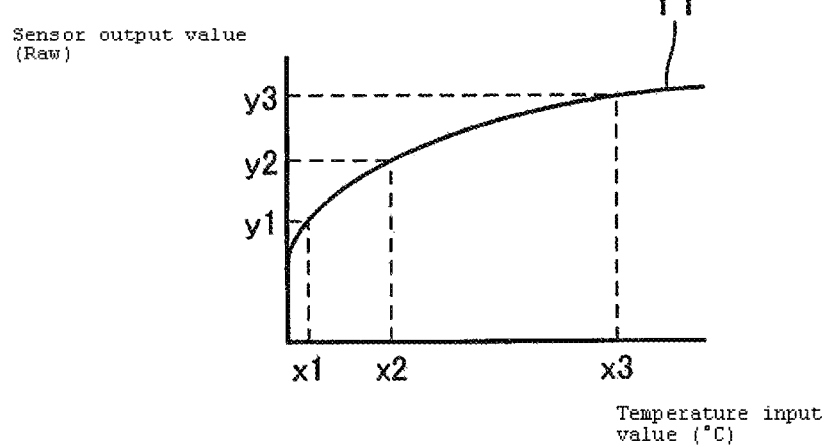

Also, as an example, if the actual input-output characteristic of the temperature detection portions 21 is expressed by a curved line Y1, as shown in FIG. 13(*c*), the sensor output value y1 (any unit Raw indicating signal strength) is obtained with respect to a temperature input value x1 (° C.), the sensor output value y2 is obtained with respect to a temperature input value x2, and the sensor output value y3 is obtained with respect to a temperature input value x3. The temperature input values x1, x2, and x3 in this context are the sums of temperature values applied to all of the temperature detection portions 21 in the temperature distribution sensor sheet 1, and the sensor output values y1, y2, and y3 mean the sum of the output values from all of the temperature detection portions 21 in the temperature distribution sensor sheet 1. The PC 31 obtains the slope a using a least squares method based on the three points and a known curve function (logarithmic curve, power curve). Specifically, in the case of a logarithmic curve, the slope a and the segment b are obtained. In the case of a power curve, the slope a and exponent b are obtained.

The conversion coefficients obtained in this manner are multiplied by the output values from the temperature detection portions 21 obtained using the temperature distribution sensor sheet 1 in the actual application, whereby it is possible to obtain a temperature output value that is almost the same value as the temperature input value input to the temperature detection portions 21.

Note that in the above-described example, the calibration processing is performed using all of the temperature detection portions 21 in the temperature distribution sensor sheet 1, but it is also possible to perform the calibration processing on a portion (or one) of all of the temperature detection portions 21. In this case, in order to increase the accuracy of the conversion coefficient, it is preferable to obtain a temperature conversion equation with respect to the corrected output values obtained by first performing equilibration processing and multiplying the correction coefficients by the output values.

Verification Processing

The PC 31 generates and stores the calibration file including the correction coefficients for each temperature detection portion 21 obtained in the equilibration processing, the conversion coefficients obtained in the calibration processing, and the temperature conversion equation. The calibration file may include the correction coefficients for each temperature detection portion 21 and the conversion coefficients, and may include the products obtained by multiplying the conversion coefficients by the correction coefficients as the calibration coefficients for the temperature detection portions 21.

The calibration program causes the sensor system 101 to operate so as to determine whether or not the temperature output values obtained by multiplying the conversion coefficients by the output values of the temperature detection portions 21 match the temperature input value applied to the temperature detection portion 21. That is, the PC 31 determines whether or not the temperature output value corrected by multiplying the conversion coefficients by the output values from the temperature detection portions 21 matches the temperature value (temperature input value) measured by the thermocouple.

Specifically, two or more mutually different temperature input values are applied to the temperature detection portions 21, the correction coefficients and the conversion coefficients are multiplied by the output values, and thus the temperature output values are derived. Then, the temperature output values are compared to the corresponding temperature input values to check whether or not they fall within a predetermined error range. Note that it is also possible to derive the temperature output values by multiplying only the conversion coefficients by the output values.

For example, if the individual output values of the temperature detection portions 21 are D1=121 raw, D2=130 raw, D3=142 raw, and D4=111 raw and the corrected temperature output values are D1=100° C., D2=100° C., D3=101° C., and D4=100° C. in a 100° C. environment, the error is ±1%, and it can be determined that the temperature conversion equation fits the temperature distribution sensor. However, if the temperature distribution sensor does not match the temperature conversion equation, for example, if the temperature distribution sensor sheet 1 is exchanged, or if partial sensitivity change occurs due to degradation, wear, or the like of the temperature detection portion 21, deviation will occur such that D1=112° C., D2=102° C., D3=109° C., and D4=103° C. in the corrected temperature output values. By comparing the size of the deviation with a threshold value set as desired in advance, it is possible to know the degree of matching between the temperature output value and the temperature input value. This is performed for all of the temperature detection portions 21 in the temperature distribution sensor sheet 1. Also, a message such as "Calibration file does not match temperature distribution sensor sheet", "match percentage: 99.8%", or "Please exchange temperature distribution sensor sheet or carry out calibration once again" is displayed on a display. Accordingly, support for carrying out accurate measurement is possible. If there is a temperature detection portion 21 that does not fall within the predetermined error range, it is treated as a defect, or the equilibration processing and calibration processing are performed once again.

Also, the calibration program causes the sensor system 101 to operate so as to store conversion coefficients for each of multiple temperature distribution sensor sheets 1 and select the conversion coefficients that are optimal for the temperature distribution sensor sheet 1 that is to be used. In other words, the PC 31 stores a calibration file for each of the multiple temperature distribution sensor sheets 1 and selects the calibration file that is optimal for the temperature distribution sensor sheet 1 that is to be used.

For example, in order to distinguish the calibration file A1 that was obtained from a specific temperature distribution sensor A (temperature distribution sensor sheet A) and stored from the calibration files B1 and C1 that were obtained from the other temperature distribution sensors B and C (temperature distribution sensor sheets B and C), degrees of matching between the output values acquired from the temperature detection portions 21 of the temperature distribution sensors A at room temperature or a specific temperature and the calibration files A1, B1, and C1 are calculated. By thus applying (correcting) the specific optimal calibration file to the output values from the temperature detection portions 21, it is possible to perform accurate measurement. Here, by generating the calibration file from the output values acquired in advance in multiple temperature regions, it is possible to perform more accurate measurement compared to the case of using a calibration file generated using the output values obtained in a single temperature region.

Note that it is thought that the temperature detection portions 21 degenerate due to the electrical properties changing due to moisture absorption, or due to the conductive heat-sensitive material 5 degrading and being altered due to hydrolysis. In contrast to this, it is also possible to measure the humidity of the same environment as the temperature distribution sensor sheet 1 using the above-described measuring device, and to determine the above-described conversion coefficients based on the measured humidity. Accordingly, calibration in a desired humidity is performed accordingly, and the sensor system 101 can be caused to operate using conversion coefficients that correspond to the measured humidity. This kind of function can also be included in the calibration program.

Effect

As stated above, the temperature distribution sensor sheet 1 according to the present embodiment is manufactured by forming the conductive heat-sensitive material over the first wiring electrodes 3a and forming the second wiring electrodes 4a over the conductive heat-sensitive material 5, and therefore no adhesive surface (boundary surface), which is formed when adhesion is performed later, exists between the first wiring electrodes 3a and the conductive heat-sensitive material 5 and between the conductive heat-sensitive material 5 and the second wiring electrode 4a. Accordingly, the electromagnetic property of the heat-sensitive material 5 does not change due to pressure applied to the adhesion surface when the temperature of the measurement subject is detected, and therefore no disturbance occurs in the resistance values that change in the temperature detection portions 21. Accordingly, the temperature of the measurement subject can be measured accurately.

Also, by making the thickness from the first wiring electrodes 3a to the second wiring electrodes 4a uniform, it is possible to prevent the pressure applied by the measurement subject from being concentrated on the temperature detection portions 21 during measurement of the temperature distribution. As a result, since no warping occurs in the conductive heat-sensitive material 5 provided at the temperature detection portions 21, it is possible to prevent the occurrence of a heat measurement error. Also, it is possible to prevent indentations from occurring on the measurement subject to which the temperature distribution sensor sheet 1 is pressed.

Also, by covering the temperature detection portions 21 with an insulating material (a protective film base material 8 or the like), it is possible to prevent degeneration caused by the electrical characteristics of the temperature detection portions 21 changing due to moisture absorption, and to prevent the conductive heat-sensitive material 5 from deteriorating and being altered due to hydrolysis.

Also, with the sensor system 101 according to the present embodiment, by calculating the temperature distribution based on the output values obtained by each of the multiple temperature detection portions 21, the temperature distribution of the measurement subject can be measured.

Also, the temperature can be input automatically by measuring the temperature of the same atmosphere as the temperature distribution sensor sheet 1 using the thermocouple. Also, with the calibration program according to the present embodiment, conversion coefficients for the output values from the temperature detection portions 21 with which temperature output values that correlate (linearly or non-linearly) to the temperature input value applied to the temperature detection portions 21 can be obtained are derived. It is predicted that the output values of the temperature detection portions 21 will not be values that are proportional to the actual temperature. In view of this, the temperature conversion equation indicating the relationship between the output values from one or more temperature detection portions 21 and the temperature input value applied to the one or more temperature detection portions 21 is derived. Also, the conversion coefficients are derived based on the temperature conversion equation and the conversion coefficients are multiplied by the output values of the temperature detection portions 21. This makes it possible to obtain temperature output values that are almost the same as the temperature input values input to the temperature detection portions 21. Accordingly, it is possible to obtain the correct temperatures for the output values of the temperature detection portions 21.

Also, the conversion coefficients are derived based on the output values from one or more temperature detection portions 21 of the temperature distribution sensor sheet 1 obtained when the one or more temperature detection portions 21 are held at multiple mutually different temperatures. By holding the one or more temperature detection portions 21 at the multiple mutually different temperatures, it is possible to obtain a temperature conversion equation in which the temperature and the output are not in a proportional linear relationship. Accordingly, it is possible to derive conversion coefficients that are more accurate than conversion coefficients derived by holding the temperature detection portions 21 at a single temperature.

Also, the temperature output values obtained by multiplying the conversion coefficients by the output values of the temperature detection portions 21 match the temperature input value applied to the temperature detection portions 21. For example, if the temperature distribution sensor sheet 1 is exchanged, or if partial sensitivity change occurs due to degradation, wear, or the like of the temperature detection portion 21, deviation will occur in the corrected temperature output values. By comparing the size of the deviation with a threshold value set as desired in advance, it is possible to know the degree of matching between the temperature output value and the temperature input value. Accordingly, it is possible to avoid a case in which measurement is performed in a state in which an error has occurred.

Also, calibration can be performed at any temperature by using the temperature values measured by the thermocouple included in the sensor system 101.

Also, conversion coefficients are stored for each of multiple temperature distribution sensor sheets 1 and the conversion coefficients that are optimal for the temperature distribution sensor sheet 1 that is to be used are selected. For example, the optimal conversion coefficients are specified by calculating the matching percentages between the output values acquired from the temperature detection portions 21 at room temperature or a specific temperature and the multiple conversion coefficients. By thus applying the conversion coefficients to the output values from the temperature detection portions 21, it is possible to perform accurate measurement.

Variation

Although embodiments of the present invention have been described above, these are merely specific examples and do not particularly limit the present invention. Specific configurations and the like can be designed and modified as appropriate. Also, the actions and effects disclosed in the embodiment of the invention are merely the most preferable actions and effects that occur due to the present invention, and the actions and effects of the present invention are not limited to those disclosed in the embodiment of the present invention.

For example, the temperature distribution sensor may be obtained by providing the first wiring electrode group 3 and the second wiring electrode group 4 spaced apart from each other on the same film base material 2, and providing the conductive heat-sensitive material 5 on the region including the end portions of the first wiring electrode group 3 and the end portions of the second wiring electrode group 4. Even in this case, if the pressure applied to the conductive heat-sensitive material 5 is a predetermined value or less, by preventing the area of contact between the first wiring electrodes 3a and the conductive heat-sensitive material 5 and the area of contact between the second wiring electrodes 4a and the conductive heat-sensitive material 5 from changing, it is possible to prevent disturbances from occurring in the electromagnetic properties that change in the conductive heat-sensitive material 5.

Figure 14:
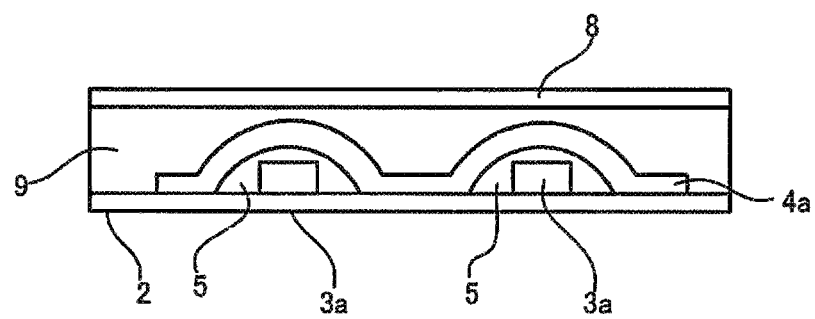
FIG. 14 is a cross-sectional view showing another example of a temperature distribution sensor sheet.

Also, as shown in FIG. 14, it is possible for the insulating material 9 to fill the entirety of the gap between the protective film 8 and the film base material 2. Accordingly, the distance between the protective film 8 and the film base material 2 is the same over the entirety of the sensor sheet, and pressure can be applied evenly. In other words, the locations at which the first and second wiring electrode groups 3 and 4 intersect protrude from the film base material 2 as shown in FIG. 6 for example, and therefore the pressure tends to be concentrated, but as shown in FIG. 14, a case is suppressed in which the pressure acts in a concentrated manner at this location, and the wiring electrode group and the like can be protected. Note that as the manufacturing method, for example, in FIG. 6, after the second wiring electrode group 4a is formed, the insulating material is formed so as to cover the entirety of the film base material 2, and thereafter the protective film 8 need only be arranged.

B. Temperature-Pressure Distribution Sensor Sheet

Hereinafter, a preferable embodiment of a sensor sheet that can measure the temperature and the pressure of the present invention will be described with reference to the drawings. Hereinafter, configurations that are the same as those of the above-described temperature distribution sensor sheet are denoted by the same reference signs and description thereof is not included in some cases.

Configuration of Sensor Sheet

The sensor sheet according to the embodiment of the present invention measures a temperature distribution and a pressure distribution. The sensor sheet includes a temperature distribution sensor that measures a temperature distribution and a pressure distribution sensor that measures a pressure distribution. The temperature distribution sensor is obtained by aligning, in two dimensions, multiple heat-sensitive sensors having electromagnetic properties such as resistances that change according to a change in temperature. Also, the temperature distribution sensor is obtained by aligning, in two dimensions, multiple heat-sensitive sensors having electromagnetic properties such as resistances that change according to a change in temperature.

This kind of sensor sheet can be used in a similar application as the above-described temperature distribution sensor sheet.

As shown in FIGS. 15 to 18, the sensor sheet 1 includes a film base material 2, a first wiring electrode group 3 provided over the film base material 2, a second wiring electrode group 4 provided over the first wiring electrode group 3, and a conductive heat-sensitive material 5 provided between the first wiring electrode group 3 and the second wiring electrode group 4. Note that the configuration for measuring the temperature distribution is the same as that of the above-described temperature distribution sensor sheet, and therefore no specific description thereof is included here. For example, the configuration for measuring the temperature distribution in the descriptions according to FIGS. 15 to 18 is the same as that of the temperature distribution sensor sheet.

Figure 15:
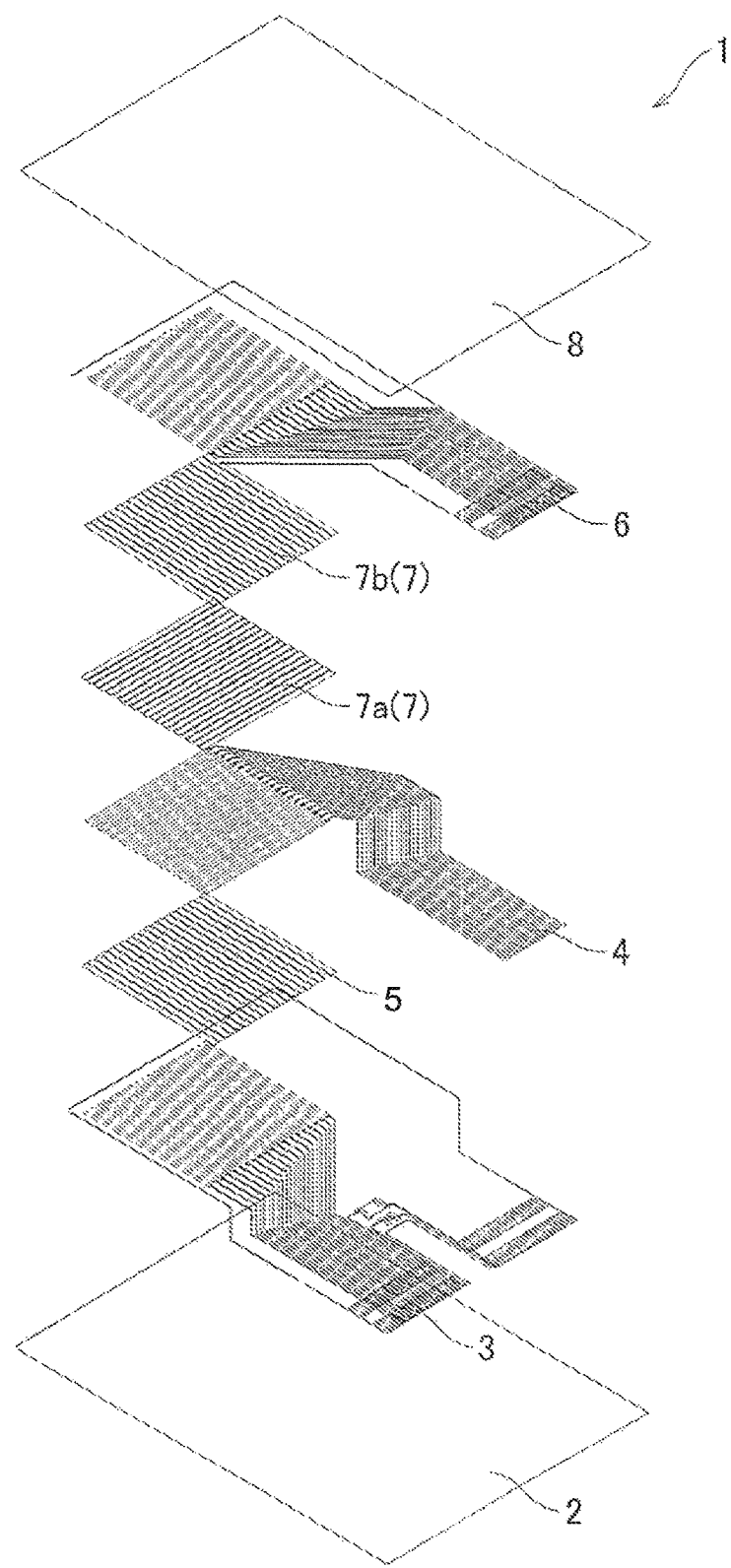
FIG. 15 is a perspective exploded view showing a temperature-pressure distribution sensor sheet.

Next, a configuration for measuring the pressure distribution will be described. As shown in FIG. 15, the sensor sheet 1 according to the present embodiment includes a third wiring electrode group 6 arranged over the second wiring electrode group 4 and a conductive pressure-sensitive material 7 provided between the second wiring electrode group 4 and the third wiring electrode group 6. The conductive pressure-sensitive material 7 is composed of a pair of conductive pressure-sensitive materials 7a and 7b (a first portion and a second portion), but there is no limitation to this, and a single conductive pressure-sensitive material may be used. In this case, for example, the second wiring electrode group 4 and the conductive pressure-sensitive material 7 are fixed, and the conductive pressure-sensitive material 7 and the third wiring electrode group 6 can be separatably brought into contact with each other. Alternatively, the third wiring electrode group 6 and the conductive pressure-sensitive material 7 are fixed, and the conductive pressure-sensitive material 7 and the second wiring electrode group 4 can be separatably brought into contact with each other. This is the same as in the following embodiment as well, and if the conductive pressure-sensitive material is arranged between a pair of electrodes, the conductive pressure-sensitive material is divided into two and fixed to the electrodes, and the divided conductive pressure-sensitive materials need only be separatably brought into contact with each other. Alternatively, the conductive pressure-sensitive materials need only be integrated, fixed to one of the electrodes, and separatably brought into contact with the other electrode.

Figure 16:
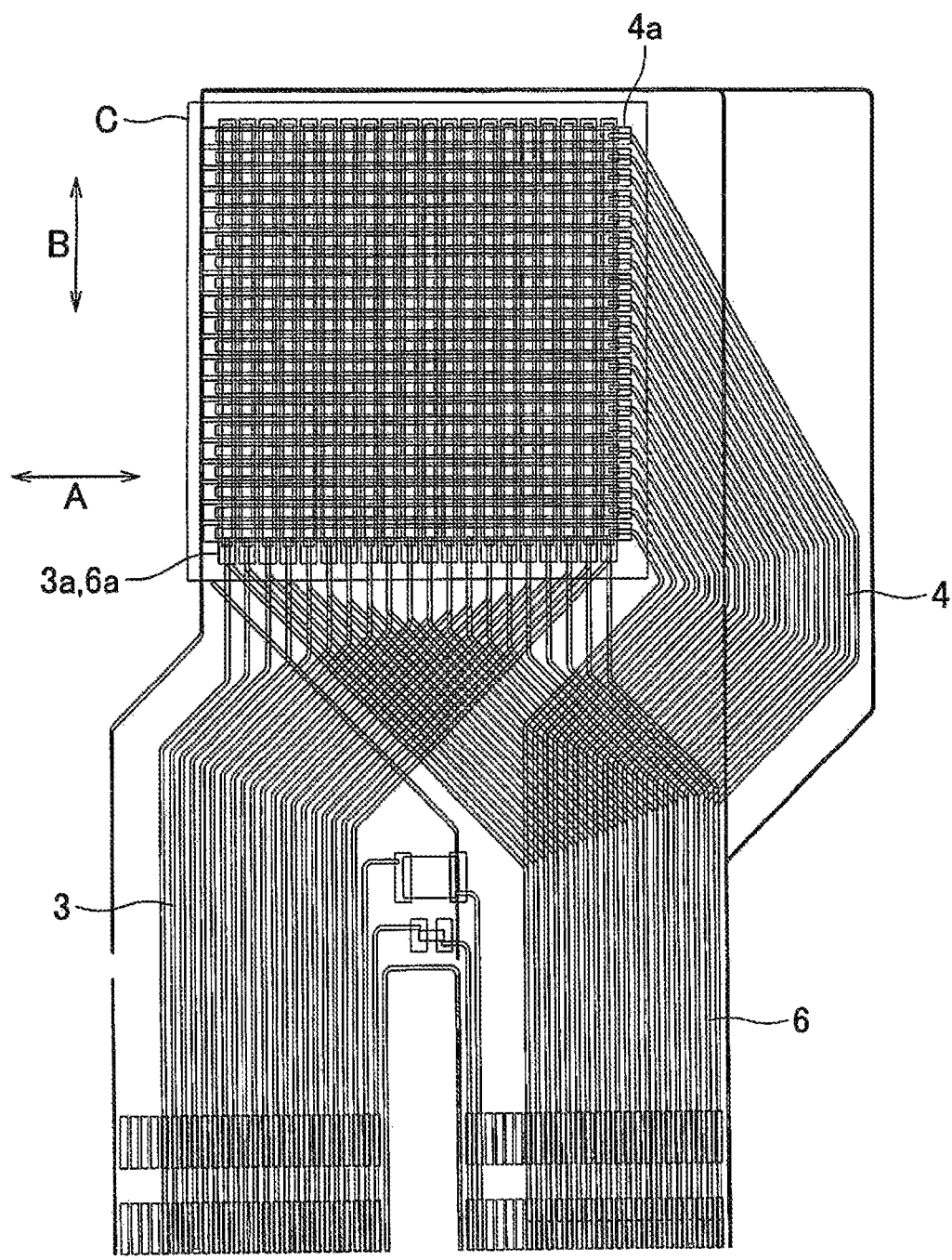
FIG. 16 is a plan view showing a temperature-pressure distribution sensor sheet.

As shown in FIG. 16, the third wiring electrode group 6 is formed by arranging multiple linear third wiring electrodes 6a in parallel in the A direction (third direction). Note that in the present embodiment, the direction (first direction) in which the first wiring electrodes 3a of the first wiring electrode group 3 are arranged in parallel and the direction (third direction) in which the third wiring electrodes 6a of the third wiring electrode group 6 (third direction) are arranged in parallel are the same, but there is no limitation to this. The direction (third direction) in which the third wiring electrodes 6a of the third wiring electrode group 6 are arranged in parallel is not particularly limited.

Figure 17:
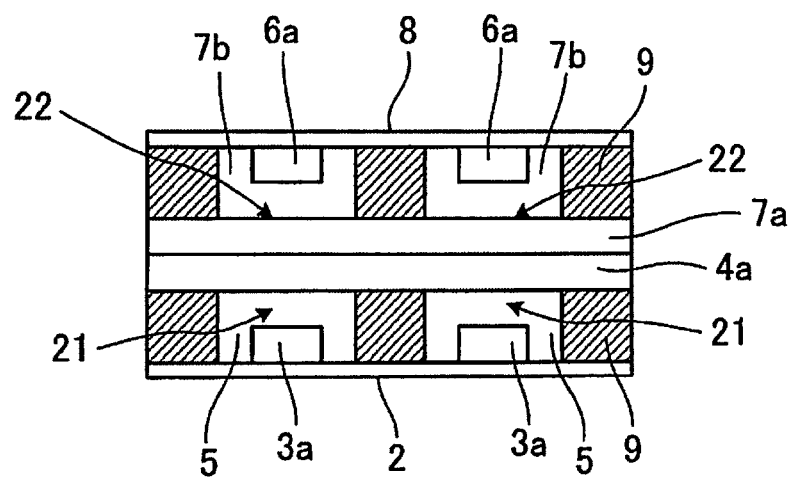
FIG. 17 is a cross-sectional view showing a temperature-pressure distribution sensor sheet.

As shown in FIG. 17, the conductive pressure-sensitive material 7a is provided so as to cover the multiple second wiring electrodes 4a. The conductive pressure-sensitive material 7b is provided so as to cover the multiple third wiring electrodes 6a. However, the conductive pressure-sensitive material 7a and the conductive pressure-sensitive material 7b need only be provided at least at later-described pressure detection portions 22 and between the second wiring electrodes 4a and the third wiring electrodes 6a. Here, the pressure detection portions 22 are locations at which the second wiring electrodes 4a and the third wiring electrodes 6a intersect.

Figure 18:
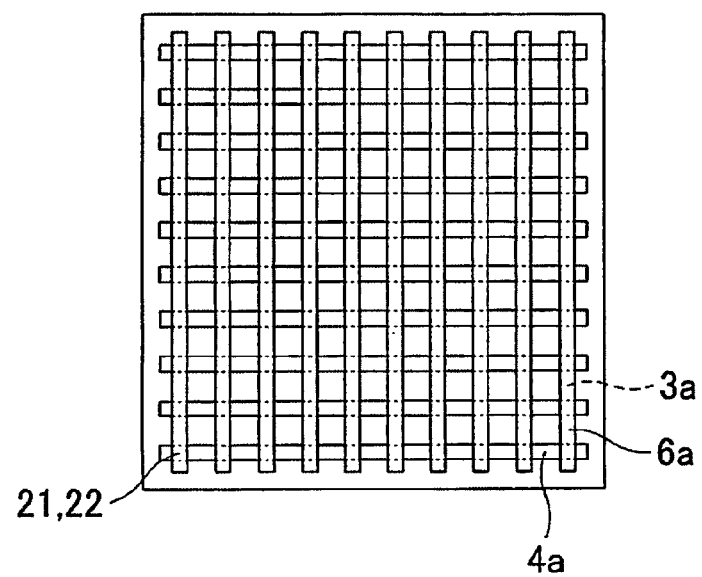
FIG. 18 is an enlarged view of a relevant portion C shown in FIG. 16.

The second wiring electrode group 4, the third wiring electrode group 6, and the conductive pressure-sensitive material 7 form a pressure distribution sensor. As shown in FIG. 18, each temperature detection portion 22, which is a location at which a second wiring electrode 4a and a third wiring electrode 6a intersect, functions as a pressure-sensitive sensor.

When pressure is applied to the pressure detection portion 22 in the direction in which the second wiring electrode group 4 and the third wiring electrode group 6 are stacked, the conductive pressure-sensitive material 7a and the conductive pressure-sensitive material 7b that oppose each other come into contact and the area of contact changes, whereby the electrical resistance between the pair of conductive pressure-sensitive materials 7a and 7b changes. The electrical resistance is transferred from the pressure detection portion 22 to a power source through the second wiring electrode 4a and the third wiring electrode 6a. Accordingly, the resistance value is measured. The pressure applied to the temperature detection portions 22 can be detected using the measured resistance value.

Note that the resistance values of the pressure detection portions 22 decrease as the applied pressure increases, but the resistance values may increase as the applied pressure increases. Also, an electromagnetic property of the pressure detection portion 22 other than the resistance value, such as a charge amount or an induction current, may change according to the amount of the pressure.

The third wiring electrodes 6a are composed of metal foil such as silver foil, copper foil, or aluminum foil, conductive polymer, or the like, similar to the first wiring electrode 3a and the second wiring electrode 4a. The conductive pressure-sensitive material 7 is formed by adding a binder to conductive particles, similarly to the conductive heat-sensitive material 5. In the present embodiment, the conductive heat-sensitive material 5 and the conductive pressure-sensitive material 7 are formed of the same composition, but they may be different. By adjusting the respective compositions, it is possible to use the same electronic circuits that are needed for measurement.

Note that in the present embodiment, as shown in FIG. 15, the second wiring electrode group 4 is used along with the temperature distribution sensor and the pressure distribution sensor, but there is no limitation to this configuration. The fourth wiring electrode group is provided between the second wiring electrode group 4 and the conductive pressure-sensitive material 7a, and the conductive pressure-sensitive material 7a may be provided so as to cover the fourth wiring electrodes constituting the fourth wiring electrode group. According to this configuration, the temperature distribution sensor is formed by the first wiring electrode group 3, the second wiring electrode group 4, and the conductive heat-sensitive material 5, and the pressure distribution sensor is constituted by the fourth wiring electrode group, the third wiring electrode group 6, and the conductive pressure-sensitive material 7. The specific configuration will be described later.

Furthermore, as shown in FIG. 15, the sensor sheet 1 has a protective film base material 8 provided above the third wiring electrode group 6. The protective film base material 8 is composed of a flexible material such as polyimide or PET, similarly to the film base material 2.

Here, in the present embodiment, as shown in FIG. 17, the sensor sheet 1 is manufactured by forming the conductive heat-sensitive material 5 over the first wiring electrodes 3a and forming the second wiring electrodes 4a over the conductive heat-sensitive material 5. That is, the first wiring electrodes 3a and the conductive heat-sensitive material 5 are fixed in close contact with each other, and the conductive heat-sensitive material 5 and the second wiring electrodes 4a are fixed in close contact with each other. For this reason, no adhesion surface (boundary surface), which is formed when adhesion is performed later, exists between the first wiring electrode 3a and the conductive heat-sensitive material 5 and between the conductive heat-sensitive material 5 and the second wiring electrodes 4a. This aspect is the same as with the above-described temperature distribution sensor sheet.

Also, in the present embodiment, as shown in FIG. 18, the region in which the multiple temperature detection portions 21 are arranged and the region in which the multiple pressure detection portions 22 are arranged overlap. Thus, by overlapping the region in which the multiple temperature detection portions 21 are arranged and the region in which the multiple pressure detection portions 22 are arranged, it is possible to form the sensor sheet 1 compactly. Accordingly, since the temperature detection portion 21 and the pressure detection portion 22 are arranged at the same location on the measurement subject, it is possible to measure the temperature and the pressure at the same time and at the same location on the measurement subject.

Note that in the present embodiment, as shown in FIG. 18, the temperature detection portions 21 and the pressure detection portions 22 overlap in plan view, but they need not overlap. This will be described in a later-described modified example.

As shown in FIG. 17, the insulating material 9 is provided between the temperature detection portions 21 and between the pressure detection portions 22. Accordingly, the thickness from the first wiring electrodes 3a to the third wiring electrodes 6a is made uniform.

By making the thickness from the first wiring electrodes 3a to the third wiring electrodes 6a uniform, it is possible to prevent the pressing force applied by the measurement subject from being concentrated on the temperature detection portions 21 and the pressure detection portions 22 during measurement of the temperature distribution and the pressure distribution. As a result, since no warping occurs in the conductive heat-sensitive material 5 provided at the temperature detection portions 21, it is possible to prevent the occurrence of a heat measurement error. Also, since the level differences between the pressure detection portion 22 and the others can be eliminated, it is possible to prevent the occurrence of a pressure measurement error caused by a level difference. Also, it is possible to prevent the occurrence of indentations on the measurement subject onto which the sensor sheet 1 is pressed.

Figure 19:
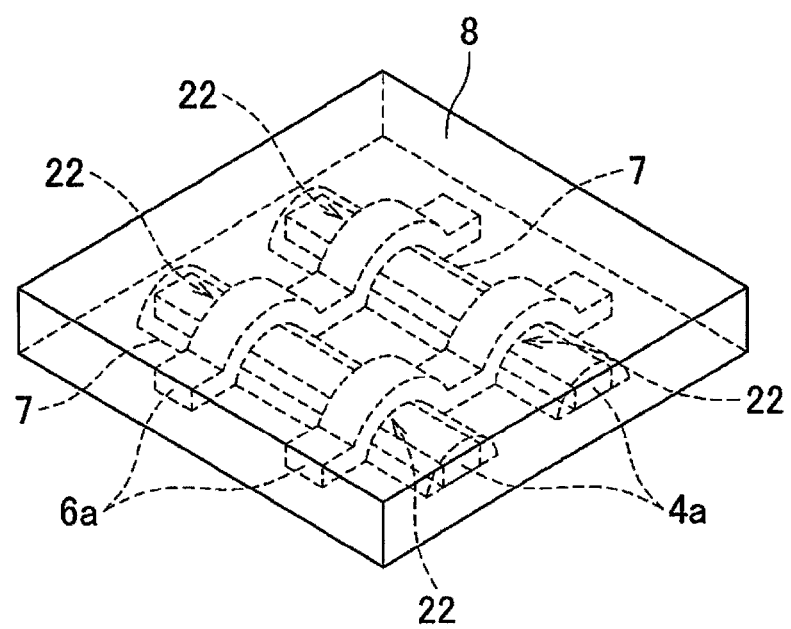
FIG. 19 is a perspective view showing a temperature-pressure distribution sensor sheet.

Also, as shown in FIG. 19, which is a perspective view, a protective film base material 8 composed of an insulating material is provided over the third wiring electrode group 6. Accordingly, the surfaces of the third wiring electrodes 6a are protected, and short-circuiting of the third wiring electrodes 6a is prevented.

By covering the pressure detection portions 22 with the protective film base material 8 and an insulating material such as an insulating resin material, it is possible to prevent the electromagnetic property of the temperature detection portions 22 from changing due to moisture absorption and to prevent the conductive pressure-sensitive material 7 from deteriorating and being altered due to hydrolysis.

Method for Manufacturing Sensor Sheet

Figure 20:
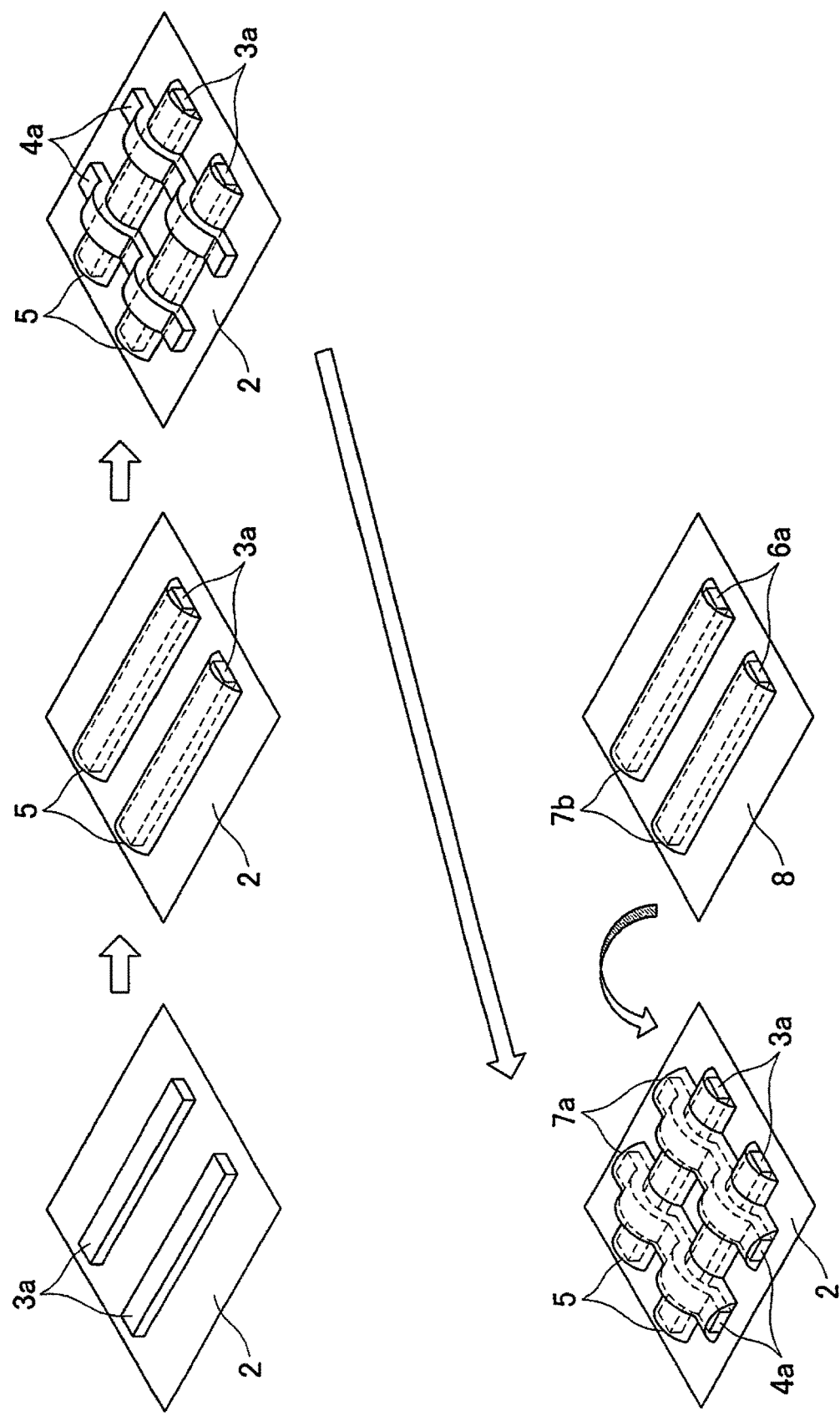
FIG. 20 is a perspective view showing a method for manufacturing a temperature-pressure distribution sensor sheet.

Next, a method for manufacturing the sensor sheet 1 will be described with reference to FIG. 20. The sensor sheet 1 is manufactured as described below, for example. First, as shown in FIG. 20, the first wiring electrode group 3 is formed over the film base material 2 through screen printing. Next, the conductive heat-sensitive material 5 is formed over the first wiring electrodes 3a through screen printing. Next, the second wiring electrode group 4 is formed over the first wiring electrode group 3 through screen printing so as to sandwich the conductive heat-sensitive material 5. Thereafter, the conductive pressure-sensitive material 7a is formed over the second wiring electrodes 4a through screen printing.

Meanwhile, the third wiring electrode group 6 is formed over the protective film base material (second film base material) 8 through screen printing. Next, the conductive pressure-sensitive material 7b is formed over the third wiring electrodes 6a through screen printing. Thereafter, the film base material 2 and the protective film base material 8 are adhered to each other so that the second wiring electrode group 4 and the third wiring electrode group 6 face each other. At this time, the conductive pressure-sensitive material 7a over the second wiring electrodes 4a and the conductive pressure-sensitive material 7b over the third wiring electrodes 6a are in contact, but do not necessarily need to be fixed. In other words, if the protective film base material is separated from the film base material, it is possible to make the conductive pressure-sensitive materials 7a and 7b separatable.

Figure 21:
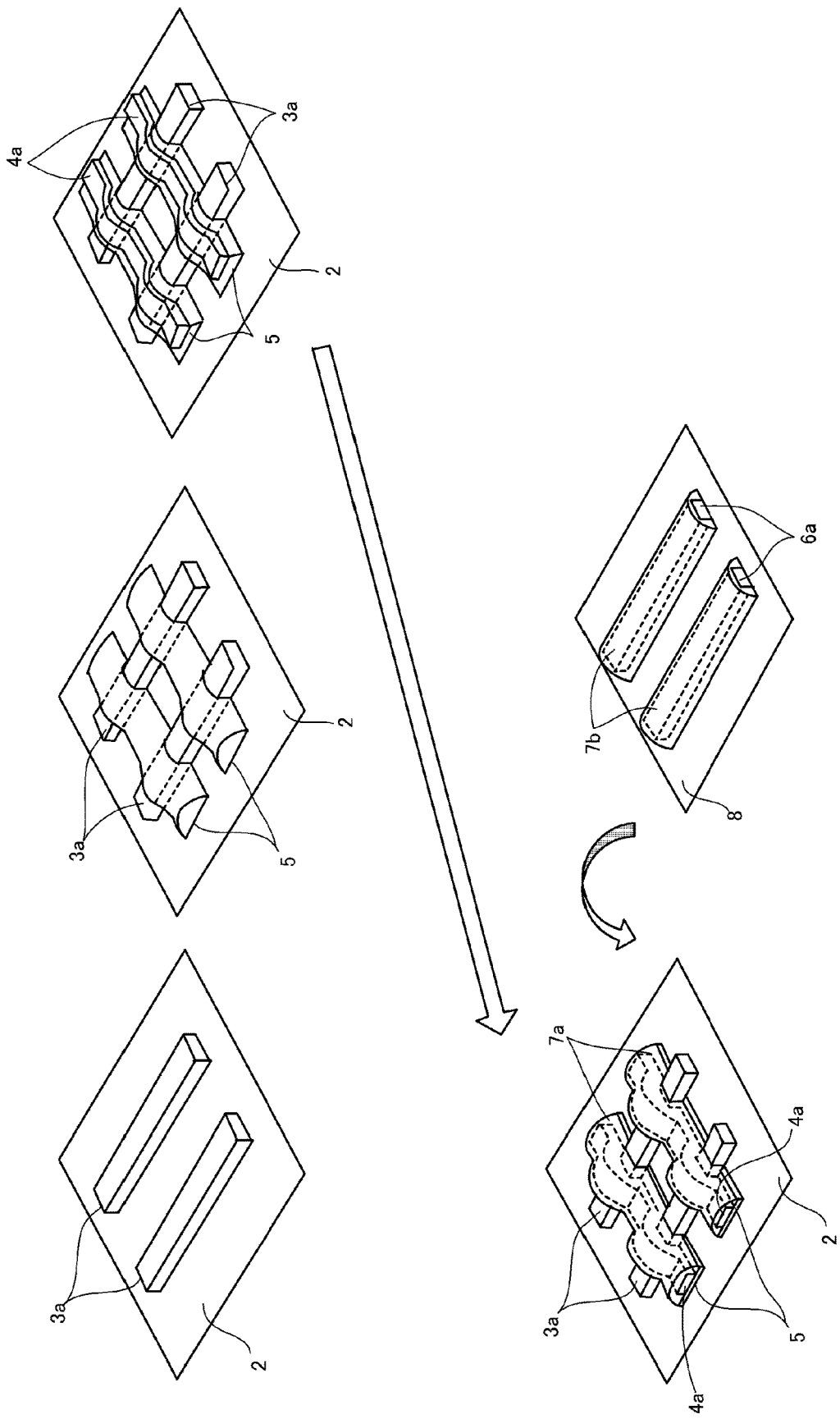
FIG. 21 is a diagram showing another method for manufacturing a temperature-pressure distribution sensor sheet.

Also, the following manufacturing method can be applied. As shown in FIG. 21, first, the first wiring electrode group 3 is formed over the film base material 2 through screen printing. Next, multiple strip-shaped conductive heat-sensitive materials 5 are formed in parallel through screen printing so as to intersect the first wiring electrode group 3. Next, the second wiring electrodes 4a are formed over the conductive heat-sensitive materials 5 through screen printing. Accordingly, the second wiring electrode group 4 is formed. Thereafter, the strip-shaped conductive pressure-sensitive materials 7a are formed over the second wiring electrodes 4a through screen printing.

The steps thereafter are the same as in FIG. 20, and the third wiring electrode group 6 and the conductive pressure-sensitive material 7b are formed in sequence over the protective film base material (second film base material) 8 through screen printing. Then, the film base material 2 and the protective film base material 8 are adhered to each other so that the first wiring electrode group 3 and the third wiring electrode group 6 face each other.

Note that the first wiring electrode group 3, the second wiring electrode group 4, the third wiring electrode group 6, the conductive heat-sensitive material 5, and the conductive pressure-sensitive material 7 are formed through screen printing, but there is no limitation to this, and they may be formed using inkjet printing or a transfer method. Also, the first wiring electrode group 3, the second wiring electrode group 4, and the third wiring electrode group 6 may be wired using a substrate wiring technique (copper etching, or the like). Accordingly, it is possible to form an extremely thin (e.g., 0.1 mm) and flexible sensor sheet 1.

Note that the method for manufacturing the sensor sheet 1 is not limited to the description above, and it is also possible to for the first wiring electrode group 3, the conductive heat-sensitive material 5, the second wiring electrode group 4, the conductive pressure-sensitive material 7, and the third wiring electrode group 6 in sequence on the film base material 2.

Sensor System

Next, a sensor system according to the present embodiment will be described. It is possible to use a sensor system 101 that is similar to the system for the temperature distribution sensor sheet. In other words, similarly to FIG. 7, which is an illustrative diagram, the sensor sheet 1, the PC (Personal Computer) 31, and a connector (electrical circuit) 32 are included. The connector 32 is electrically connected by wire to the PC 31, but it may also be connected wirelessly. The configurations thereof are the same as those in the system for the temperature distribution sensor sheet, except that the pressure distribution sensor is provided, and therefore description thereof is not included here.

The connector 32 supports the sensor sheet 1. Multiple terminals (not shown) are provided in the end portion region of the sensor sheet 1, the terminals are electrically connected to one of the contacts provided on the connector 32. Each of the multiple temperature detection portions 21 and the multiple pressure detection portions 22 provided on the sensor sheet 1 is connected to a corresponding terminal via a wire.

The connector 32 acquires changes in an electromagnetic property of the temperature detection portions 21 and the pressure detection portions 22 as output values. In order to apply voltages or the like to the multiple temperature detection portions 21 and the multiple pressure detection portions 22 in sequence, an electronic element known as a multiplexer is incorporated in the connector 32. As described above, since the second wiring electrode group 4 is shared between the temperature detection portion 21 and the pressure detection portion 22, it is possible to obtain the outputs separately by temporally separating the acquisition of the output values from the temperature detection portions 21 and the acquisition of the output values from the pressure detection portions 22.

The connector 32 obtains the outputs in sequence from each of the multiple temperature detection portions 21 by applying voltages to the multiple temperature detection portions 21 in sequence. This aspect is the same as with the above-described temperature distribution sensor sheet.

Similarly, the connector 32 obtains the outputs in sequence from each of the multiple pressure detection portions 22 by applying voltages to the multiple pressure detection portions 22 in sequence. Specifically, when the second wiring electrodes 4a or the third wiring electrodes 6a are set to be drive electrodes and the others are set to be receive electrodes, the connector 32 applies the voltages to the multiple drive electrodes in sequence and measures the resistances of the multiple receive electrodes in sequence with the voltages applied thereto, and thereby obtains the outputs of each of the pressure detection portions 22. The resistances of the receive electrodes are inversely amplified by an operation amplifier and are obtained as voltage values. By setting the applied voltage and the amplification ratio of the output, it is possible to amplify the outputs as desired.

The connector 32 converts analog signals indicating temperature values output from the temperature detection portions 21 of the sensor sheet 1 into digital signals, and outputs the digital signals to the PC 31. Also, the connector 32 converts analog signals indicating pressure values output from the pressure detection portions 22 of the sensor sheet 1 into digital signals, and outputs the digital signals to the PC 31.

The configuration of the PC 31 is the same as that of the above-described system for the temperature sensor sheet.

Also, the sensor system 101 has a thermocouple similar to that of the above-described system for the temperature sensor sheet. Also, a measuring device for measuring the humidity can be included.

Also, the sensor system 101 has a pressure sensor (not shown) that measures the pressure applied to the sensor sheet 1. This aspect is the same as with the above-described temperature distribution sensor sheet.

The PC 31 functions as a calculation unit that calculates a temperature distribution based on the output values obtained by each of the multiple temperature detection portions 21, and that calculates a pressure distribution based on the output values obtained by each of the multiple pressure detection portions 22. By calculating the temperature distribution based on the output values obtained by each of the multiple temperature detection portions 21, the temperature distribution of the measurement subject can be measured. Also, by calculating the pressure distribution based on the output values obtained by each of the multiple pressure detection portions 22, the pressure distribution of the measurement subject can be measured.

The relationship between the sensor output and the temperature of a temperature distribution sensor is the same as that shown in FIG. 8, and therefore description thereof will not be given here. Also, the same applies to the description according to FIG. 9.

The PC 31 functions as a correction unit that, based on the output values obtained in either the temperature detection portions 21 or the pressure detection portions 22, corrects the output values obtained by the other. By correcting the output values obtained by the pressure detection portions 22 based on the output values obtained by the temperature detection portions 21, it is possible to remove the temperature dependency of the pressure detection portions 22. By correcting the output values obtained by the temperature detection portions 21 based on the output values obtained by the pressure detection portions 22, it is possible to remove the pressure dependency of the temperature detection portions 21.

Specifically, the temperature dependency of the pressure distribution sensor can be removed using the following method. First, the temperature dependency of the pressure distribution sensor is obtained using the output curve for the time when the temperature is changed in a constant pressurized state. This may be performed at the time of factory shipping of the sensor sheet 1, and may be performed by each user. Also, it may be carried out on all of the pressure detection portions 22, and the representative value may be applied to all of the pressure detection portions 22. Next, calibration of the temperature distribution sensor is performed by measuring the outputs at multiple temperature points using the temperature distribution sensor. In other words, later-described equilibration processing and calibration processing are performed. This may be performed at the time of factory shipping of the sensor sheet 1, and may be performed by each user. Also, it may be carried out on all of the temperature detection portions 21, and the representative value may be applied to all of the temperature detection portions 21.

Also, at the time of measuring the pressure distribution using the pressure distribution sensor, accurate temperature values are acquired by the calibrated temperature distribution sensor, and the pressure distribution is corrected using the temperature dependency curve of the pressure distribution sensor, which was obtained in advance. Accordingly, the temperature dependency of the pressure distribution sensor can be eliminated. With this method, even if the temperature change rate and the change rate according to the temperature dependency of the pressure distribution sensor do not match, it is possible to correct the pressure distribution.

Also, specifically, the pressure dependency of the temperature distribution sensor can be eliminated using the following method. First, the pressure dependency of the temperature distribution sensor is obtained using the output curve for when the pressure is changed in a state of being held at a certain temperature. This may be performed at the time of factory shipping of the sensor sheet 1, and may be performed by each user. Also, it may be carried out on all of the temperature detection portions 21, and the representative value may be applied to all of the temperature detection portions 21. Next, calibration of the pressure distribution sensor is performed by measuring the outputs at multiple pressure points using the pressure distribution sensor. In other words, later-described equilibration processing and calibration processing are performed. This may be performed at the time of factory shipping of the sensor sheet 1, and may be performed by each user. Also, it may be carried out on all of the pressure detection portions 22, and the representative value may be applied to all of the pressure detection portions 22.

Then, at the time of measuring the temperature distribution obtained using the temperature distribution sensor, the accurate pressure values are acquired by the calibrated pressure distribution sensor, and the temperature distribution is corrected using the pressure dependency curve of the temperature distribution sensor obtained in advance. Accordingly, the pressure dependency of the temperature distribution sensor can be eliminated. With this method, even if the pressure change rate and the change rate according to the pressure dependency of the temperature distribution sensor do not match, it is possible to correct the temperature distribution.

Also, a program code for a calibration program according to the present embodiment is installed in the PC 31. Accordingly, the PC 31 functions as a control unit that performs equilibration processing and calibration processing.

Equilibration processing for temperature distribution sensor, calibration processing for temperature distribution sensor, and verification processing The equilibration processing for the temperature distribution sensor, the calibration processing for the temperature distribution sensor, and the verification processing are the same as those of the above-described system for the temperature distribution sensor sheet, and therefore description thereof will not be given here.

Equilibration Processing for Pressure Distribution Sensor

Figure 22:
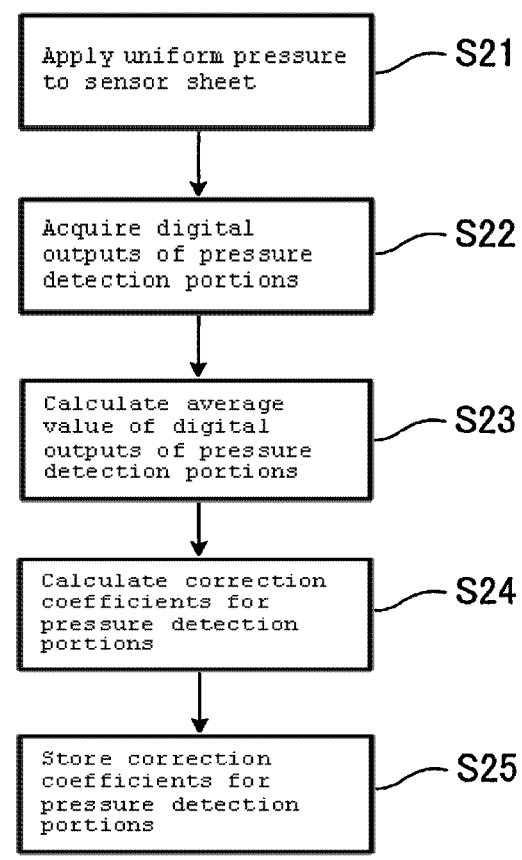
FIG. 22 is a flowchart showing equilibration processing for a pressure distribution sensor.

Next, equilibration processing for correcting a pressure distribution of the pressure distribution sensor will be described with reference to the flowchart shown in FIG. 22. Since the sensor sheet 1 includes multiple pressure detection portions 22, it is predicted that variation will occur in the outputs of the pressure detection portions 22. In view of this, a constant pressure is applied to all of the pressure detection portions 22, and the outputs of the pressure detection portions 22 and the average value thereof are used to derive correction coefficients for correcting differences in sensitivity between the pressure detection portions 22, whereby it is possible to correct the sensitivity differences between the multiple pressure detection portions at the time of actual measurement. When a constant pressure is to be applied to all of the pressure detection portions 22, a bladder that inflates with air pressure (air bladder) can be preferably used.

First, the sensor sheet 1 is attached to the connector 32. Then, a uniform pressure is applied to the sensor sheet 1 (step S21). Then, the PC 31 acquires digital outputs from the pressure detection portions 22 (step S22).

Next, the PC 31 calculates the average value of the digital outputs of the temperature detection portions 22 (step S23). Then, the PC 31 calculates correction coefficients for the pressure detection portions 22 (step S24). Specifically, quotients obtained by dividing the average value by the output values are obtained as the correction coefficients for the pressure detection portions 22. Then, the PC 31 stores the correction coefficients for the pressure detection portions 22 (step S25). Specifically, the PC 31 generates a calibration file including the correction coefficients for the pressure detection portions 22 and stores the calibration file in a storage unit (RAM, hard disk, etc.).

As an example, FIG. 23(a) shows the output values of the pressure-sensitive sensors obtained from nine pressure-sensitive sensors in the equilibration processing for a virtual sensor sheet 1 constituted by nine pressure measurement portions (pressure-sensitive sensors) 22 arranged in three rows and three columns. Since the average value of the nine output values is 49.9, the average value is divided by each output value. The quotients obtained by dividing these values are the correction coefficients for the pressure-sensitive sensors shown in FIG. 23(b).

The correction coefficients obtained in this manner are multiplied by the output values from the pressure detection portions 22 obtained using the sensor sheet 1 in an actual application, whereby the correction results shown in FIG. 23(c) are obtained. Accordingly, the sensitivity differences between the multiple pressure detection portions 22 in the sensor sheet 1 can be eliminated.

Note that in the above-described example, equilibration processing is performed using the output values obtained by pressing the pressure detection portions 22 with one predetermined pressure, but the equilibration processing may be performed using output values obtained by pressing the pressure detection portions 22 with two or more mutually different predetermined pressures. In this case, the correction coefficients shown in FIG. 23(b) are obtained for the pressure detection portions 22 using two or more mutually different predetermined pressures, and the average value thereof may be derived as fixed correction coefficients for the pressure detection portions 22. Alternatively, correction coefficients may be derived as a function of the pressure based on the correction coefficients obtained at the two or more mutually different pressures.

Calibration Processing for Pressure Distribution Sensor

Figure 24:
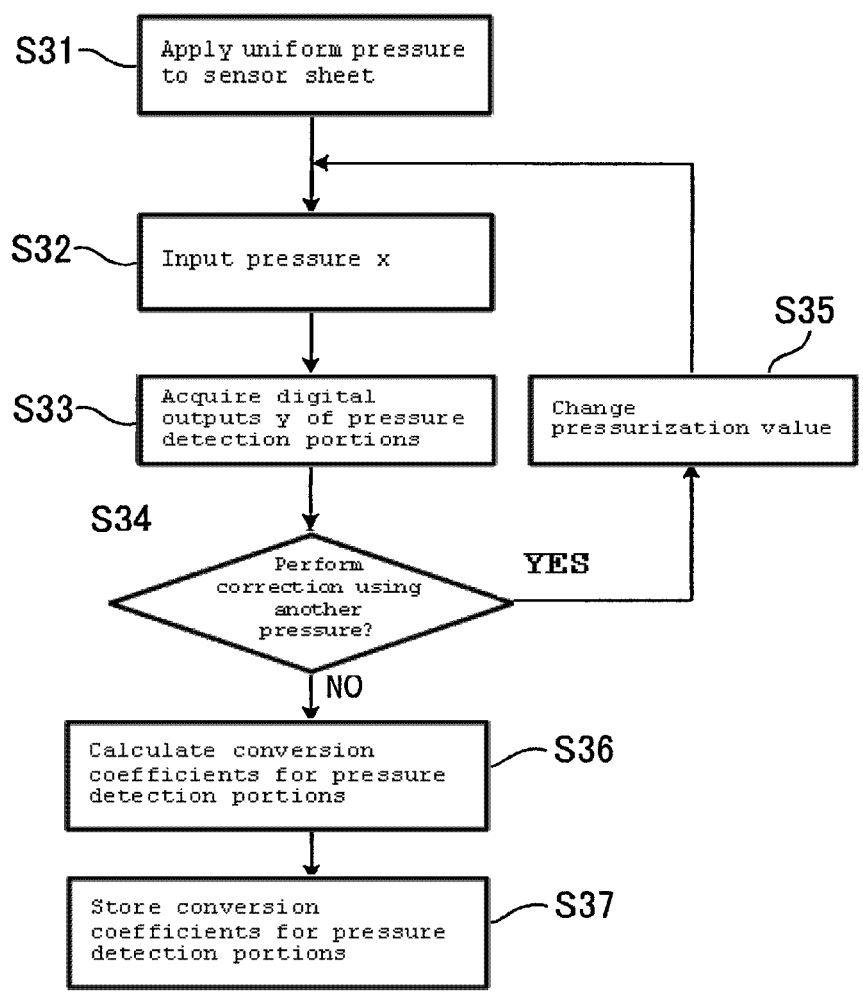
FIG. 24 is a flowchart showing equilibration processing for the pressure distribution sensor.

Next, calibration processing for correcting the output values of the pressure distribution sensor will be described with reference to the flowchart shown in FIG. 24. The calibration program of the present embodiment causes the sensor system 101 to operate so as to derive the conversion coefficients for the output values from the pressure detection portions 22 with which pressure output values that correlate (linearly or non-linearly) to the pressure input value applied to the pressure detection portions 22 can be obtained, based on the output values from one or more pressure detection portions 22 of the sensor sheet that are obtained when a predetermined pressure is applied to the one or more pressure detection portions 22. In other words, the sensor system 101 is caused to operate so as to perform calibration processing.

It is predicted that the outputs of the pressure detection portions 22 will not be outputs that are proportional to the actual pressure. In view of this, a relational expression (pressure conversion equation) for the output values and the pressure input values is obtained by acquiring the output values of the pressure detection portions 22 in a state in which a known pressure is applied as the pressure input value. Then, conversion coefficients for the output values from the pressure detection portions 22 with which pressure output values that correlate (linearly or non-linearly) to the pressure input values applied to the pressure detection portions 22 can be obtained are derived based on the pressure conversion equation. By multiplying the conversion coefficients by the output values of the pressure detection portions 22, it is possible to obtain pressure output values that correlate (linearly or non-linearly) to the pressure input value applied to the pressure detection portions 22.

First, the sensor sheet 1 is attached to the connector 32. Then, a uniform pressure is applied to the sensor sheet 1 (step S31). Then, a pressure value x measured by the pressure sensor is input into the PC 31 (step S32). After that, the PC 31 acquires digital outputs y of the pressure detection portions 22 (step S33). Note that after the PC 31 acquires the digital outputs y of the pressure detection portions 22, the pressure sensor may input the temperature value x measured by the pressure sensor into the PC 31.

Next, it is determined whether or not correction according to another pressure is to be performed (step S34). As will be described later, in the case of performing linear correction or curvilinear correction using two points or more, it is determined that correction according to another pressure is to be performed (S34: YES), and the applied pressure value is changed (step S35). Then, step S32 and S33 are repeated. In other words, the calibration program causes the sensor system 101 to operate so as to derive conversion coefficients based on the output values from the one or more pressure detection portions 22 of the sensor sheet 1 that are obtained when multiple mutually different pressures are applied to the one or more pressure detection portions 22.

If it is determined in step S34 that correction using another pressure is not to be performed (step S34: NO), the PC 31 calculates the conversion coefficients (step S36). Specifically, in the case of linear correction, the inverse of the slope of the temperature conversion equation is obtained as the conversion coefficient for the output values from the pressure detection portions 22. Also, in the case of curvilinear correction, the function for the sensor output values is obtained as the conversion coefficient for the output values from the pressure detection portions 22. Here, the sensor output value is the sum of the output values from all of the pressure detection portions 22 in the sensor sheet 1. Then, the PC 31 stores the correction coefficients for the pressure detection portions 22 (step S37). Specifically, the PC 31 generates a calibration file including the conversion coefficients for the pressure detection portions 22 and the pressure conversion equation, and stores the calibration file in a storage means (RAM, hard disk, etc.).

Figure 25:
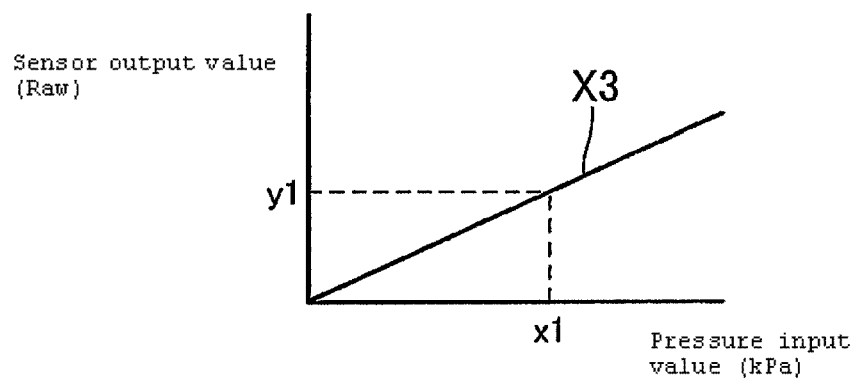
FIG. 25 is a diagram for describing calibration processing.
Figure 25:
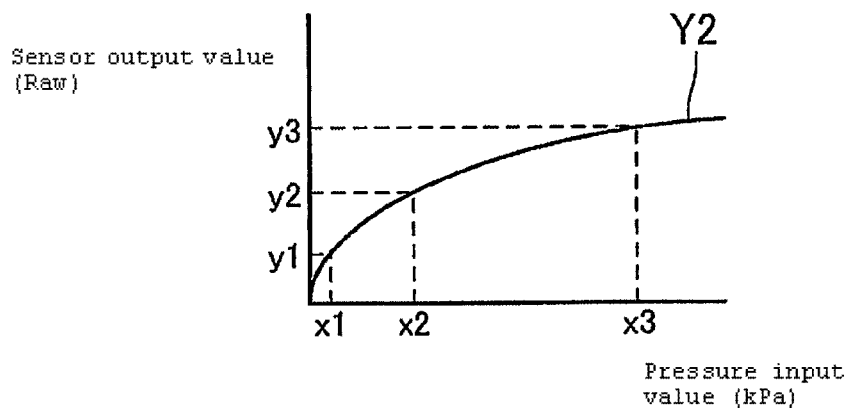

As an example, if the actual input-output characteristic of the pressure detection portions 22 is expressed by a straight line X3 passing through the origin, as shown in FIG. 25(a), the sensor output value y1 (any unit Raw indicating signal strength) is obtained with respect to the pressure input value x1 (kPa). The pressure input value x1 in this context is the sum of the pressure values applied to all of the pressure detection portions 22 in the sensor sheet 1, and the sensor output value y1 means the sum of the output values from all of the pressure detection portions 22 in the sensor sheet 1. The PC 31 obtains the temperature change rate (slope) a by substituting y1 and x1 into the equation y=ax.

As an example, if the actual input-output characteristic of the pressure detection portions 22 is expressed by a curved line Y2 passing through the origin, as shown in FIG. 25(b), the sensor output value y1 (any unit Raw indicating signal strength) is obtained with respect to the pressure input value x1 (kPa), and the sensor output value y2 is obtained with respect to the pressure output value x2. The pressure input values x1 and x2 in this context are the sums of the pressure values applied to all of the pressure detection portions 22 in the sensor sheet 1, and the sensor output values y1 and y2 mean the sums of the output values from all of the pressure value portions 22 in the sensor sheet 1. The PC 31 obtains the slope a and the exponent b using a least squares method based on the two points, the origin, and a known curved line equation (power curve).

The pressure output values that have almost the same values as the pressure input values input to the pressure detection portions 22 can be obtained by multiplying the conversion coefficients obtained in this manner by the output values from the pressure detection portions 22 obtained using the sensor sheet 1 in an actual application.

Note that in the above-described example, calibration processing is performed using all of the pressure detection portions 22 in the sensor sheet 1, but calibration processing may be performed using some (or one) of the pressure detection portions 22. In this case, in order to increase the accuracy of the conversion coefficient, it is preferable to obtain a pressure conversion equation with respect to the corrected output values obtained by first performing equilibration processing and multiplying the correction coefficients by the output values.

Verification Processing

The PC 31 generates and stores the calibration file including the correction coefficients for each pressure detection portion 22 obtained in the equilibration processing, the conversion coefficients obtained in the calibration processing, and the pressure conversion equation. The calibration file may include the correction coefficients for each pressure detection portion 22 and the conversion coefficients, and may include the products obtained by multiplying the conversion coefficients by the correction coefficients as the calibration coefficients for each temperature detection portion 22.

The calibration program causes the sensor system 101 to operate so as to determine whether or not the pressure output values obtained by multiplying the conversion coefficients by the output values of the pressure detection portions 22 match the pressure input values applied to the pressure detection portions 22. In other words, the PC 31 determines whether or not the pressure output values corrected by multiplying the conversion coefficients by the output values from the pressure detection portions 22 match the pressure value (pressure input value) measured by the pressure sensor. Since the specific method is the same as that for the temperature distribution sensor, description thereof will not be included here.

Also, the PC 31 stores a calibration file for pressure detection portions 22 for each of multiple sensor sheets 1 and selects the calibration file that is optimal for the sensor sheet 1 that is to be used. Since the specific method is the same as that for the temperature distribution sensor, description thereof will not be included here.

Effect

As stated above, with the sensor sheet 1 according to the present embodiment, by overlapping the region in which the multiple temperature detection portions 21 are arranged and the region in which the multiple pressure detection portions 22 are arranged in plan view, it is possible to form the sensor sheet 1 compactly. Accordingly, since the temperature detection portion 21 and the pressure detection portion 22 are arranged at the same location on the measurement subject, it is possible to measure the temperature and the pressure at the same time and at the same location on the measurement subject.

Also, similarly to the above-described temperature distribution sensor sheet, the sensor sheet 1 is manufactured by forming the conductive heat-sensitive material 5 over the first wiring electrodes 3a and forming the second wiring electrodes 4a over the conductive heat-sensitive material 5, and therefore it is possible to accurately measure the temperature of the measurement subject. Aside from that, it is possible to obtain effects similar to those indicated with the temperature sensor sheet.

Also, by making the thickness from the first wiring electrodes 3a to the third wiring electrodes 6a uniform, it is possible to prevent the pressing force applied by the measurement subject from being concentrated on the temperature detection portions 21 and the pressure detection portions 22 during measurement of the temperature distribution and the pressure distribution. As a result, since no warping occurs in the conductive heat-sensitive material 5 provided at the temperature detection portions 21, it is possible to prevent the occurrence of a heat measurement error. Also, since the level differences between the pressure detection portions 22 and the others can be eliminated, it is possible to prevent the occurrence of a pressure measurement error caused by a level difference. Also, it is possible to prevent the occurrence of indentations on the measurement subject onto which the sensor sheet 1 is pressed.

Also, by covering the pressure detection portions 22 with an insulating material (a protective film base material 8 or the like), it is possible to prevent degeneration caused by the electrical characteristics of the pressure detection portions 22 changing due to moisture absorption, and to prevent the conductive pressure-sensitive material 7 from deteriorating and being altered due to hydrolysis.

Also, with the sensor system 101 according to the present embodiment, by calculating the temperature distribution based on the output values obtained by each of the multiple temperature detection portions 21, the temperature distribution of the measurement subject can be measured. Also, by calculating the pressure distribution based on the output values obtained by each of the multiple pressure detection portions 22, the pressure distribution of the measurement subject can be measured.

Also, by correcting the output values obtained by the pressure detection portions 22 based on the output values obtained by the temperature detection portions 21, it is possible to remove the temperature dependency of the pressure detection portions 22. By correcting the output values obtained by the temperature detection portions 21 based on the output values obtained by the pressure detection portions 22, it is possible to remove the pressure dependency of the temperature detection portions 21.

Also, with the calibration program according to the present embodiment, it is possible to achieve the following results. Note that the temperature detection is as stated above.

Also, conversion coefficients for the output values from the pressure detection portions 22 with which pressure output values that correlate (linearly or non-linearly) to the pressure input values applied to the pressure detection portions 22 can be obtained are derived. It is predicted that the output values of the pressure detection portions 22 will not be values that are proportional to the actual pressure. In view of this, a pressure conversion equation that expresses the relationship between the output values from one or more of the pressure detection portions 22 and the pressure input value applied to the one or more of the pressure detection portions 22 is derived. Then, the conversion coefficients are derived based on the pressure conversion equation and are multiplied by the output values of the pressure detection portions 22. This makes it possible to obtain pressure output values that are almost the same as the pressure input values input to the pressure detection portions 22. Accordingly, it is possible to obtain the correct temperatures with respect to the output values of the pressure detection portions 22.

In other words, conversion coefficients are derived based on the output values from the one or more pressure detection portions 22 of the sensor sheet 1 that are obtained when multiple mutually different pressures are applied to the one or more pressure detection portions 22. A pressure conversion equation in which the pressure and the output are not in a proportional linear relationship can be obtained by applying multiple mutually different pressures to the one or more pressure detection portions 22. Accordingly, it is possible to derive conversion coefficients that are more accurate than conversion coefficients derived by applying a single pressure.

Also, it is determined whether or not the pressure output values obtained by multiplying the conversion coefficients by the output values of the pressure detection portions 22 match the pressure input value applied to the pressure detection portions 22. For example, if the sensor sheet 1 is exchanged, or if partial sensitivity change occurs due to degradation, wear, or the like of the pressure detection portions 22, deviation will occur in the corrected pressure output values. By comparing the size of the deviation with a threshold value set as desired in advance, it is possible to keep track of the degree of matching between the pressure output value and the pressure input value. Accordingly, it is possible to avoid a case in which measurement is performed in a state in which an error has occurred.

Also, the conversion coefficients are stored for each of multiple sensor sheets 1, and the conversion coefficients that are optimal for the sensor sheet 1 that is to be used are selected. For example, the optimal conversion coefficients are specified by calculating the matching percentages between the output values acquired from the temperature detection portions 21 at room temperature or a specific temperature and the multiple conversion coefficients. By thus applying the conversion coefficients to the output values from the temperature detection portions 21, it is possible to perform accurate measurement. This is similar for the pressure detection portions 22 as well.

Variation

Although embodiments of the present invention have been described above, these are merely specific examples and do not particularly limit the present invention. Specific configurations and the like can be designed and modified as appropriate. Also, the actions and effects disclosed in the embodiment of the invention are merely the most preferable actions and effects that occur due to the present invention, and the actions and effects of the present invention are not limited to those disclosed in the embodiment of the present invention.

Figure 26:
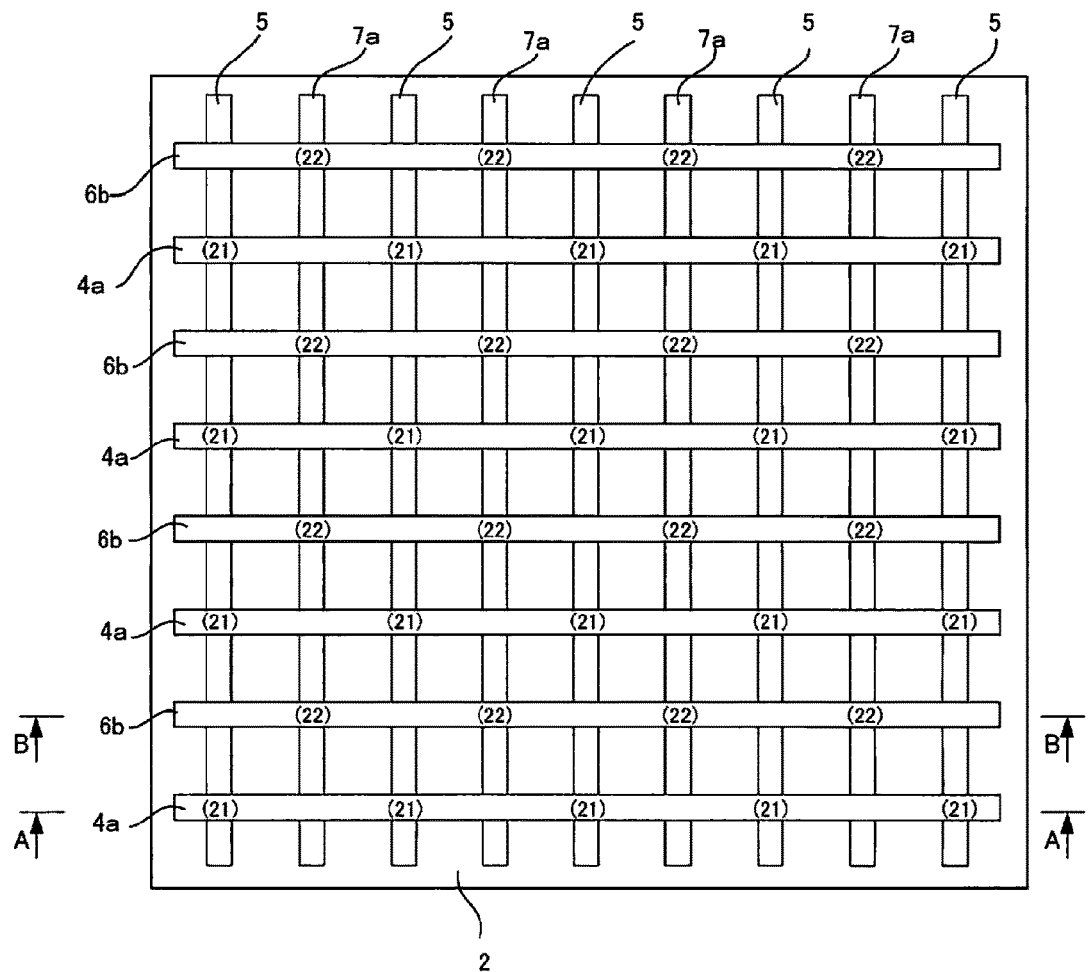
FIG. 26 is a plan view showing another example of a temperature-pressure sensor sheet.
Figure 27:
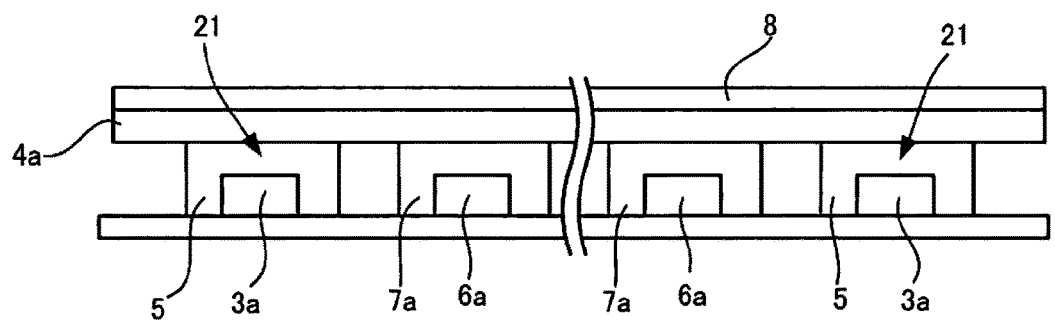
FIG. 27 is a cross-sectional view taken along line A-A in FIG. 26.
Figure 28:
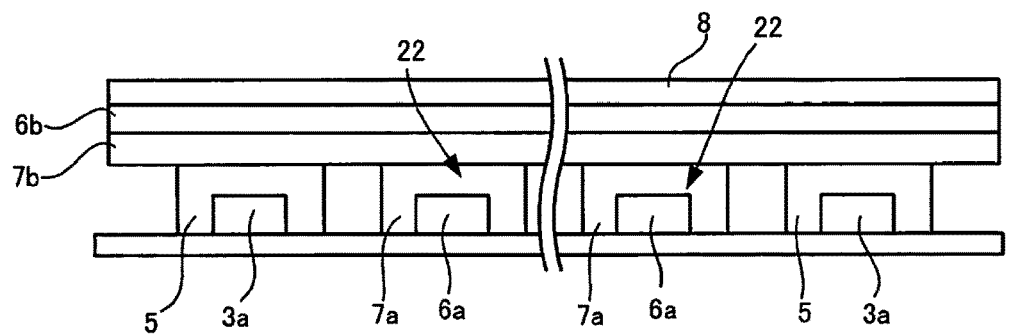
FIG. 28 is a cross-sectional view taken along line B-B in FIG. 26.

For example, as shown in FIGS. 26 to 28, it is possible to make it so that the temperature detection portions 21 and the pressure detection portions 22 do not overlap. FIG. 26 is a plan view showing the temperature-pressure sensor sheet (plan view excluding the protective film base material 8), FIG. 27 is a cross-sectional view taken along line A-A in FIG. 26, and FIG. 28 is a cross-sectional view taken along line B-B.

As shown in FIGS. 26 to 28, with the temperature-pressure sensor sheet, the first wiring electrodes 3a and the third wiring electrodes 6a are alternatingly arranged on the film base material. Then, the conductive heat-sensitive material 5 is arranged over the first wiring electrodes 3a and the conductive pressure-sensitive material 7a is arranged over the third wiring electrodes 6a. Also, the second wiring electrodes 4a and the fourth wiring electrodes 6b are arranged alternatingly over the protective film base material 8. The fourth wiring electrodes 6b are formed using the same material as the first to third wiring electrodes. Then, the conductive pressure-sensitive material 7b is arranged over the fourth wiring electrodes 6b. Thereafter, the film base material 1 and the protective film base material 8 are adhered together such that the wiring electrodes face each other. Accordingly, as shown in FIG. 26, the locations at which the first wiring electrodes 3a and the second wiring electrodes 4a intersect constitute the temperature detection portions 21, and the locations at which the third wiring electrodes 6a and the fourth wiring electrodes 6b intersect, or in other words, the locations at which the conductive pressure-sensitive materials 7a and 7b come into contact with each other constitute the pressure detection portions 22.

With this kind of configuration, it is possible to disperse the temperature detection portions 21 and the pressure detection portions 22 such that they do not overlap. The measurement of the temperature and the pressure is similar to that described above. In the case of measuring the temperature, for example, the outputs from the multiple temperature detection portions 21 are obtained in sequence by applying voltages in sequence to the multiple temperature detection portions 21. Specifically, when the first wiring electrodes 3a or the second wiring electrodes 4a are set to be drive electrodes and the others are set to be receive electrodes, the connector 32 applies the voltages to the multiple drive electrodes in sequence and measures the resistances of the multiple receive electrodes in sequence, and thereby obtains the outputs of each of the temperature detection portions 21.

Similarly, in the case of measuring the pressure, the outputs are obtained in sequence from the multiple pressure detection portions 22 by applying voltages in sequence to the multiple pressure detection portions 22. Specifically, when the third wiring electrodes 6a or the fourth wiring electrodes 6b are set to be drive electrodes and the others are set to be receive electrodes, the connector 32 applies the voltages to the multiple drive electrodes in sequence and measures the resistances of the multiple receive electrodes in sequence with the voltages applied thereto, and thereby obtains the outputs of each of the pressure detection portions 22.

During manufacturing, it is also possible to arrange only the fourth wiring electrodes 6b and the conductive pressure-sensitive material 7b on the protective film base material 8, and to arrange the second wiring electrodes 4a on the film base material 1.

Note that the first wiring electrodes 3a, the second wiring electrodes 4a, the third wiring electrodes 6a, and the fourth wiring electrodes 6b in the above-described example correspond to the fourth wiring electrodes, the fifth wiring electrodes, the sixth wiring electrodes, and the seventh wiring electrodes according to the present embodiment.

Figure 29:
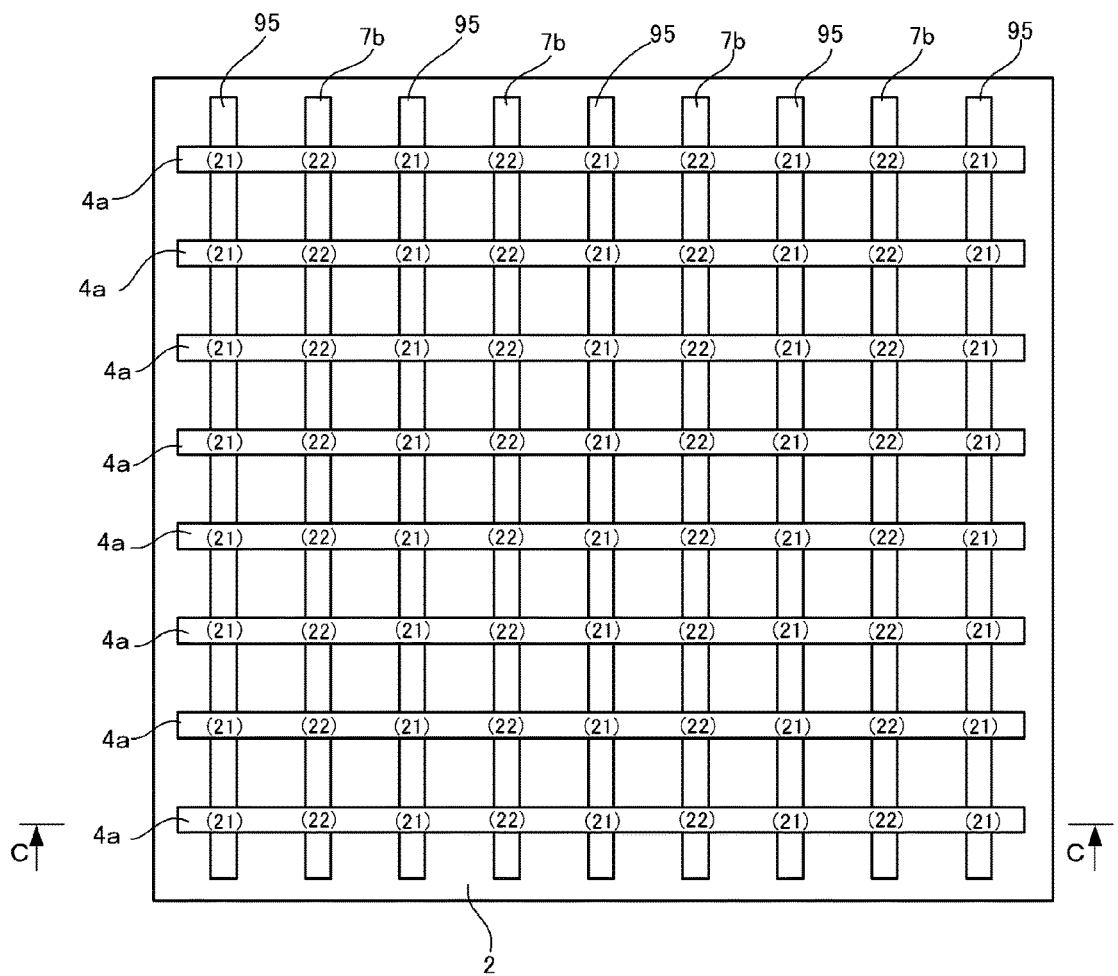
FIG. 29 is a plan view showing yet another example of a temperature-pressure sensor sheet.

Also, the following configuration can be used. This will be described with reference to FIGS. 29 to 31. FIG. 29 is a plan view showing the temperature-pressure sensor sheet (plan view excluding the protective film base material 8), FIG. 30 is a cross-sectional view taken along line C-C in FIG. 29, and FIG. 31 is a diagram showing a method of manufacturing the temperature-pressure sensor sheet.

Figure 30:
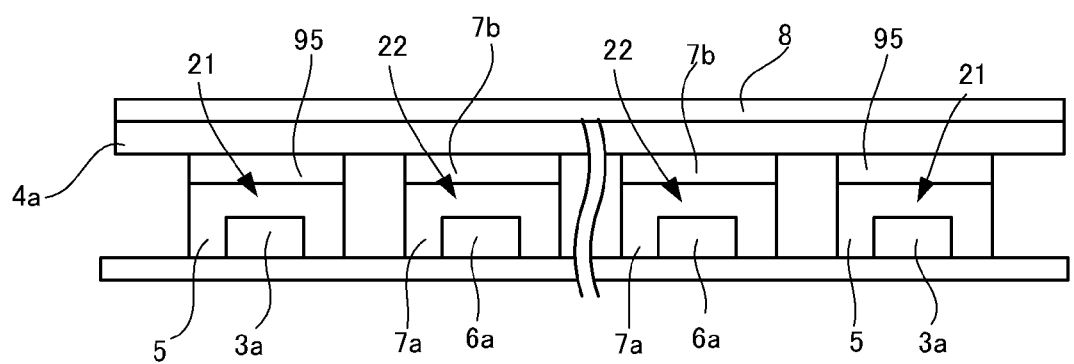
FIG. 30 is a cross-sectional view taken along line C-C in FIG. 29.
Figure 31:
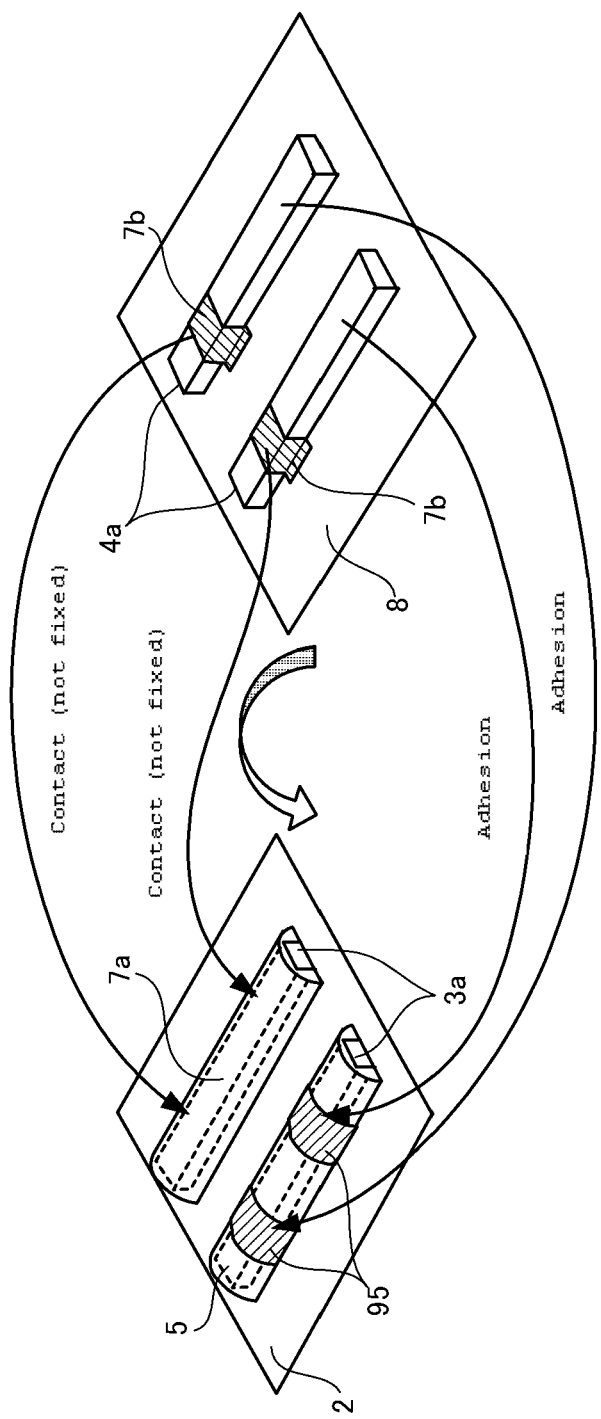
FIG. 31 is a perspective view showing a method for manufacturing the temperature-pressure sensor sheet shown in FIG. 29.

As shown in FIGS. 29 to 31, with the temperature-pressure sensor sheet, the first wiring electrodes 3a and the third wiring electrodes 6a are arranged alternatingly over the film base material 2, similarly to FIGS. 26 to 28. Then, the conductive heat-sensitive material 5 is arranged over the first wiring electrodes 3a and the conductive pressure-sensitive material 7a is arranged over the third wiring electrodes 6a. Furthermore, a conductive adhesive 95 is arranged at a predetermined interval over the conductive heat-sensitive material 5. Also, the second wiring electrodes 4a are arranged at a predetermined interval over the protective film base material 8, and the conductive pressure-sensitive material 7b is arranged so as to intersect the second wiring electrodes 4a. Note that the conductive pressure-sensitive material 7b does not need to be arranged over the protective film base material between the second wiring electrodes 4a. Note that the fourth wiring electrodes 6b are formed using the same material as the first to third wiring electrodes. Thereafter, the film base material 1 and the protective film base material 8 are adhered together such that the wiring electrodes face each other. Specifically, the second wiring electrodes 4a are fixed over the conductive heat-sensitive material 5 by the conductive adhesive 95. Also, although the conductive heat-sensitive material 7b is arranged over the conductive heat-sensitive material 7a, they are merely in contact with each other and are not fixed to each other. Accordingly, as shown in FIG. 29, the locations at which the first wiring electrodes 3a and the second wiring electrodes 4a intersect constitute the temperature detection portions 21, and the locations at which the third wiring electrodes 6a and the fourth wiring electrodes 6b intersect, or in other words, the locations at which the conductive pressure-sensitive materials 7a and 7b come into contact with each other constitute the pressure detection portions 22. Unlike FIG. 26, in the example shown in FIG. 29, the intersecting locations in the vertical columns (columns in the vertical direction of FIG. 29) all constitute temperature detection portions 21 or pressure detection portions 22. Also, the columns having the temperature detection portions 21 and the columns having the pressure detection portions 22 are arranged alternatingly in the horizontal direction (left-right direction of FIG. 29).

The method of operating this sensor is the same as that of the sensor shown in FIGS. 26 to 28.

Note that the first wiring electrodes 3a, the second wiring electrodes 4a, and the third wiring electrodes 6a in the above-described example correspond to the first wiring electrodes, the second wiring electrodes, and the third wiring electrodes according to the present invention.

In the above-described examples, the first wiring electrodes and the third wiring electrodes are arranged alternatingly and the second wiring electrodes 4a and the fourth wiring electrodes 6b are arranged alternatingly, but it is also possible to change the positions of the wiring electrodes such that they are not arranged alternatingly, but the temperature detection portions 21 and the pressure detection portions 22 are arranged at necessary locations.

WORKING EXAMPLES

Hereinafter, the present invention will be described by means of working examples, but the present invention is not limited thereto. Hereinafter, heat-sensitive elements included in the temperature detection portions included in the temperature distribution sensor sheet will be considered. That is, hereinafter, a heat-sensitive element obtained by stacking a first electrode 2, a conductive heat-sensitive material 1, and a second electrode 3 in that order on a base material 4 will be considered. Note that as shown in later-described FIGS. 43 and 44, for example, the heat-sensitive element can have a form in which the first electrodes 2 and the second electrodes 3 are formed at a predetermined interval over the base material 4 and the conductive heat-sensitive material 1 is arranged between the electrodes 2 and 3. In other words, the heat-sensitive element according to the present invention need only include: at least one first electrode (e.g., corresponds to the first or fourth wiring electrode according to the present invention); at least one second electrode (e.g., corresponds to the second or fifth wiring electrode according to the present invention); and at least one conductive heat-sensitive material, which is electrically connected to the first electrode and the second electrode.

Working Examples 1 to 3 and Comparative Example 1

Ink for forming the conductive heat-sensitive material is adjusted by mixing the conductive particles, resin, filler, solvent, and anti-foaming agent shown in Table 1 using a planetary mixing/deaeration apparatus (MAZERUSTAR KK-V1000 manufactured by Kurabo Industries Ltd.). The details of the components are as described below.

Figure 32:
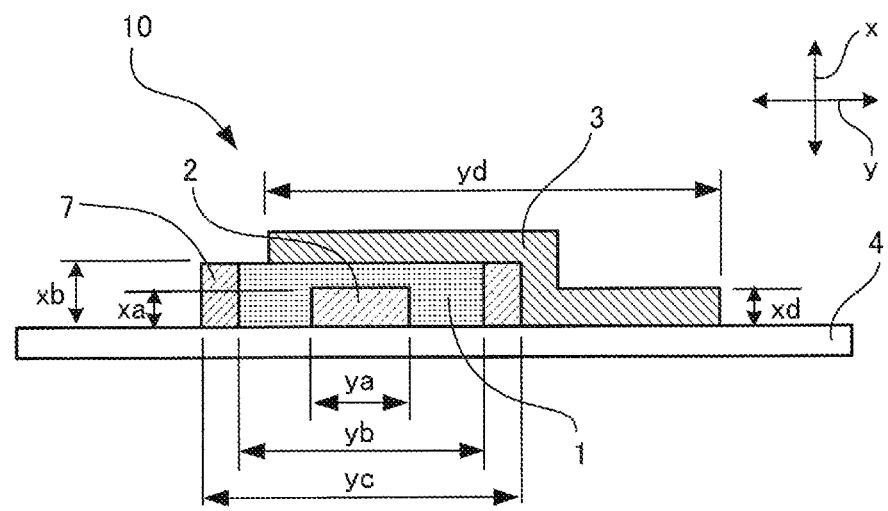
FIG. 32 is a cross-sectional view showing another example of a heat-sensitive element according to an embodiment of the present invention (used for measuring a resistance value and the change rate thereof).
Figure 33:
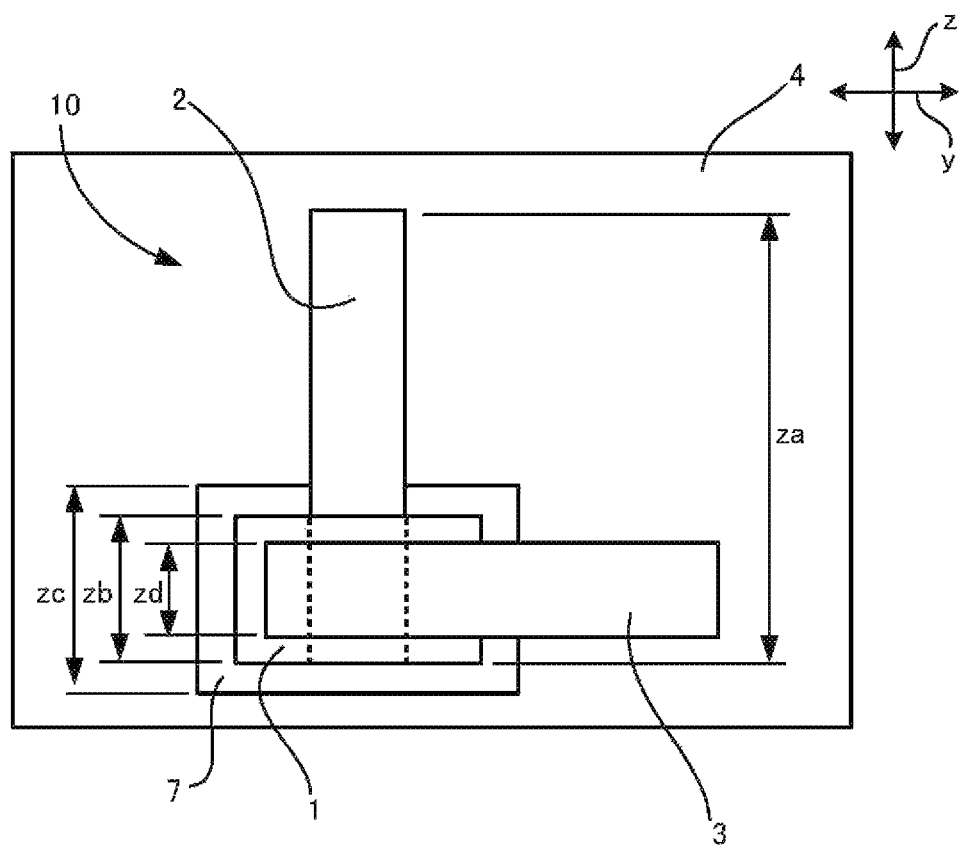
FIG. 33 is a plan view of FIG. (used for measuring a resistance value and the change rate thereof).
Figure 34:
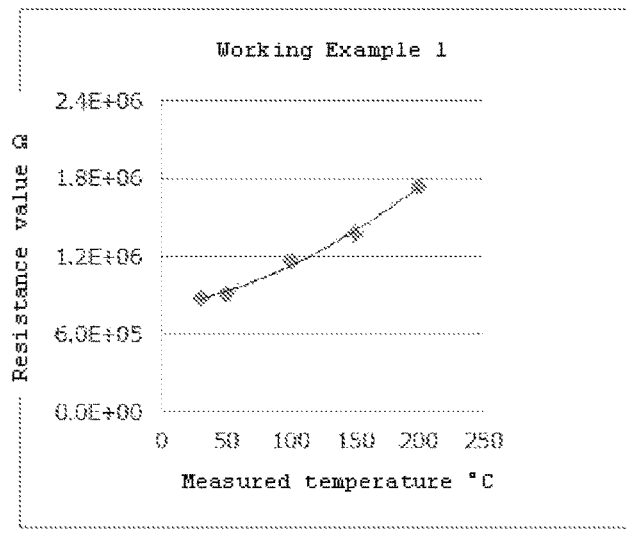
FIG. 34 is a graph showing a relationship between electrical resistance values and measured temperatures of the heat-sensitive element obtained in Embodiment 1.
Figure 35:
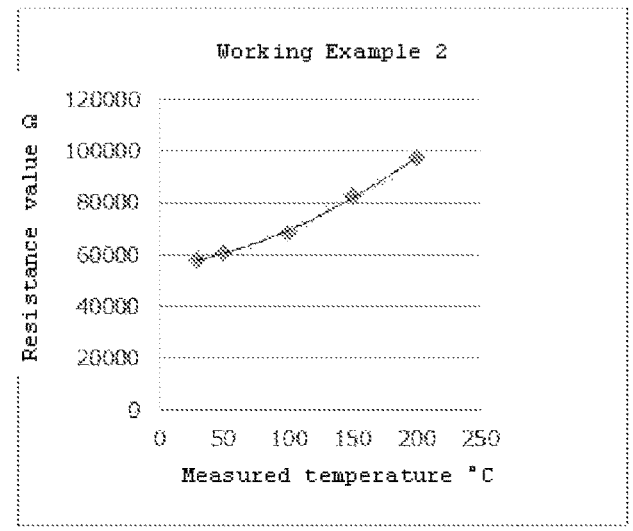
FIG. 35 is a graph showing a relationship between electrical resistance values and measured temperatures of the heat-sensitive element obtained in Embodiment 2.
Figure 36:
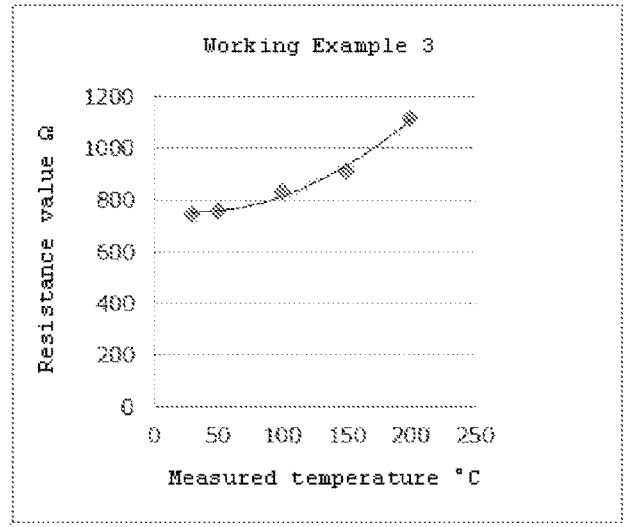
FIG. 36 is a graph showing a relationship between electrical resistance values and measured temperatures of the heat-sensitive element obtained in Embodiment 3.
Figure 37:
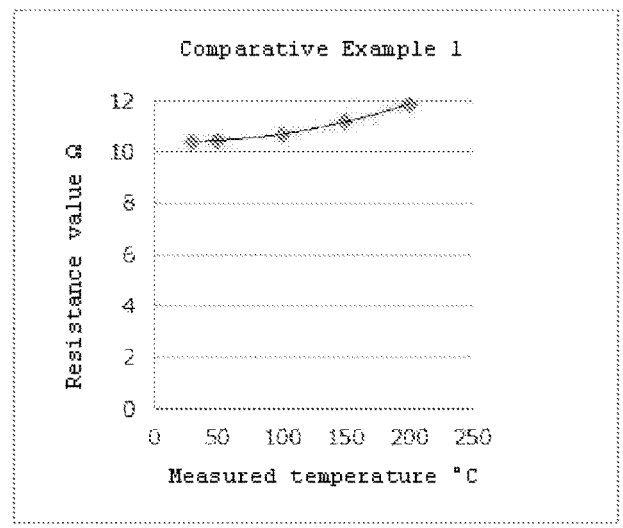
FIG. 37 is a graph showing a relationship between electrical resistance values and measured temperatures of the heat-sensitive element obtained in Comparative Example 1.
Figure 38:
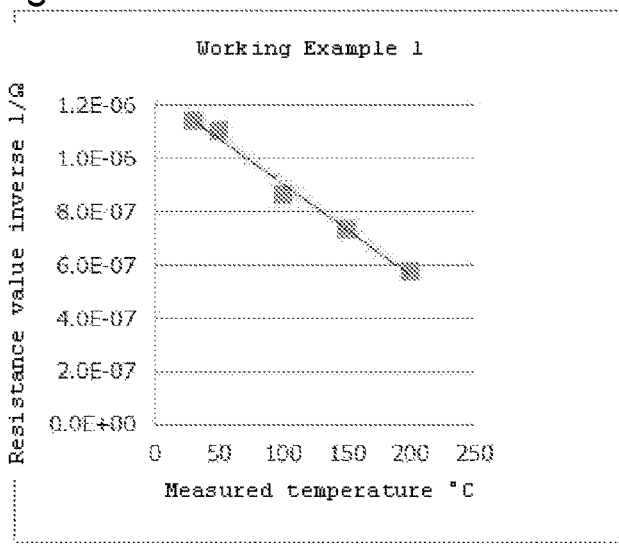
FIG. 38 is a graph showing a relationship between an inverse of an electrical resistance value and a measured temperature of the heat-sensitive element obtained in Embodiment 1.
Figure 39:
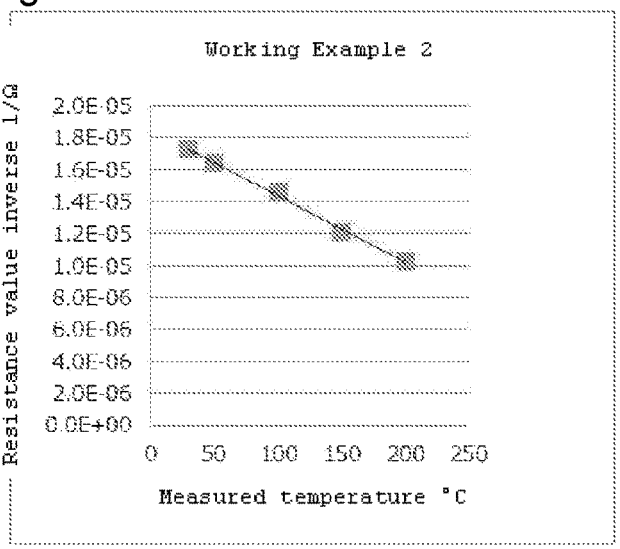
FIG. 39 is a graph showing a relationship between inverses of electrical resistance values and measured temperatures of the heat-sensitive element obtained in Embodiment 2.
Figure 40:
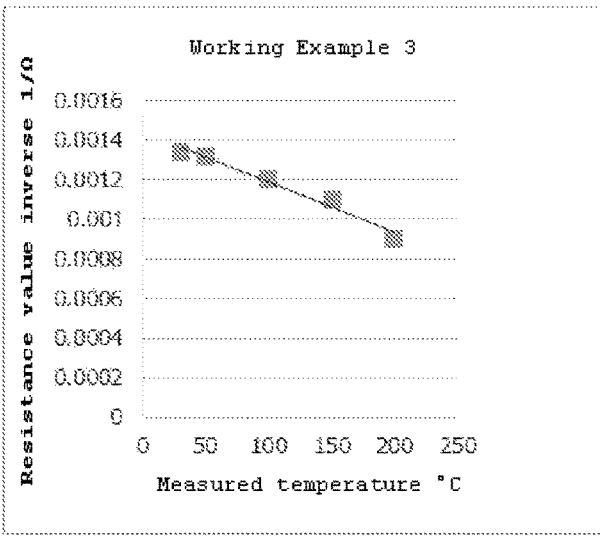
FIG. 40 is a graph showing a relationship between inverses of electrical resistance values and measured temperatures of the heat-sensitive element obtained in Embodiment 3.
Figure 41:
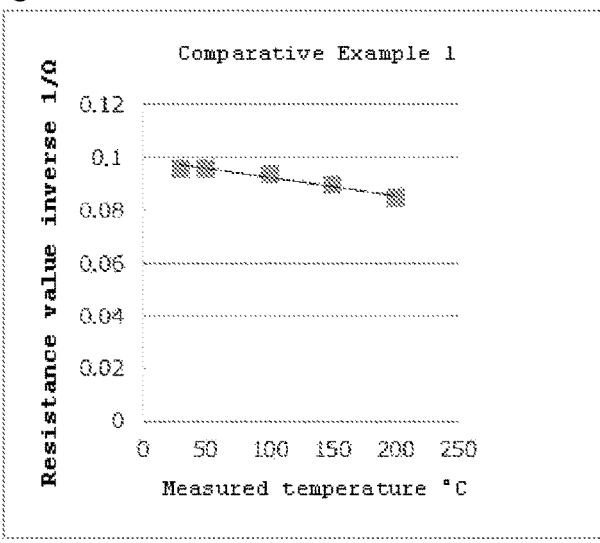
FIG. 41 is a graph showing a relationship between inverses of electrical resistance values and measured temperatures of the heat-sensitive element obtained in Comparative Example 1.

Next, the heat-sensitive element 10 to be included in a configuration such as that shown in FIGS. 32 and 33 was manufactured using the obtained ink. Specifically, as shown in FIGS. 32 and 33, the first electrode 2 (polyimide-silver filler dispersion, SAP-15 manufactured by Sanwa Chemical Industrial Co., Ltd.; thickness xa=8 μm, width ya=2 mm, length za=7 mm) was arranged over a polyimide sheet 4 (Kapton 300V manufactured by Du Pont-Toray Co., Ltd.) through screen printing. Next, the above-described ink was applied through screen printing so as to cover the end portions of the electrode 2, and a conductive heat-sensitive material 1 (thickness xb=28 μm, width yb=5 mm, length zb=3 mm for portion located on upper surface of electrode) was formed. Next, a flow prevention barrier 7 (IRP-1407 manufactured by Sanwa Chemical Industrial Co.; thickness xb=28 μm, external width yc=6 mm, external length zc=4 mm) was formed through screen printing so as to surround the periphery of the conductive heat-sensitive material 1. Thereafter, a second electrode 3 (a polyimide-silver filler dispersion, SAP-15 manufactured by Sanwa Chemical Industrial Co.; thickness xd=8 μm, width yd=7 mm, length zd=2 mm) was formed through screen printing so as to cover the conductive heat-sensitive material 1. Note that when performing temperature measurement, if a heat-sensitive resistor 1 with a low melting point is used, there is a risk that the heat-sensitive resistor 1 will flow when measuring a temperature higher than its melting point. In view of this, with the above-described embodiment, the flow prevention barriers are provided in the periphery of the heat-sensitive resistor 1.

Measurement of Electrical Resistance Value and Change Rate Thereof

Figure 42:
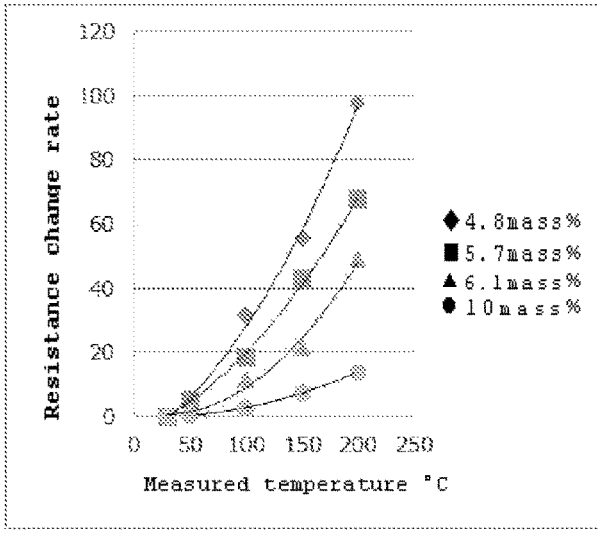
FIG. 42 is a graph showing a relationship between the change rate of the electrical resistance value and the measured temperatures of the heat-sensitive elements obtained in the embodiments and the comparative example.

The electrical resistance values and the rates of change of the electrical resistance values at the temperatures shown in Table 1 were measured under the following conditions using the heat-sensitive element 10 obtained as described above. In other words, the heat-sensitive element 10 was arranged in a thermostatic chamber (DF612 manufactured by Yamato Scientific Co., Ltd.) and a thermocouple (covered thermocouple (Dg-K-5m-Y terminal) manufactured by AS ONE Corporation) was installed near the heat-sensitive element 10. Then, the electrical resistance value and the change rate of the electrical resistance value at each temperature was measured with a tester (Digital HiTester 3805-50 manufactured by Hioki E.E Corporation) while monitoring the temperature of the thermocouple using a temperature recorder (NR-1000 manufactured by Keyence Corporation). The results are shown in Table 1. Also, graphs showing the relationships between the measured temperatures and the electrical resistance values in Working Examples 1 to 3 and Comparative Example 1 are shown in FIGS. 34 to 37, graphs showing relationships between the measured temperatures and the inverses of the electrical resistance values are shown in FIGS. 38 to 41, and a graph showing the relationship between the measured temperatures and the change rates of the electrical resistance values is shown in FIG. 42.

Measurement of Volume Resistivity

Figure 43:
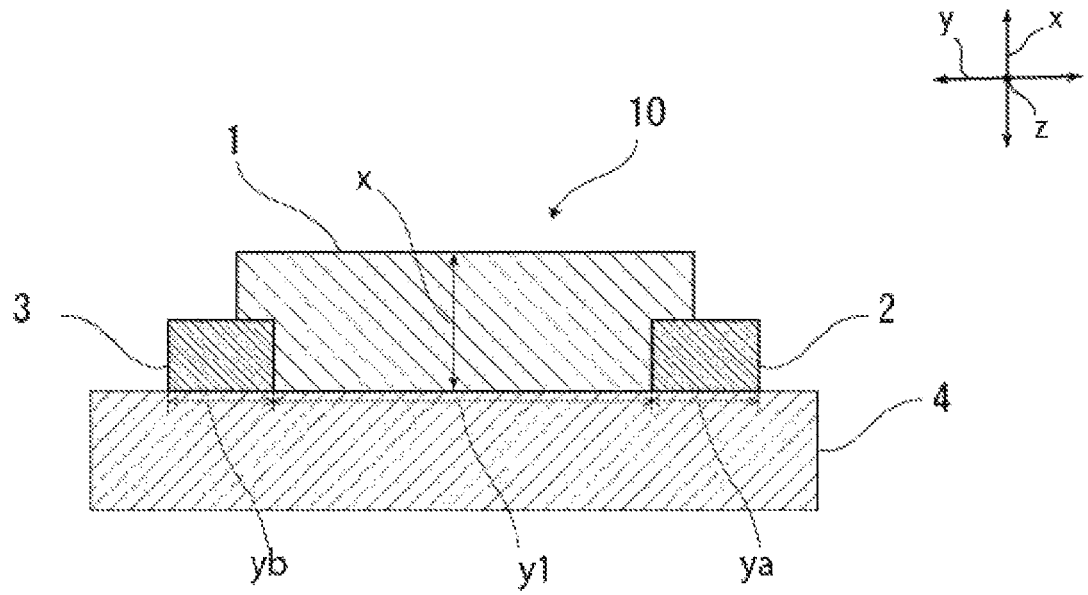
FIG. 43 is a cross-sectional view showing another example of a heat-sensitive element according to an embodiment of the present invention (used for measuring a volume resistivity).
Figure 44:
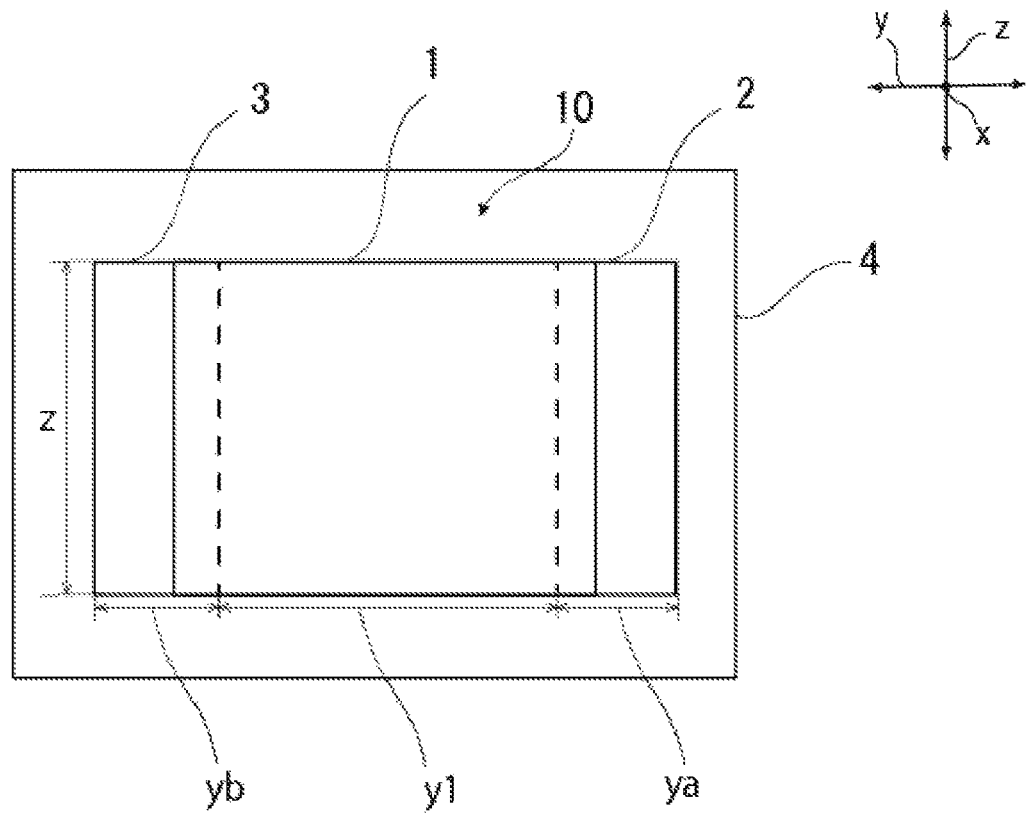
FIG. 44 is a plan view of FIG. 43 (used for measuring a volume resistivity).

A heat-sensitive element 10 shown in FIGS. 43 and 44 was manufactured using the ink obtained as described above, and the volume resistivities at the temperatures shown in Table 1 were measured. Specifically, as shown in FIGS. 43 and 44, the first electrode 2 (polyimide silver filler dispersion, SAP-15 manufactured by Sanwa Chemical Industrial Co.; thickness x=8 μm, width ya=2 mm, length z=5 mm) and the first electrode 3 (polyimide silver filler dispersion, SAP-15 manufactured by Sanwa Chemical Industrial Co.; thickness x=8 μm, width yb=2 mm, length z=5 mm) are formed over the polyimide sheet 4 (Kapton 300V manufactured by Du Pont-Toray Co., Ltd.) through screen printing. Next, the ink was applied through screen printing so as to fill the gaps between the two electrodes 2 and 3, thereby forming the conductive heat-sensitive material 1 (thickness x=28 μm, width y1=5 mm, length z=5 mm).

The volume-resistivities at the temperatures shown in Table 1 were measured using the obtained heat-sensitive element 10. The results are shown in Table 1.

TABLE 1

| | | | Working Example 1 | Working Example 2 | Working Example 3 | Comparative Example 1 |
|---|---|---|---|---|---|---|
| Heat-sensitive resistor | Conductive particle (mass %) | Carbon black (average particle diameter: 37 nm) | 4.8 | 5.7 | 6.1 | 10 |
| | Resin (mass %) | Polyimide resin/epoxy resin | 81.5 | 80.8 | 80.4 | 77.8 |
| | | Tg (° C.) | 350 to 400 | 350 to 400 | 350 to 400 | 350 to 400 |
| | Filler (mass %) | Titanium oxide | 13.7 | 13.6 | 13.5 | 13.1 |
| | Percentage in ink (mass %) | | 69.6 | 69.8 | 69.9 | 70.5 |
| Solvent | Triethylene glycol, dimethyl ether, N-methyl-2-pyrrolidone (percentage in ink: mass %) | | 28.4 | 28.2 | 28.1 | 27.5 |
| Anti-foaming agent | Acrylic polymer (percentage in ink: mass %) | | 2.0 | 2.0 | 2.0 | 2.0 |
| Electrical resistance (Ω) at each temperature | 30° C. | | 878000 | 57900 | 748 | 10.4 |
| | 50° C. | | 905000 | 60900 | 760 | 10.4 |
| | 100° C. | | 1158000 | 68500 | 833 | 10.7 |
| | 150° C. | | 1366000 | 82800 | 911 | 11.2 |
| | 200° C. | | 1737000 | 97200 | 1116 | 11.9 |
| Inverse of electrical resistance (1/Ω) at each temperature | 30° C. | | $1.14 \times 10^{-6}$ | $1.73 \times 10^{-5}$ | $1.34 \times 10^{-3}$ | $9.61 \times 10^{-2}$ |
| | 50° C. | | $1.10 \times 10^{-6}$ | $1.64 \times 10^{-5}$ | $1.32 \times 10^{-3}$ | $9.58 \times 10^{-2}$ |
| | 100° C. | | $8.64 \times 10^{-7}$ | $1.46 \times 10^{-5}$ | $1.20 \times 10^{-3}$ | $9.36 \times 10^{-2}$ |
| | 150° C. | | $7.32 \times 10^{-7}$ | $1.21 \times 10^{-5}$ | $1.10 \times 10^{-3}$ | $8.93 \times 10^{-2}$ |
| | 200° C. | | $5.76 \times 10^{-7}$ | $1.03 \times 10^{-5}$ | $8.96 \times 10^{-4}$ | $8.43 \times 10^{-2}$ |
| Rate of change in resistance between 30° C. and 200° C. | | | 2.0 | 1.7 | 1.5 | 1.1 |
| Rate of change in resistance value in 30° C. to 200° C. range | | | 0.58 | 0.40 | 0.29 | 0.08 |
| Volume resistivity (Ω · cm) | 30° C. | | 32766 | 2351 | 157 | 5.21 |
| Film thickness (μm) of heat-sensitive resistor | | | 25.4 | 29.5 | 28.7 | 29.8 |

In Table 1, the details of the components are as described below.

Carbon black: XC-72R manufactured by Cabot Specialty Chemicals Ink Corporation; mixture of polyimide resin/epoxy resin, titanium oxide, and triethylene glycol dimethyl ether, N-methyl-2-pyrrolidone: IRP-1407 manufactured by Sanwa Chemical Industrial Co., Ltd.; acrylic polymer: DISPARLON 1970 manufactured by Kusumoto Chemicals, Ltd.

REFERENCE SIGNS LIST

1 Sensor sheet
2 Film base material
3 First wiring electrode group
3a First wiring electrode
4 Second wiring electrode group
4a Second wiring electrode
5 Conductive heat-sensitive material
6 Third wiring electrode group
6a Third wiring electrode
7 Conductive pressure-sensitive material
8 Protective film base material
9 Insulating material
21 Temperature detection portion
22 Pressure detection portion
31 PC
32 Connector
101 Sensor system

The invention claimed is:

1. A sensor sheet comprising:
a flexible film base material;
a first wiring electrode group that is provided, by screen printing, inkjet printing, transfer method, or substrate wiring technique, over the film base material and is formed by arranging a plurality of linear first wiring electrodes in parallel in a first direction;
a second wiring electrode group that is provided, by screen printing, inkjet printing, transfer method, or substrate wiring technique, over the film base material, intersects the first wiring electrode group, and is formed by arranging a plurality of linear second wiring electrodes in parallel in a second direction that intersects the first direction; and
a conductive heat-sensitive material that is provided by application method, printing method, or transfer method, at temperature detection portions, which are locations at which the first wiring electrodes and the second wiring electrodes intersect, and is arranged between the first wiring electrodes and the second wiring electrodes, wherein the conductive heat-sensitive material is configured such that an electrical property changes according to a change in temperature, and the conductive heat-sensitive material is formed so as to be fixed over the first wiring electrode and the second wiring electrodes are formed so as to be fixed over the conductive heat-sensitive material.

2. The sensor sheet according to claim 1, wherein the thickness from the first wiring electrodes to the second wiring electrodes is made uniform due to an insulating material being provided between the temperature detection portions.

3. The sensor sheet according to claim 1, wherein the temperature detection portions are covered with an insulating material.

4. The sensor sheet according to claim 1, further comprising:

a third wiring electrode group that is provided, by screen printing, inkjet printing, transfer method, or substrate wiring technique, over or under the second wiring electrode group and is formed by arranging a plurality of linear third wiring electrodes in parallel in a third direction that intersects the second direction; and a conductive pressure-sensitive material is provided by application method, printing method, or transfer method, at pressure detection portions, which are locations at which the second wiring electrodes and the third wiring electrodes intersect, and is arranged between the second wiring electrodes and the third wiring electrodes, wherein the conductive pressure-sensitive material is configured such that an electromagnetic property changes according to a change in pressure applied in a direction in which the second wiring electrodes and the third wiring electrodes are stacked.

5. The sensor sheet according to claim 4, wherein a region in which the plurality of temperature detection portions are arranged and a region in which the plurality of pressure detection portions are arranged overlap in plan view.

6. The sensor sheet according to claim 4, wherein a region in which the plurality of temperature detection portions are arranged and a region in which the plurality of pressure detection portions are arranged do not overlap in plan view.

7. The sensor sheet according to claim 4, wherein the conductive pressure-sensitive material includes a first portion and a second portion, the first portion is arranged along the second wiring electrodes, the second portion is arranged along the third wiring electrodes, and the first portion and the second portion are separatably in contact.

8. The sensor sheet according to claim 1, further comprising:

a sixth wiring electrode group that is provided, by screen printing, inkjet printing, transfer method, or substrate wiring technique, over the film base material and is formed by arranging a plurality of linear sixth wiring electrodes in parallel in the first direction;

a seventh wiring electrode group that is provided, by screen printing, inkjet printing, transfer method, or substrate wiring technique, over the sixth wiring electrode group and is formed by arranging a plurality of linear seventh wiring electrodes in parallel in the second direction; and a conductive pressure-sensitive material that is provided by application method, printing method, or transfer method, at pressure detection portions, which are locations at which the sixth wiring electrodes and the seventh wiring electrodes intersect, and is arranged between the sixth wiring electrodes and the seventh wiring electrodes, wherein the conductive pressure-sensitive material is configured such that an electromagnetic property changes according to a change in pressure applied in a direction in which the sixth wiring electrodes and the seventh wiring electrodes are stacked, a region in which the plurality of temperature detection portions are arranged and a region in which the plurality of pressure detection portions are arranged do not overlap in plan view.

9. The sensor sheet according to claim 8, wherein the first wiring electrodes and the sixth wiring electrodes are arranged alternatingly in the second direction, and the second wiring electrodes and the seventh wiring electrodes are arranged alternatingly in the first direction.

10. The sensor sheet according to claim 8, wherein a thickness from the first wiring electrode to the third wiring electrode is made uniform due to an insulating material being provided between the temperature detection portions and between the pressure detection portions.

11. A sensor system comprising:

the sensor sheet according to claim 4;

an electric circuit configured to acquire changes in an electromagnetic property of the temperature detection portions and the pressure detection portions as output values;

a calculation unit configured to calculate a temperature distribution based on the output values obtained from the plurality of temperature detection portions and calculate a pressure distribution based on the output values obtained from the plurality of pressure detection portions; and a control unit configured to control at least an operation of the sensor sheet.

12. The sensor system according to claim 11, further comprising a correction unit configured to, based on output values obtained by either the temperature detection portions or the pressure detection portions, correct output values obtained by the other.

13. The sensor system according to claim 11, further comprising a measurement device configured to measure at least one of the temperature and the humidity of the same atmosphere as the sensor sheet.

14. The sensor system according to claim 11, wherein based on the output values from the one or more temperature detection portions of the sensor sheet, which are obtained when the one or more temperature detection portions are held at a predetermined temperature, the control unit derives conversion coefficients for the output values from the temperature detection portions with which temperature output values that correlate to a temperature input value applied to the temperature detection portions can be obtained.

15. The sensor system according to claim 14, wherein the control unit derives the conversion coefficients based on the output values from the one or more temperature detection portions of the sensor sheet, which are obtained when the one or more temperature detection portions are held at a plurality of mutually different temperatures.

16. The sensor system according to claim 14, wherein the control unit determines whether or not the temperature output values obtained by multiplying the conversion coefficients by the output values of the temperature detection portions match the temperature input value applied to the temperature detection portions.

17. The sensor system according to claim 14, further comprising a measurement device configured to measure at least one of the temperature and the humidity of the same atmosphere as the sensor sheet,
wherein the control unit uses a temperature value measured by the measurement device as the temperature input value.

18. The sensor system according to claim 14, wherein based on the output values from the one or more pressure detection portions of the sensor sheet, which are obtained when a predetermined pressure is applied to the one or more pressure detection portions, the control unit derives conversion coefficients for the output values from the pressure detection portions with which pressure output values that correlate to the pressure input value applied to the pressure detection portions can be obtained.

19. The sensor system according to claim 18, wherein the control unit derives the conversion coefficients based on the output values from the one or more pressure detection portions of the sensor sheet, which are obtained when a plurality of mutually different pressures are applied to the one or more pressure detection portions.

20. The sensor system according to claim 18, wherein the control unit determines whether or not the pressure output values obtained by multiplying the conversion coefficients by the output values of the pressure detection portions match the pressure input value applied to the pressure detection portions.

21. The sensor system according to claim 14, wherein the control unit stores the conversion coefficients for each of a plurality of said sensor sheets and selects conversion coefficients that are optimal for the sensor sheet that is to be used.

22. The sensor system according to claim 14, further comprising a measurement device configured to measure at least one of the temperature and the humidity of the same atmosphere as the sensor sheet,
wherein the control unit determines the conversion coefficients based on the humidity measured by the measurement device.

23. The sensor sheet according to claim 1, wherein the conductive heat-sensitive material contains conductive particles and resin, and
has an electrical resistance value at 200° C. that is at least 1.2 times its electrical resistance value at 30° C.

24. The sensor sheet according to claim 23, wherein a volume resistivity in a temperature range of 30° C. to 200° C. is in a range of 10 Ω·cm to 100 KΩ·cm.

25. The sensor sheet according to claim 23, wherein the content of the conductive particles of the conductive heat-sensitive material is less than 15 mass %.

26. The sensor sheet according to claim 23, wherein the thickness of the conductive heat-sensitive material is 100 μm or less.

27. The sensor sheet according to claim 23, wherein the electrical resistance value at 100° C. is at most 5 times the electrical resistance value at 30° C.

28. The sensor sheet according to claim 23, wherein a change rate of the electrical resistance value in the temperature range of 30° C. to 200° C. is within a range of 0.12 to 2.4%/° C.

* * * * *